United States Patent
Roberts

(10) Patent No.: US 11,587,109 B2
(45) Date of Patent: *Feb. 21, 2023

(54) USING CROSS PLATFORM METRICS FOR DETERMINING USER ENGAGEMENT

(71) Applicant: Comcast Spectacor, LLC, Philadelphia, PA (US)

(72) Inventor: Tucker Roberts, Santa Monica, CA (US)

(73) Assignee: Comcast Spectacor, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/104,999

(22) Filed: Nov. 25, 2020

(65) Prior Publication Data

US 2021/0097562 A1 Apr. 1, 2021

Related U.S. Application Data

(63) Continuation of application No. 16/580,641, filed on Sep. 24, 2019, now Pat. No. 10,861,037.

(Continued)

(51) Int. Cl.
*G06Q 30/02* (2012.01)
*G06Q 30/0217* (2023.01)
(Continued)

(52) U.S. Cl.
CPC ..... *G06Q 30/0218* (2013.01); *G06Q 30/0224* (2013.01); *G06Q 30/0236* (2013.01);
(Continued)

(58) Field of Classification Search
CPC .............. G06Q 30/02; G06Q 30/0218; G06Q 30/0224; G06Q 30/0236; G06Q 30/0253; G06Q 30/0621; G06Q 30/0641; G06Q 50/01; G06Q 30/0209; G06Q 30/0212; G06Q 30/0222; G06Q 30/0207–30/0277
See application file for complete search history.

(56) References Cited

U.S. PATENT DOCUMENTS 8,287,383 B1 * 10/2012 Etter .................. A63F 13/85
463/42
2002/0046116 A1   4/2002 Hohle et al.
(Continued)

FOREIGN PATENT DOCUMENTS

WO   2011119974 A1   9/2011
WO   2013039457 A2   3/2013

OTHER PUBLICATIONS

Sep. 15, 2020, International Search Report and Written Opinion, PCT/US2020/035687.

*Primary Examiner* — Thuy N Nguyen
(74) *Attorney, Agent, or Firm* — Banner & Witcoff, Ltd.

(57) ABSTRACT

Systems, apparatuses, and methods are described for determining a consumer's engagement with a brand of the business by tracking the consumer's activities in multiple platforms, such as social media platforms, content platforms, gaming platforms, other retailers, streaming video providers, service providers, etc. Method are described for probabilistically granting users variations of items that are otherwise being acquired. The granting may be random, but probabilities may be boosted based on the consumer's activities in the platforms.

27 Claims, 41 Drawing Sheets

Related U.S. Application Data

(60) Provisional application No. 62/861,691, filed on Jun. 14, 2019.

(51) Int. Cl.
*G06Q 30/0207* (2023.01)
*G06Q 30/0251* (2023.01)
*G06Q 30/0601* (2023.01)
*G06Q 50/00* (2012.01)

(52) U.S. Cl.
CPC ..... *G06Q 30/0253* (2013.01); *G06Q 30/0621* (2013.01); *G06Q 30/0641* (2013.01); *G06Q 50/01* (2013.01)

(56) References Cited

U.S. PATENT DOCUMENTS

| | | | |
|---|---|---|---|
| 2008/0133417 A1* | 6/2008 | Robinson | G06Q 30/0282 705/52 |
| 2010/0228613 A1* | 9/2010 | Anderson | H04N 21/812 705/14.13 |
| 2012/0271704 A1 | 10/2012 | Nagarajan et al. | |
| 2013/0005437 A1* | 1/2013 | Bethke | A63F 13/795 463/25 |
| 2013/0005466 A1* | 1/2013 | Mahajan | A63F 13/12 463/36 |
| 2013/0006736 A1* | 1/2013 | Bethke | A63F 13/69 705/14.12 |
| 2013/0346170 A1* | 12/2013 | Epstein | G06Q 30/02 705/14.14 |
| 2014/0244612 A1* | 8/2014 | Bhasin | G06Q 50/01 707/706 |
| 2014/0278887 A1 | 9/2014 | Pirillo | |
| 2017/0124484 A1* | 5/2017 | Thompson | G06N 5/02 |
| 2017/0201779 A1* | 7/2017 | Publicover | H04N 21/4532 |
| 2018/0181978 A1* | 6/2018 | Weinberger | G06Q 20/384 |
| 2018/0184403 A1 | 6/2018 | Kikkawa et al. | |
| 2019/0147487 A1 | 5/2019 | Lee | |
| 2019/0156575 A1 | 5/2019 | Korhonen | |
| 2019/0247749 A1* | 8/2019 | Auterio | A63F 13/216 |
| 2019/0295114 A1* | 9/2019 | Pavletic | G06N 3/08 |
| 2019/0339687 A1* | 11/2019 | Celia | G06Q 30/0278 |
| 2020/0078666 A1 | 3/2020 | Monsarrat | |
| 2020/0167814 A1 | 5/2020 | Rodriguez Bravo | |

* cited by examiner

Loot Items and Odds

| Probability Roll | Loot Class | Hoodie | Jersey | T-Shirt | Hat |
|---|---|---|---|---|---|
| 99.9 - 100.0 | Legendary | Player Autograph | Player Autograph | Player Autograph | Player Autograph |
| 99.6 - 99.8 | Epic | Added Team Logo | Color Number Outline | Added Team Logo | Stitching Accent |
| 99.1 - 99.5 | Superior | Alternate Color Interior of Hood | Reversible Alternate Pattern | Reversible Alternate Pattern | Player Name on Back |
| 98.0 - 99.0 | Rare | Color Number Outline | Home/Away Split | Mascot Name on Back | Alternate Color on Top |
| 92.0 - 97.9 | Good | Captain Star | Stitching Accent | Accented Sleeves | Alternate Color Under Bill |
| 00.0 - 91.9 | Common | No Change | No Change | No Change | No Change |

Sample User Roll

| Probability Roll | Loot Class | Sweatshirt | Jersey | T-Shirt | Hat |
|---|---|---|---|---|---|
| 99.9 - 100.0 | Legendary | Player Autograph | Player Autograph | Player Autograph | Player Autograph |
| 99.6 - 99.8 | Epic | Added Team Logo | Color Number Outline | Added Team Logo | Stitching Accent |
| 99.1 - 99.5 | Superior | Alternate Color Interior of Hood | Reversible Alternate Pattern | Reversible Alternate Pattern | Player Name on Back |
| 98.0 - 99.0 | Rare | Color Number Outline | Home/Away Split | Mascot Name on Back | Alternate Color on Top |
| 92.0 - 97.9 | Good | Captain Star | Stitching Accent | Accented Sleeves | Alternate Color Under Bill |
| 00.0 - 91.9 | Common | No Change | No Change | No Change | No Change |

↑ User Rolls 91.3

FIG. 5A

Boosted Sample Roll

| Probability Roll | Loot Class | Sweatshirt | Jersey | T-Shirt | Hat |
|---|---|---|---|---|---|
| 99.9 - 100.0 | Legendary | Player Autograph | Player Autograph | Player Autograph | Player Autograph |
| 99.6 - 99.8 | Epic | Added Team Logo | Color Number Outline | Added Team Logo | Stitching Accent |
| 99.1 - 99.5 | Superior | Alternate Color Interior of Hood | Reversible Alternate Pattern | Reversible Alternate Pattern | Player Name on Back |
| 98.0 - 99.0 | Rare | Color Number Outline | Home/Away Split | Mascot Name on Back | Alternate Color on Top |
| 92.0 - 97.9 | Good | Captain Star | Stitching Accent | Accented Sleeves | Alternate Color Under Bill |
| 00.0 - 91.9 | Common | No Change | No Change | No Change | No Change |

400

Boost By (+2.0%)
91.3 * 1.02 = 93.13

User Rolls 91.3

FIG. 5B

Loot Boost Rules/Conditions

| Boost Name | Boost Amount | Rules/Conditions |
|---|---|---|
| Killa Killa Chick'n Dinna 15 | +2.00% | Complete purchase within 10 minutes of a team player recording a 15+ kill streak in a match |
| Right Place, Right Time | +3.00% | Complete a purchase while located in a city hosting a match, and during the match |
| Better Place, Better Time | +4.00% | Complete a purchase while located in an arena and during halftime of a match |
| Noob Tube | +0.50% | Complete a purchase after having watched at least 10 team matches |
| Follow Me | +0.75% | Complete a purchase having at least 1,000 followers on social media |
| In the Network | +0.75% | Complete a purchase while connecting via ISP ACME |
| Buy More | +0.01% | Boost awarded, at time of new purchase, for every item purchased in last 90 days |
| Santa's Comin' | +1.00% | Complete a purchase between Thanksgiving and Christmas Day |
| Skipping Dessert | +1.5% | Complete a purchase on Thanksgiving Day after 6pm local time |
| Benefits of Friends | +0.5% | Complete a purchase with friends |
| Run! | +0.5% | Complete a purchase within 1 day of logging an exercise run of at least 1 mile |
| Selfie Me | +0.25% | Complete a purchase after uploading a selfie containing a QR code |
| Achievement Pop | +0.5% | Complete a purchase after unlocking Achievement X or Level Y in Video Game |
| Commitment | +1.0% | Complete a purchase after having been a registered member for at least 1 year |
| Committed | +2.0% | Complete a purchase after having been a registered member for at least 5 years |

Users 1002

| User ID | Name | Email | Phone | Social Media A ID | Social Media B ID | eSports Platform A ID | Gaming Platform A ID | Content Server A ID | Optional |
|---|---|---|---|---|---|---|---|---|---|
| 1001 | John Smith | jsmith@gmail.com | 4387297214 | jsmithy | JohnSmith | BugsBunny | Pluto | jsmith | |
| 1002 | Caroline Jones | carolinej@aol.com | 9886473474 | | HelloKitty | TweetyBird | Venus | caroline1995 | |

FIG. 12B

Available Common Inventory 1004

| SKU | Item Description | Size | Color | Loot class | Price | Number of Items Available | Optional |
|---|---|---|---|---|---|---|---|
| SS-S-BLK-CM | Sweatshirt | S | Black | Common | 64.99 | 45 | |
| SS-M-BLK-CM | Sweatshirt | M | Black | Common | 64.99 | 3 | |
| SS-L-BLK-CM | Sweatshirt | L | Black | Common | 64.99 | 65 | |
| SS-XL-BLK-CM | Sweatshirt | XL | Black | Common | 64.99 | 14 | |
| SS-S-RD-CM | Sweatshirt | S | Red | Common | 64.99 | 4 | |
| SS-M-RD-CM | Sweatshirt | M | Red | Common | 64.99 | 34 | |
| SS-L-RD-CM | Sweatshirt | L | Red | Common | 64.99 | 5 | |
| SS-XL-RD-CM | Sweatshirt | XL | Red | Common | 64.99 | 4 | |
| TS-S-WH-CM | T-Shirt | S | White | Common | 29.99 | 86 | |
| TS-M-WH-CM | T-Shirt | M | White | Common | 29.99 | 89 | |
| TS-L-WH-CM | T-Shirt | L | White | Common | 29.99 | 287 | |
| TS-XL-WH-CM | T-Shirt | XL | White | Common | 29.99 | 77 | |

Available Loot Inventory 1008

| SKU | Item Description | Size | Color | Loot class | Price | Number of Items Available | Optional |
|---|---|---|---|---|---|---|---|
| SS-S-BLK-GD | Sweatshirt-Captain Star | S | Black | Good | 64.99 | 20 | |
| SS-M-BLK-GD | Sweatshirt-Captain Star | M | Black | Good | 64.99 | 17 | |
| SS-L-BLK-GD | Sweatshirt-Captain Star | L | Black | Good | 64.99 | 16 | |
| SS-XL-BLK-GD | Sweatshirt-Captain Star | XL | Black | Good | 64.99 | 9 | |
| SS-S-BLK-RR | Sweatshirt-Color Number Outline | S | Black | Rare | 64.99 | 12 | |
| SS-M-BLK-RR | Sweatshirt-Color Number Outline | M | Black | Rare | 64.99 | 13 | |
| SS-L-BLK-RR | Sweatshirt-Color Number Outline | L | Black | Rare | 64.99 | 8 | |
| SS-XL-BLK-RR | Sweatshirt-Color Number Outline | XL | Black | Rare | 64.99 | 5 | |
| SS-S-BLK-SP | Sweatshirt-Alternate Hood Color | S | Black | Superior | 64.99 | 2 | |
| SS-M-BLK-SP | Sweatshirt-Alternate Hood Color | M | Black | Superior | 64.99 | 3 | |
| SS-L-BLK-SP | Sweatshirt-Alternate Hood Color | L | Black | Superior | 64.99 | 2 | |
| SS-XL-BLK-SP | Sweatshirt-Alternate Hood Color | XL | Black | Superior | 64.99 | 4 | |
| SS-S-BLK-EP | Sweatshirt-Added Team Logo | S | Black | Epic | 64.99 | 1 | |
| SS-M-BLK-EP | Sweatshirt-Added Team Logo | M | Black | Epic | 64.99 | 1 | |
| SS-L-BLK-EP | Sweatshirt-Added Team Logo | L | Black | Epic | 64.99 | 1 | |
| SS-XL-BLK-EP | Sweatshirt-Added Team Logo | XL | Black | Epiuc | 64.99 | 1 | |

FIG. 12C

Loot Item Ownership Registry 1010

| Item ID | Item Description | Size | Color | Loot class | Ownership Start Date | Ownership Last Date | Owner ID | Owner Name | Tag | Optional |
|---|---|---|---|---|---|---|---|---|---|---|
| 23516b | Sweatshirt-Captain Star | S | Black | Good | 3/4/2019 | 5/2/2019 | 1023 | Bob Smith | ☐ | |
| 23516b | Sweatshirt-Captain Star | S | Black | Good | 5/2/2019 | 7/1/2019 | 5612 | Alice Jones | ☐ | |
| 23516b | Sweatshirt-Captain Star | S | Black | Good | 7/1/2019 | 7/5/2019 | 2156 | Chad Davis | ☐ | |
| 23516b | Sweatshirt-Captain Star | S | Black | Good | 7/5/2019 | 8/1/2019 | | Deadshot_Dale | ☐ | |
| 23516b | Sweatshirt-Captain Star | S | Black | Good | 8/1/2019 | | | 51324@email.com | ☐ | |

FIG. 12D

User Loot Scores 1120

| User ID | Loot Score | Expiry |
|---|---|---|
| 1001 | 0.2 | 2019-05-12T15:48:01+00:00 |
| 1001 | 0.5 | 2019-05-12T15:48:01+00:00 |
| 1001 | 1 | 2019-05-12T15:48:01+00:00 |
| 1002 | 1.5 | 2019-05-12T15:48:01+00:00 |
| 1002 | 0.1 | 2019-05-12T15:48:01+00:00 |

FIG. 12E

LOOT/BOOST RULES 1126

| Boost Source/ Ad Campaign | Boost Name | Loot Score | Rules/Conditions | Optional |
|---|---|---|---|---|
| General | Instagram Queen | 2.00% | More than 1 million followers in Instagram | |
| General | Thanksgiving Day | 0.50% | Shopping on Thanksgiving Day | |
| Retailer A | Super 5 | 0.50% | Purchase 5 items in one day | |
| Retailer A | Super 10 | 1.00% | Purchase 10 items in one day | |
| Retailer A | Awesome500 | 1.00% | Purchase $500 worth of Mercendise in one day | |
| Gaming Platform A | Awesome Player | 0.20% | Play video games 2 hours per day | |
| Gaming Platform A | Super Awesome Player | 0.50% | Play video games 5 hours per day | |
| Content Server A | Star Wars Fan | 1.00% | Watch 10 episodes of Star Wars in one week | |
| Content Server A | Super Star Wars Fan | 2.00% | Watch 20 episodes of Star Wars in one week | |
| Sport Streaming Platform A | Super Basketball Fan!! | 5% | Watch 80% of the games in March Madness | |
| Sport Streaming Platform A | Golf boy | 1% | Watch PGA Championship | |

FIG. 12F

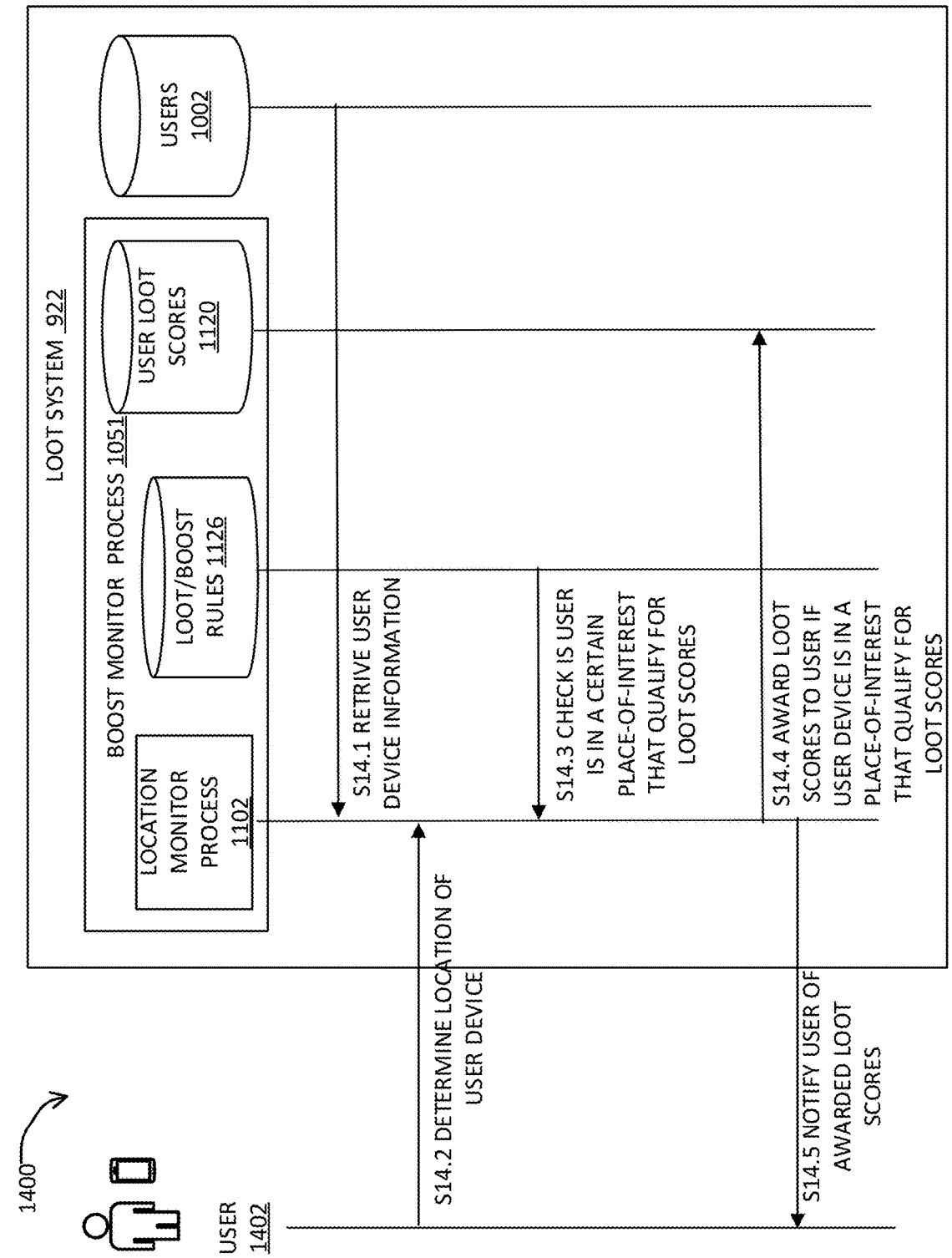

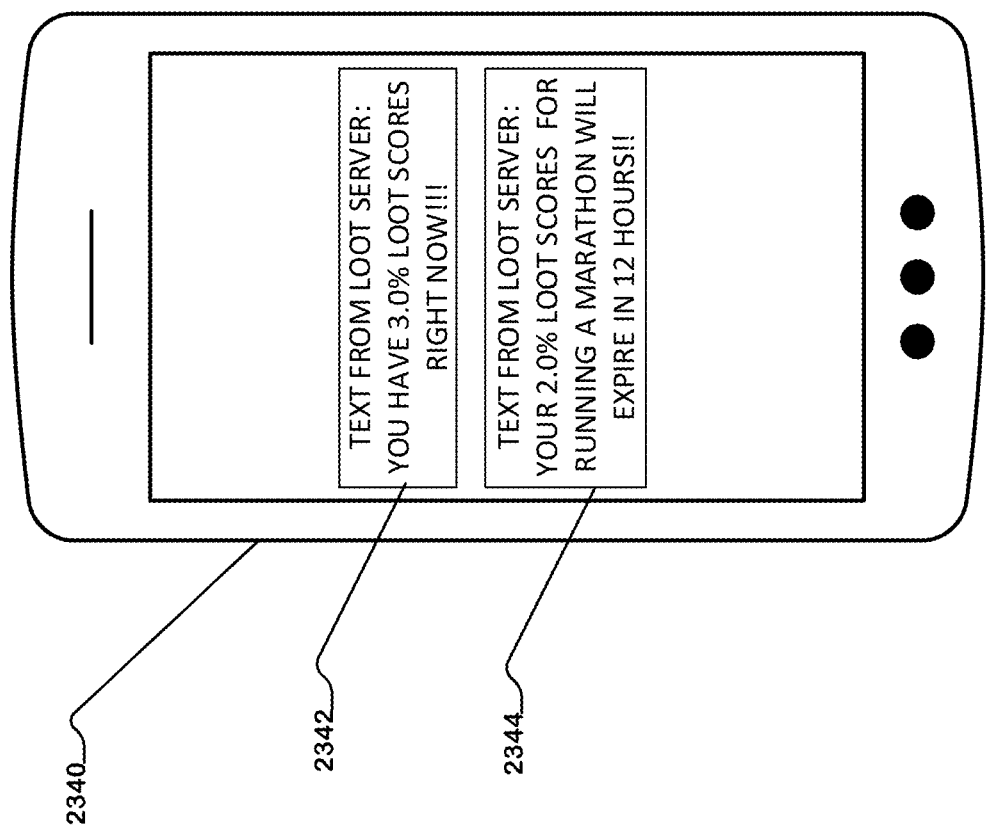

USING CROSS PLATFORM METRICS FOR DETERMINING USER ENGAGEMENT

RELATED APPLICATIONS

This application is a continuation of U.S. application Ser. No. 16/580,641, filed Sep. 24, 2019, which claims priority to U.S. provisional application Ser. No. 62/861,691, filed Jun. 14, 2019, the entire contents of each are incorporated herein by reference.

FIELD OF THE TECHNOLOGY

The technology disclosed relates digital data processing and artificial intelligent systems and corresponding methods for reasoning with uncertainty (e.g., machine learning systems, and artificial neural networks). In particular, the technology disclosed relates to digital data processing systems and methods for estimating and increasing user engagement in multiple platforms such as content platforms, gaming, retail, streaming video providers, social media, etc.

BACKGROUND

Increasing active engagement and brand loyalty in consumers is a common goal for many businesses. A business may maintain a computing system that analyzes purchase histories of consumers at its online or physical stores. The computing system may comprise various standards, triggers, conditions, and logical rules that are taken into consideration for determining points earned by the consumers based on their purchase histories. The computing system may facilitate the process by which the consumers can exchange the earned points for goods and services offered by the business. Receiving free goods and services in exchange of earned points may increase the consumer's engagement with the business.

Existing computing systems employed by businesses to increase consumer engagement may also take purchase histories of the consumers into account. However, in order to do a more comprehensive study of the consumer's engagement with the brand of the business, the consumers activities in other platforms external to the business may need to be taken into account. Such platforms include social media, content platforms, gaming platforms, other retailers, streaming video providers, service providers, etc. Analyzing consumer behavior in other platforms may require following use of different hardware devices, different networks, different software applications, and services, etc. Features described herein provide improved technology to increased user loyalty and engagement with the brand.

SUMMARY

Systems, apparatuses, and methods are described for loyalty and rewards system that looks at a variety of factors. These factors may include, but are not limited to, how many times has this user purchased a particular product, service, or used a particular supplier, how many other services are used from one or more related suppliers, demographics of user such as age, income, location, time of the day, environment associated with the interaction with the user, holidays, reoccurring sales, determinations of loyalty levels, social media interactions (e.g., Twitter, Instagram, Linkedin, Facebook), and other relevant factors such as those associated with targeted advertising metrics, as described in more detail below. A service provider can leverage cross-platform metrics to monitor, gauge, and encourage a user to improve his or her loyalty score. A service provider may implement a probabilistic rewards program in which a higher loyalty score increases a user's probability of getting a better loyalty prize. The prizes can range from modest items to extremely rare items that just can't be purchased at all. For example, where a service provider owns and/or controls an extremely popular stadium, sports team, streaming game, content channel, etc., these assets may be used to generate highly sought after rewards and in some cases extremely rare and unique prizes. The extremely rare items can be leveraged to create a large "buzz" on social media and other outlets around the product or service and hence garner large amounts of attention and free advertising for the product or service. The most loyal customers increase their odds of obtaining an extremely rare and valuable reward as well as more common less rare rewards. This helps build brand loyalty. Further, information obtained from the loyalty and rewards program can then be provided to the cross-platform system confidentially in an anonymized manner to improve metrics for such purposes as cross-platform targeted advertisements.

Creation of unique items made a special way, or a special experience that's not for sale, can generate a large amount of "buzz" (e.g., public interest). A user can increase his or her chances of obtaining one of these unique items (or a rarer item) through increasing his or her loyalty score. The items may be referred to as "loot." Through this, it is possible to revolutionize the retail experience and associated products and services in a way that glamorizes it, makes it fun, and garners a large amount of free advertisement. Cross-platform technology can automate many of these processes and find relevant metrics that otherwise wouldn't be available. A loot server is proposed to track the loyalty of customers across multiple platforms such as content platforms, gaming, retail, sports teams (including e-sports teams), arenas, service providers, telecommunication providers, streaming video providers, social media, theme parks, etc. The loot server can then promote rewards via advertisements, joint promotional programs, and/or directly to the user across multiple platforms to build brand loyalty and increase user engagement.

One way to make the "loot" even more valuable, is to eliminate the uncertainty associated with the loot in the secondary market. For example, if someone were to auction a "rare" baseball, there is a need to authenticate the signature or the ball—but there is no inexpensive and reliable way to do this—particularly in the online market place. Today, the authentication process for extremely rare items is labor intensive and subject to fraud. The loot server described herein seeks to provide a simple and easy authenticity process for items that may have been procured through a loyalty mechanism, making sure they aren't counterfeit. This brings trust and increased value to the rare items. It also promotes a secondary market place, making the rare and unique items even more valuable, which gives more incentive to participate in the rewards program and builds brand loyalty.

A user who is purchasing an item, such as a sweatshirt, may have a percentage chance of being given an alternative, and rarer, version of that item, for example, a sweatshirt signed by a team member or even rarer, every member of the team. The user's odds for being given the rarer version may be based on a variety of factors, such as timing of the purchase, geography where the purchase is made, user behavior, purchase history, loyalty program/engagement factors, and/or other factors, that may encourage user engagement with the source of the item. In some instances, an extremely rare and unique experience such as sitting with the team on the bench during a playoff game may be one of the top prizes. This may be awarded at the final game of the season based on a drawing which has its probabilities modified by loyalty factors (e.g., season ticket holder status, promotions on social media, followers on social media, length of time being a fan, quality of tickets held such as box seats, amount of away games watched, retail purchases of items from the team, and/or other loyalty factors).

Loyalty factors can range from metrics like have you shopped with us before, have you made purchases with us before, purchases within certain geographic locations (purchases in a stadium in Philadelphia this week and Universal Park the following week generates a probability bonus. Geolocation can be accessed from, for example, a mobile phone and purchases may be tracked using a suitable mechanism such as APPLE PAY™ or cooperative arrangements with retailers such as Amazon.com or NHL.com. Similarly, social components may provide a boost. For example, if you encourage your friends or followers to do or buy something (attend Universal Park or go to a Flyers game), there could be a boost granted to you and your friends, but you all have to sign up and do it at the same time. Additionally, missions can be assigned to boost probabilities such as going to a specified restaurant and take a photo with the restaurant owner, going to a soccer match and taking a photo behind the net, etc. These missions may be in either the real world or it could also be in the virtual world like once you get to a certain level of a game, you receive loyalty rewards or watched this X many episodes of a show. For example, if a team of Philadelphia Fusion fans achieve a difficult collective mission to achieve a virtual goal, their odds of winning a rare item (e.g., box seats) at an associated Fusion event may be increased. After the mission is completed and authenticated, the users may receive a short term boost or a permanent boost depending on the complexity of the mission. Boosting factors (e.g., missions for restaurants) may be auctioned off to retailers using common targeted software applications such as those offered by Canoe Ventures and/or Google Ads/Google Display Network. For example, the owner of the advertised product or service (e.g., restaurant) may contribute monetarily to the rare item in addition to paying for the opportunity to participate in the mission. An extremely rare item may generate a great deal of online "buzz" and hence a greater level of exposure for the sponsor.

Each item may be offered in a variety of different versions, having a variety of different rarity levels. An item registry may track the ownership of rare items, and allow users to verify ownership to facilitate future transfers of the item. In one example, a loot server maintains a title registry that allows user to record and track transfers of the rare item along with relevant authentication data such as data associated with an embedded authentication tag in the item.

Systems and methods will be described in more detail herein that foster loyalty and rewards systems and methods using cross-platform metrics (including sponsorship and rewards) to create a more robust echo system to increase user engagement across a wide variety of products and services and leverage online and social media "buzz" to maximize impact and minimize overall costs from a particular marketing campaign. These techniques are particularly applicable to service providers who typically offer a wide range of products and services.

This summary presents a simplified summary of certain features. It is not an extensive overview and is not intended to identify key or critical elements.

BRIEF DESCRIPTION OF THE DRAWINGS

Some features are shown by way of example, and not by limitation, in the accompanying drawings. In the drawings, like numerals reference similar elements.

FIG. 4 shows an example table of item variants and associated odds.

FIGS. 5A-B show an example user random value roll.

FIG. 6 shows an example listing of rules and/or conditions for random value boosts.

FIGS. 12A, 12B, 12C, 12D, 12E and 12F are symbolic drawings indicating how the databases in the loot system in FIG. 10 are organized.

FIGS. 14A and 14B illustrate a representative method of monitoring the location of a user by the boost monitor in the loot system.

FIGS. 23A and 23B illustrate a representative method of informing users of available loot scores by the boost monitor in the loot system.

DETAILED DESCRIPTION

Figure 1:
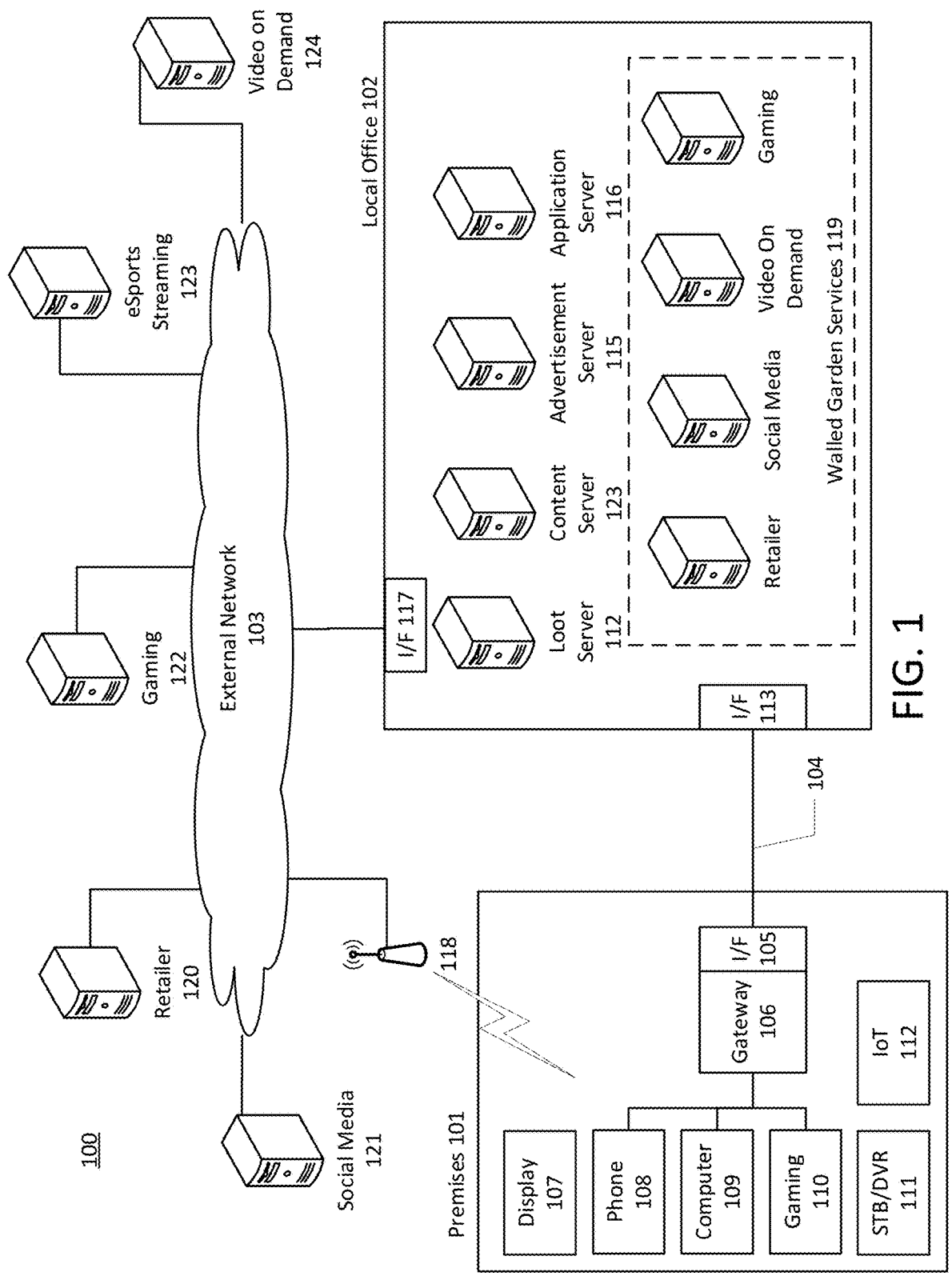
FIG. 1 shows an example communication network.

The accompanying drawings show examples of the disclosure. It is to be understood that the examples shown in the drawings and/or discussed herein are non-exclusive and that there are other examples of how the disclosure may be practiced.

FIG. 1 shows an example communication network 100 in which a premises 101 may be communicatively connected with a data center 102 to further communicate with an external network 103. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, the Internet, and/or a hybrid fiber/coax distribution network. The external networks 103 may comprise networks of Internet devices, telephone networks, wired networks, wireless networks, fiber optic networks, and/or any other desired wired or wireless network including the Internet.

The communication network 100 may use a series of interconnected communication links 104 (e.g., coaxial cables, optical fibers, wireless links, etc.) to connect multiple premises 101 (e.g., businesses, homes, consumer dwellings, train stations, airports, etc.) to data center 102 (e.g., a headend and/or AMAZON WEB SERVICES™ (AWS™)). The data center 102 may send downstream information signals (towards premises 101) and receive upstream information signals (from premises 101) via the communication links 104. Each of the premises 101 may comprise devices, described below, to receive, send, and/or otherwise process those signals and information contained therein.

An example premises 101 may comprise an interface 105. The interface 105 may comprise circuitry used to communicate via the communication links 104. The interface 105 may comprise a modem, which may comprise transmitters and receivers used to communicate via the communication links 104 with the data center 102. The modem may comprise, for example, a coaxial cable modem (for coaxial cable lines of the communication links 104), a fiber interface node (for fiber optic lines of the communication links 104), twisted-pair telephone modem, a wireless transceiver, and/or any other desired modem device. A plurality of modems operating in parallel may be implemented within the interface 105. The interface 105 may comprise a gateway 106. The modem may be connected to, or be a part of, the gateway 106. The gateway 106 may be a computing device that communicates with the modem(s) to allow one or more other devices in the premises 101 to communicate with the data center 102 and/or with other devices beyond the data center 102 (e.g., via the data center 102 and external network(s) 103). The gateway 106 may comprise a set-top box (STB), digital video recorder (DVR), a digital transport adapter (DTA), a computer server, and/or any other desired computing device.

The gateway 106 may also comprise one or more local network interfaces to communicate, via one or more local networks, with devices in the premises 101. Such devices may comprise, e.g., display devices 107 (e.g., computer monitors, televisions, touch screens, etc.), phones 108 (e.g., smartphones, cell phones, cordless phones (e.g., Digital Enhanced Cordless Telephones—DECT), landline phones, Voice over Internet Protocol—VoIP—phones, etc.), computers 109 (e.g., desktop computers, laptop computers, tablet computers, notebooks, netbooks, etc.), gaming consoles 110, STBs or DVRs 111, Internet-of-Things (IoT) 112 devices (e.g., smart watches, appliances, printers, home security devices, etc.) and/or any other desired communication device. The gateway 106 may employ any desired type of local network interface to communicate with the devices at the premises 101. This may include wired interfaces (e.g., coaxial cable, Multimedia Over Coax Alliance (MoCA), Ethernet interfaces, power line interfaces, Universal Serial Bus (USB) and/or wireless interfaces (e.g., Institute of Electrical and Electronics Engineers—IEEE—wireless protocols (IEEE 802.11, 802.15, etc.), Bluetooth, cellular phone, etc.). The various devices may be located at the premises 101, or outside the premises but within range of a wireless or wired connection.

The data center 102 may comprise an interface 113, such as a termination system (TS). The interface 113 may comprise a cable modem termination system (CMTS) and/or other computing device(s) configured to send information downstream to, and to receive information upstream from, the premises interface 105 (and devices 106-112). The interface 113 may be configured to manage communications among those devices, to manage communications between those devices and backend devices such as servers 114-116, and/or to manage communications between those devices and one or more external network 103. The data center 102 may comprise one or more network interfaces 117 that comprise circuitry needed to communicate via the external network 103. The external networks 103 may comprise networks of Internet devices, telephone networks, wired networks, wireless networks, fiber optic networks, and/or any other desired network. The data center 103 may also or alternatively communicate with the premises devices via the interface 117 and one or more of the external networks 103, e.g., via one or more wireless access points 118 (e.g., cell phone towers, picocells, wide area wireless networks, etc.).

The data center 102 may comprise various server computing devices to offer various services to users. A content server 114 may be configured to provide content to devices in the premises 101. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content.

An advertisement server 115 may be configured to provide advertisement services associated with the content provided by content server 114 (or any other content accessed by the devices 106-112). For example, the advertisement server 115 may store and provide advertisement files to be presented to users with audio and/or video (e.g., audiovisual) programs, Internet access, video games, etc. An advertisement server 115 may be responsible for formatting and inserting advertisements in a video stream being transmitted to devices in the premises 101 and/or to the devices 106-112. The advertisements may be targeted to users and/or their devices based on various demographic information, user content consumption history, device capabilities, and configurations, etc. Certain advertisements may only be available to users who have a certain "loot" score. For example, if the user has received enough award points, the user may be provided advertisements for certain unique or difficult to obtain items. The rewards points and associated loot score may be stored on a loot server 125. The potential for a reward increases the user's desire to interact and/or engage with the ads because the user never knows when a special offer will be forthcoming. It also encourages the user to share more information with the platform/service provider to increase his/her odds of receiving an ad with a special promotion and/or other loot from the loot server 125.

An application server 116 may be configured to offer any other desired service. For example, an application server 116 may be responsible for collecting, and generating a download of, information for electronic program guide listings which may list programs, video games, music, streaming services (games, video, audio, and various online services), and other services/applications. An application server may be responsible for monitoring user viewing habits and collecting information from that monitoring for use in selecting advertisements. The services may include walled garden services. Walled garden services may replicate services offered by external servers via the external network 103 but through a portal of the data center 102. So, for example, an online retailer server 120 may offer a website for the sale of merchandise, and the data center 102 may replicate that functionality using one or more application servers 116. In providing local access to the retailer 120, the data center 102 may tailor the experience to the user based on the user's relationship with the data center 102 and/or the user's reward points available from the loot server 125. The walled garden services 119 may replicate services offered by various servers via the external network 103, such as a retailer walled garden server corresponding to retailer servers 120, a walled garden social media server corresponding to social media servers 121, walled garden video on demand server 119c corresponding to video on demand servers 124, walled garden video gaming servers 119d corresponding to video gaming servers 122 and/or electronic sports streaming 123, etc. In the walled garden, the user have its "loot" or rewards score from the loot server applied to bolster his or her chances of obtaining more rare merchandise. While sharing of the "loot" or "rewards score" from the loot server 125 to platforms outside of the walled garden (e.g., social media server(s) 121, retailer server(s) 120, gaming servers (s) 122, eSports Streaming server(s) 123, and/or video on demand server(s) 124 via external network(s) 103) may occur with proper authentication, the use of the loot or "rewards score" within the walled garden encourages users to stay on the desired platforms, which increases user loyalty. Where sharing of the loot score occurs across external network 103, it may be shared with other service providers, retailers, gaming companies, eSports teams, Video service providers, etc. in a cooperative manner. In this way, certain rewards earned on partner networks may be credited toward the user's loot score. The partner networks may have a cooperative arrangement with the service provider and/or may share revenue and/or platform support such as through an entity such as Canoe Ventures.

The servers 114-116, 119a-d, 125, 120-124, and/or other servers, may be computing devices and may comprise memory storing data and also storing computer executable instructions that, when executed by one or more processes, cause the server(s) to perform the various steps described herein.

Figure 2A:
FIGS. 2A, 2B and 2C show an example sequence of screens for a purchase transaction with probabilistic grant of item.
Figure 2B:
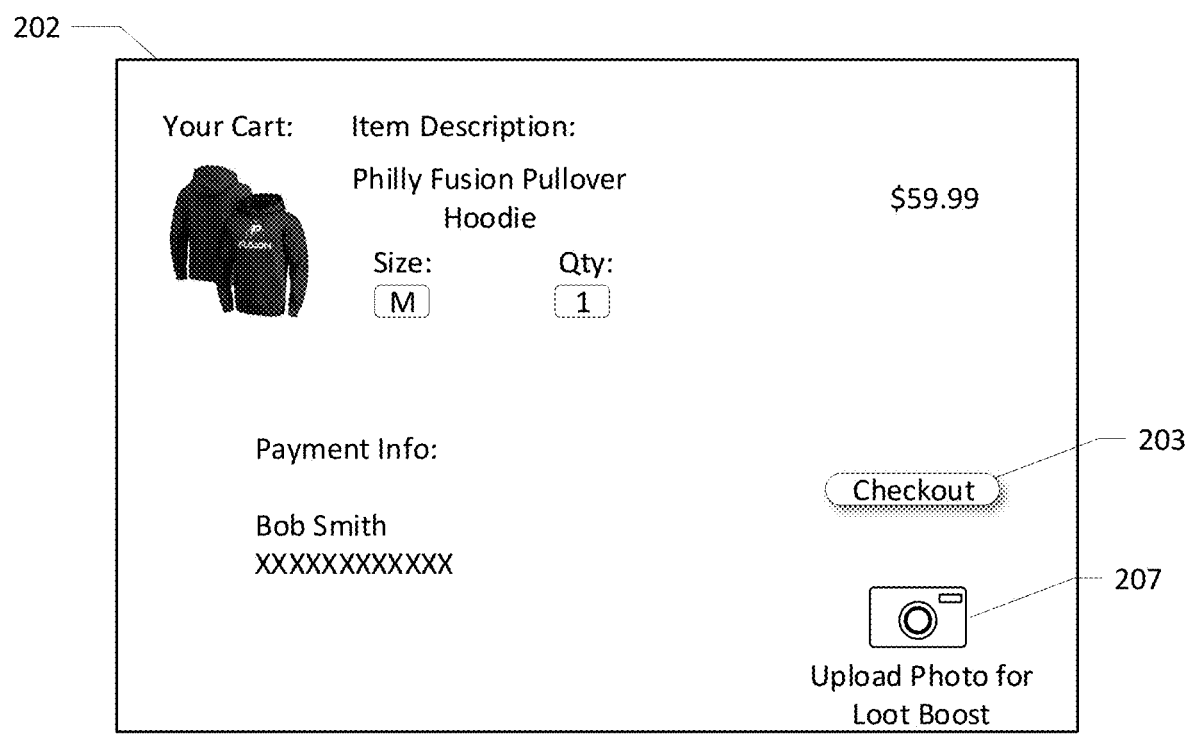
Figure 2C:

FIGS. 2A-C show example display screens that may be presented to a user as part of a purchase from an online retailer 120. The user may use a device, such as computer 109, and navigate to the retailer 120 website (e.g., through the external network 103, or via the content provider walled garden 119), and select an item to purchase. FIG. 2A shows an example item detail screen 200. The item detail screen 200 may show various details of the item (e.g., a sweatshirt) that the user has chosen to view, and a button 201 to add the item to the user's shopping cart for purchase. FIG. 2B shows an example checkout screen 202, indicating that the user has added the item to their shopping cart for checkout. If the user may select the checkout button 203, the system may then perform a probabilistic determination of whether the user will be granted a rare variant version of the chosen item. The probabilistic determination may entail generating a probability value for the user (e.g., a random number roll, similar to a roll of dice), and determine if the probability value falls within a predetermined value for receipt of the rare variant version. Details of this process are described further below.

If the user is lucky, and the system may determine to grant the user the rare variant version of the selected item, then the user may be presented with the variant grant screen 204 shown in FIG. 2C. Variant grant screen 204 may inform the user that they have been selected to receive a rare variant version of the item they had selected for purchase. This grant of a rare variant may be referred to as a 'loot box award,' and the variant grant screen 204 may comprise additional descriptive information explaining the variant that the user has been selected to receive. For example, the variant grant screen 204 indicates that the user has been selected to receive the "Captain Star Variant Hoodie," which includes an additional "Captain's Star" breast patch, as illustrated in the image of the item in FIG. 2C (as compared to the normal version shown in FIGS. 2A and 2B). There may be multiple different variations that are available, having different degrees of rarity, and that degree of rarity may be indicated in the variant grant screen 204. The variant item may also be of limited production (e.g., only 10,000 copies produced), and the production may be indicated as well. Additional details of the rarity will be discussed further below.

If the user would prefer to have the original version of the item instead, the user may decline the offer of the variant. For example, the user may simply select the "No Thanks" button 205 to decline, or the "Great!" button 206 to accept and purchase the variant item. Accepting a rare item may alter the probability value for the rewards score in the case where it is desired to spread the loot to multiple participants (e.g., making the rare item easier to obtain by other users). After the user has won a rare item, it may be desirable to have the user build additional loyalty points to again reach the same level. The loot server may also be configured to simply allow the probability mechanism to control the awards without adjusting the user's loyalty points after the award of a rare or unique item.

The loot offered to the user may also vary depending on the user's demographics. For example, if the user has demographics indicating he or she may be more interested in an alternative loot, the loot may be customized to be more appealing to the user's preferences. For example, this may be a favorite player or a cross-platform interest such as something related to other content such as something related to a Universal studios product or a favorite show.

Figure 3:
FIG. 3 shows an example screen of an item ownership registry.

Ownership of the variant item may be tracked, and this may facilitate subsequent transfers of the item, as users may choose to sell their variants as collectible items on a marketplace (e.g., retailer server 120, loot server 125, and/or another online marketplace). For example, the user may be given the option of auctioning off the rare variant on a marketplace (e.g., the loot server 125) or posting the receipt of the rare variant on social media—thus creating increased buzz concerning the loot program and the rare variant. FIG. 3 shows an example ownership screen 300, or loot registry, for the variant item. The ownership screen 300 may be accessed, for example, via a web page offered by the loot server 125 and/or retailer server 120, and users may enter an item serial number to see an ownership history 301 listing the various owners of the item and their dates of ownership. The ownership screen 300 may provide an option 302 to record a new transfer, and a user may choose this option to log in (e.g., with a username and password) and enter information to update the history to indicate a new transfer of ownership. The ownership screen 300 may provide users with confidence if they are choosing to acquire a rare item.

FIG. 4 shows an example table 400 indicating various item variants and their corresponding details and odds for acquisition. The table lists several items (Hoodie, Jersey, T-Shirt, and Hat), and indicates their rarity. The rarity may be indicated using a simple name for ease of reference (e.g., Common, Good, Rare, Superior, Epic, Legendary), and each rarity may include a probability roll value. In the FIG. 4 example, the probabilities are shown as percentages, reflecting a random number between 0 and 100.0. A random number roll may be performed for a user who is purchasing an item, and the resulting random number (e.g., between 00.0 and 100.0) may be compared against the table 400 to determine which version of an item the user may receive. Using the Hoodie sweatshirt example, a random value between 00.0 and 91.9 may result in the user being granted the Common (e.g., an ordinary, unchanged) version of the item. A random value between 92.0 and 97.9 may result in the user being granted the Good version of the item. In the FIG. 4 example, the Good version of the Hoodie sweatshirt may include the Captain Star shown in FIG. 2C.

A random value between 98.0 and 99.0 may result in the user being granted the Rare version of the sweatshirt, which may include a color outline of a player number on the sweatshirt. A random value between 99.1 and 99.5 may result in the user being granted the Superior version of the sweatshirt, which may include an alternate color on the interior of the sweatshirt's hood. A random value between 99.6 and 99.8 may result in the user being granted the Epic version of the sweatshirt, which may include an additional team logo, and a random value between 99.9 and 100.0 may result in the user being granted the Legendary version of the sweatshirt, which may include a player autograph. Of course, the values and details in FIG. 4 are merely examples, and other probabilities, variations, and items may be used. Different items may have different probabilities, items may have greater or fewer numbers of variants than other items, and other modifications may be made as desired.

FIGS. 5A & 5B show an example random value roll for a user, and the effect of a boost that may be applied to the roll. FIG. 5A shows the table 400 and a sample random value roll of 91.3 for a user. As indicated in the example table 400, a random value of 91.3 would merit a Common version of an item. However, certain factors may give the user a boost to their random value. FIG. 5B shows the user receiving a +2.0% boost to their random value roll, which has increased their random value by 2.0% of its original value, resulting in a boosted value of 93.13. In the illustrated example of FIG. 5B, the boosted random value of 93.13 is sufficient to qualify the user for receipt of a Good variant of the item, instead of the Common item that was originally selected. The enticement of receiving a rare version of an item, and the ability to receive random value boosts, may serve to increase a user's engagement with a source of the item (e.g., a professional esports team). Further, where appropriate, the rewards and loot items may be available with cross-platform support such that loot factors and associated loot may be earned and redeemed across different platforms owned, licensed, and/or controlled by a service provider. In this way, the loot and loyalty rewards may be customized to be more appealing to a particular user demographic and may be tied in with various advertising and promotions such as through the Canoe Ventures system.

FIG. 6 shows an example boost table 600, listing various boosts that may be applied to a user's random value roll. For example, a 2% boost may be awarded if the user completes their purchase (e.g., proceeds through the checkout process, completes an ordering process to acquire the item even without purchase) within 10 minutes of when a player on an esports team records a predetermined achievement (e.g., recording a 15+ kill streak) in a competition match. Another 3% boost may be awarded if the user completes their purchase while the user is located in a city that is hosting a professional esports match, and if the purchase is completed while the match is ongoing (or within a predetermined period afterward). Some boosts may comprise multiple conditions in the form of missions, in which a user must complete a sequence of events (e.g., run a mile with your health tracker, and complete level 10 of an identified video game). The determination and application of these boosts may rely on communications with other services, such as an esports streaming server 123, gaming server 122, or other devices, and additional details will be discussed with FIGS. 7A and 7B below.

Figure 7A:
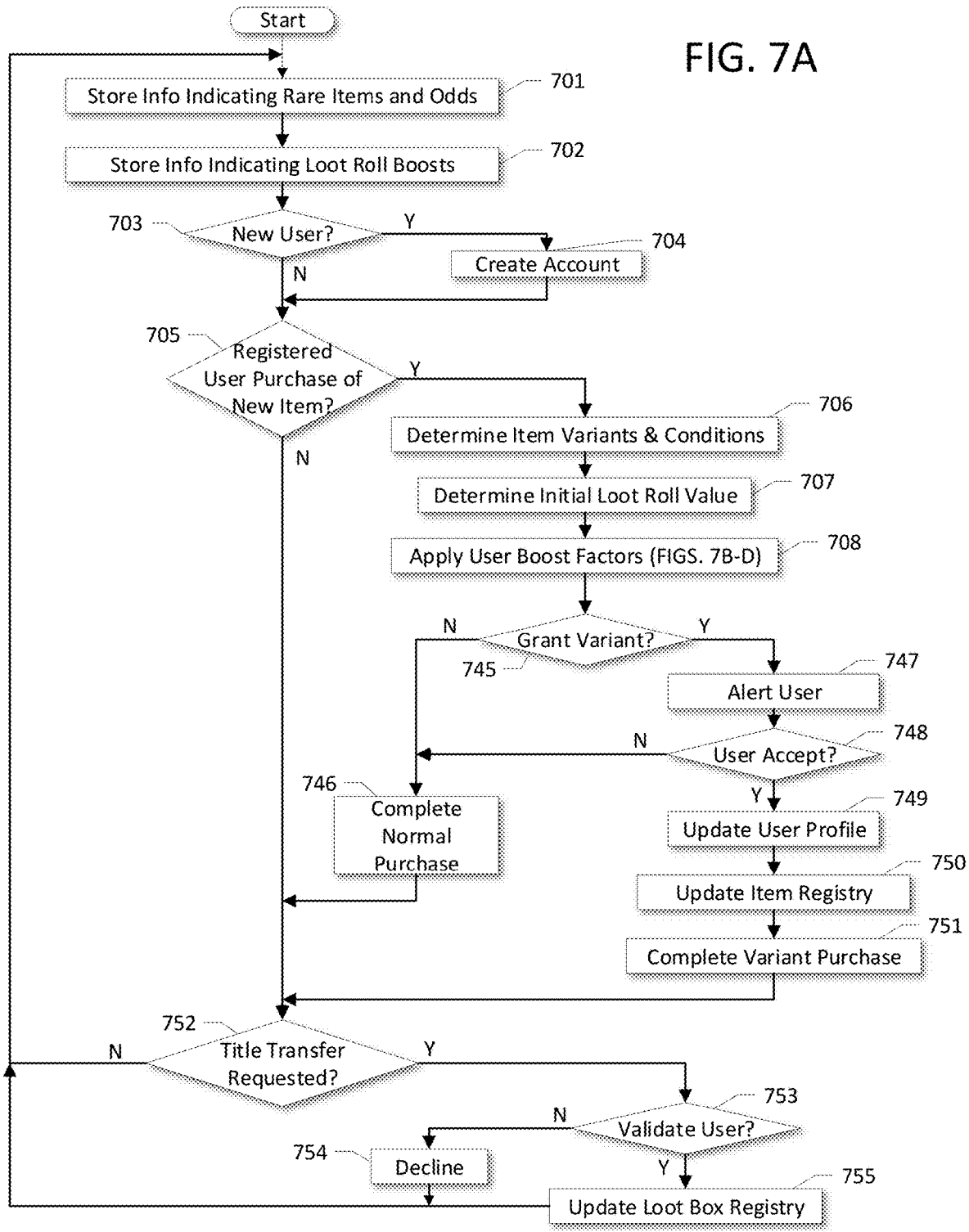
FIGS. 7A, 7B, 7C, and 7D show an example algorithm for a probabilistic grant of an item variant.
Figure 7B:
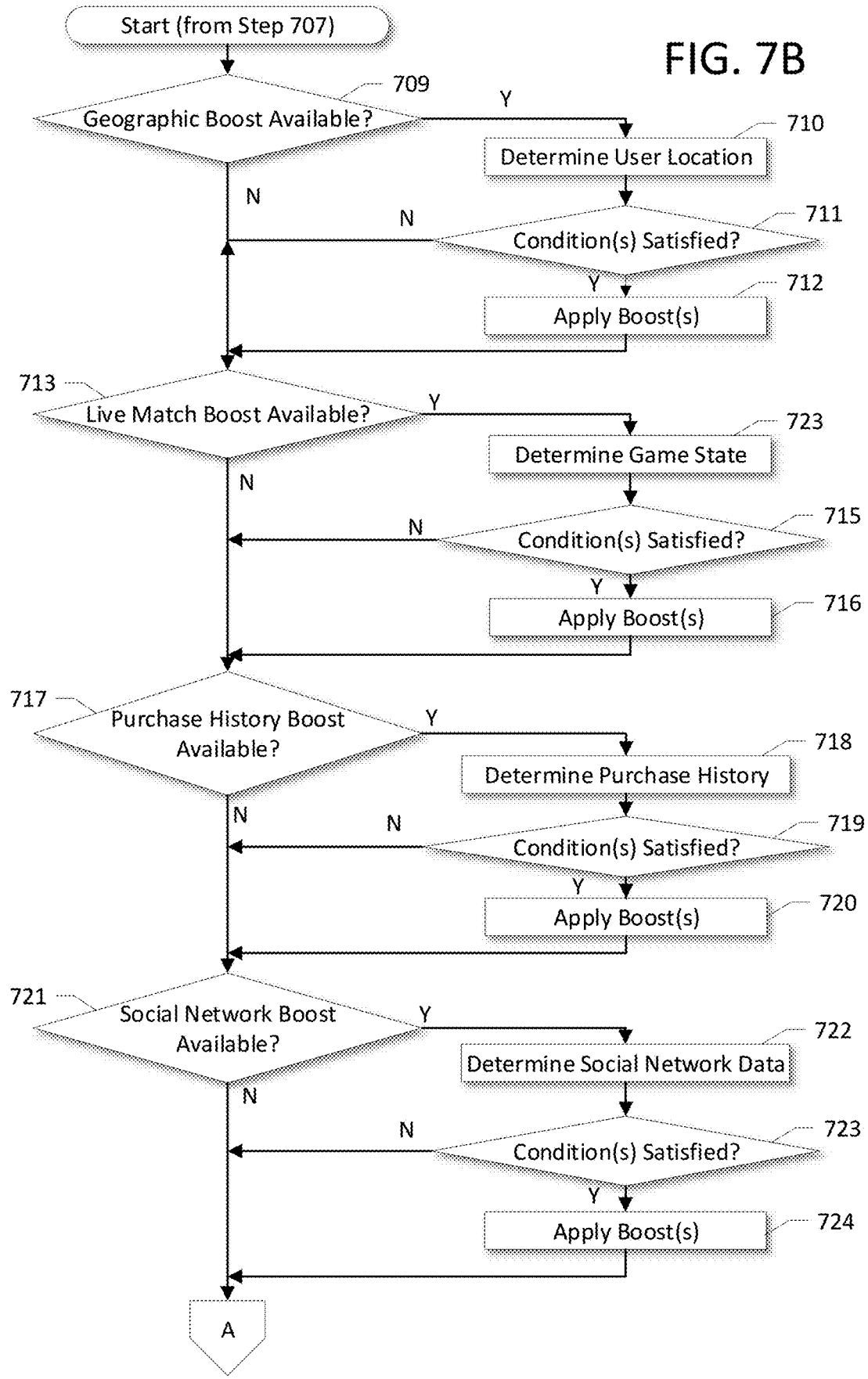

FIGS. 7A and 7B show an example algorithm for a probabilistic grant of an item variant. The various steps may be performed by the retailer server 120, application server 116, or any other desired computing device. In step 701, the process may begin with storing loot information (e.g., in loot server 125) indicating the various items, their variants, descriptions of the variants, their associated odds of acquisition, and rarity. The table 400 may be an example of this loot information. The creation and storage of the loot information may be performed by a user administrator, although some or all may be created automatically as well.

In step 702, boost information indicating various random value boosts may be stored. The FIG. 6 boost table may be an example of the boosts indicated by this boost information. The boost information may indicate a boost by name, its amount of boost, and the various rules and/or conditions that may be used to determine if a user is to be awarded a particular boost. The FIG. 6 boost table shows a textual description of the rules and/or conditions, and the boost information may also comprise (or indicate) computer-executable instructions for applying the rules and/or conditions. For example, computer-executable instructions may indicate an address of a process or server that maintains state information for a particular match (e.g., player performance information, game status, game location, etc.), a user's purchase history (e.g., times, places, items, prices, etc. associated with past purchases), a user's demographic information, a user's exercise history, a user's social network (e.g., number of followers, identification of friends, etc.), and/or any other information source for applying a desired rule and/or condition, and may comprise instructions for retrieving the necessary information and applying the rule or condition.

In step 703, a determination may be made as to whether a new user has requested to register to participate in the probabilistic grant of items. A new user request may be made in a variety of ways. A new user may use a web browser to access a retailer server 120 web site, and the web site may comprise an option for new users to register, e.g., on loot server 125, which the user may use to create a new account and register to participate. A user may be added at a retail establishment, such as when making a purchase at a sporting goods store. The user may be assigned an electronic rewards "card" such as a cookie, profile, or other tag in a mobile phone and/or tagged to a user's account/profile at a service provider.

If a new user request has been received, then in step 704, a new account may be created for the user. This may comprise requesting and storing user information identifying the user and information that may be used to determine if any rules or conditions are satisfied. For example, the user information may identify an address (e.g., email address, device address, phone number, etc.) that can be used to obtain information indicating the user's current geographical location (e.g., by requesting GPS information from a user's smartphone), the user's purchase history, the user's social network, and various information discussed above. The user information may indicate the user's preferences, such as a favorite sports team, favorite team member, etc., which can be used to determine the user's eligibility for satisfying certain boost rules or conditions. The creation of the account may also comprise granting the loot server and/or retailer server 120 access to various sources of information needed for the random value boosts shown in the boost table 600. For example, the user may provide access credentials (e.g., username, password, etc.) for obtaining information from a fitness tracking application, social media account, purchase history, GPS information, etc.

In step 705, a determination may be made as to whether a registered user has requested to purchase an item that is subject to the probabilistic variant grant described herein (e.g., an item for which there are variants and probabilistic rules in table 400. This may occur, for example, if the user selects the checkout button 203 in an online purchase, or if the user otherwise acquires a new item from the retailer or its server 120. The acquisition is described above as a purchase, but it need not be a purchase. Any type of acquisition, such as a free gift or other reward, may qualify for a chance at an item variant.

In step 706, available variants of the item may be determined, and the associated rules from table 400 may be retrieved for use in determining whether the user will be eligible to receive a variant.

In step 707, an initial loot roll value (e.g., an initial probability value) may be determined for the user's purchase transaction. As noted above, the initial probability value may be a random value between 00.0 and 100.0. These values are merely examples, though, and any desired random value generation may be used. From the example shown in FIG. 5A, the user may have received an initial random value of 91.3. If the user has selected multiple items for purchase, a separate initial probability value may be determined for each item, or a single initial probability value may be determined for the entire purchase (e.g., one probability value for all items in the user's checkout cart).

In step 708, one or more boost factors may be applied to the initial probability value(s) from step 707. FIG. 7B illustrates a detailed view of an example algorithm for applying these boost factors. In step 709, a determination may be made as to whether a geographic boost is available for the item being purchased. The boost table 600 may indicate that one or more boosts are based on geographic information. For example, a boost may grant a 3% increase to the probability value if the purchase is completed from a location that is in a city that is hosting a sporting match or tournament. If such a geographic boost is available, the boost table 600 may indicate the geographic condition (e.g., identifying a ZIP code, GPS coordinate range, town, etc.), and in step 710, the purchasing user's geographic location may be determined. This may be performed, for example, by sending a request to a user's GPS-equipped smartphone, asking for the smartphone's current location. The location may be determined by performing a lookup based on the Internet Protocol (IP) address of a computing device that the user is using to complete the purchase transaction.

In step 711, a determination may be made as to whether the geographic condition (or conditions, if multiple geographic conditions are available) is satisfied. This may comprise, for example, determining whether the user's GPS coordinates are within an identified range of GPS coordinates from the boost table 600, or if the user's ZIP code (which may be entered by the user as part of the checkout process) matches a ZIP code identified in the boost table 600. If the geographic condition is not satisfied, then the process may proceed to considering the next boost condition in step 713. However, if the geographic condition is satisfied, then in step 712, the corresponding boost may be applied to the user's probability value. For example, a user's initial probability value of 91.3 may be increased by 3% to reflect the application of the boost. Other boosts described below may be applied in the same way, and in an accumulating fashion for all applicable boosts whose conditions are satisfied.

In step 713, a determination may be made as to whether a live match boost is available in the boost table 600. A live match boost may indicate a condition that is based on one or more events occurring in, or status of, a particular event such as an esports match. For example, a live match boost may require that a purchase is completed while an esports match is ongoing, or during halftime of the match (a particular time point in the match), or within a predetermined time range of an event occurring in the match (e.g., within 10 minutes of a particular team's player recording a 15+ kill streak in a match, or within 15 minutes of a conclusion of a championship win, etc.). If no live match boost is available, then the process may proceed to step 717 and process the next boost type. If a live match boost is available, then in step 714, a request may be sent to a computing device that tracks the current progress of games. For example, retailer server 120 may send a message to eSports streaming server 123, requesting information indicating the current state of a particular esports match that is relevant to the available game state boost (e.g., the killstreaks attained, the players' statistics, the game's score or time remaining, etc.). The game state information may be obtained in a variety of other ways. For example, the retailer server 120 may subscribe to a real-time data feed that provides up-to-date information regarding events, such as services that provide player statistics for fantasy football during live football games.

In step 715, a determination may be made as to whether the game state information satisfies the condition(s) associated with a live match boost. If a condition is satisfied (e.g., a time associated with a current purchase falls within a 15-minute window following the conclusion of a championship match), then in step 716 the corresponding value boost may be applied to the user's probability value.

In step 717, a determination may be made as to whether a purchase history boost is available in boost table 600. For example, a purchase history boost may grant a boost based on a quantity of purchases made by the user within a time period, such as the previous 90 days. The purchases may be made via retailer server 120, or via any other associated service in communication with the retailer server 120. If no such boost is available, then the process may proceed to step 721 to process the next boost type. If a purchase history boost is available, then in step 718, the user's purchase history may be determined. This may be accomplished, for example, by examining a profile or user record, for the user, maintained by the retailer server 120.

In step 719, a determination may be made as to whether the purchase history boost condition is satisfied (e.g., if the user has made one or more purchases in the last 90 days). If such a condition is satisfied, then in step 720 a corresponding boost may be applied to the user's probability value.

In step 721, a determination may be made as to whether a social network boost is available in boost table 600. A social network boost may grant a boost if one or more social network conditions are satisfied. For example, one social network boost may be granted if the user has a minimum number of followers or friends on a social network platform. Another social network boost may be granted if one or more of the user's friends have also made a purchase. If a social network boost is available, then in step 722, the relevant social network data may be retrieved. This retrieval may comprise sending a request to a social media server 121, requesting information regarding the user's social media account (e.g., number of followers or identity of friends).

In step 723, a determination may be made as to whether the user's social media data satisfies the relevant social media boost condition(s). For example, it may be determined that the user has a quantity of friends or followers that exceeds a minimum number indicated in the social network boost condition. If the social network boost condition is satisfied, then in step 724, the corresponding boost may be applied to the user's probability value.

In step 725, a determination may be made as to whether a calendar boost is available in boost table 600. A calendar boost may grant a boost if the purchase is made during certain predetermined time periods. For example, a boost may be granted if the purchase is made after 6 pm on Thanksgiving, on the user's birthday, or after the user's 1-year anniversary since registering for the probabilistic grant service. If a calendar boost is available, then in step 726, the relevant calendar data may be retrieved. This may comprise retrieving the current date, a list of holidays, the user's birthday or date of registration, etc.

In step 727, a determination may be made as to whether any calendar boost conditions are satisfied, and if so, then in step 728 the corresponding boost(s) may be applied to the user's probability value.

In step 729, a determination may be made as to whether a health boost is available in the boost table 600. A health boost may require certain health monitoring characteristics of the user. For example, if a user performs a physical feat, such as running a mile in under 8 minutes, or exercising for 7 consecutive days, then the user may be granted a health boost to their probability value. If a health boost is available, then in step 730, the user's health monitoring data may be retrieved. This may be accomplished, for example, by sending a request to a health monitoring app or a fitness tracker used by the user.

In step 731, a determination may be made as to whether any health boost conditions are satisfied. If any such conditions are satisfied, then in step 732, the corresponding boost(s) may be applied to the user's probability value.

In step 733, a determination may be made as to whether any photographic boosts are available in the boost table 600. A photographic boost may require that a user provide a certain image (e.g., photograph) as part of the purchase transaction. For example, users may be encouraged to take a picture of themselves, a "selfie," at the site of a game, or with merchandise supporting their favorite esports team. To help with identification, a quick reference (QR) code may be provided at the site of a game, or on certain merchandise, and the user may take a photograph of themselves with the QR code in the photograph. The user may then upload the photograph as part of the purchase transaction, such as by using an "Upload Photo for Loot Boost" option 207 in the checkout screen of FIG. 2B.

If a photographic boost is available, then in step 734, the relevant photographic data may be retrieved. This may comprise, for example, retrieving a selfie photograph that the user uploaded, and accessing a database of approved QR codes. Object recognition may also be used (e.g., encouraging users to take photographs of certain kinds of objects, such as an animal based on a sports team mascot), and a database of recognized objects may also be retrieved in order to perform object recognition on a photograph that the user uploaded.

In step 735, a determination may be made as to whether the user's uploaded photograph satisfies the photo condition(s) (e.g., if a required QR code or object is recognized in the photograph). If a photo condition is satisfied, then in step 736, a corresponding boost may be applied to the user's probability value.

In step 737, a determination may be made as to whether a network boost is available in the boost table 600. A network boost may be granted based on network conditions. For example, the network boost may be granted if the user making the purchase is accessing the retailer server 120 via a certain network provider, or if the user is making the purchase via a walled garden service 119 that corresponds to the retailer server 120. A network boost may reward users who subscribe to particular wireless carrier services.

If a network boost is available, then in step 738 relevant network data may be determined. This may comprise, for example, determining a user's wireless carrier, Internet Service Provider (ISP), content/service subscriptions, network speed or bandwidth, etc. In step 739, a determination may be made as to whether the determined network data satisfies any network boost conditions indicated in the boost table 600. In the FIG. 6 example, a user may receive a +0.75% boost if the purchase is completed via a particular ISP (ACME). If a network boost condition is satisfied, then in step 740, a corresponding boost may be applied to the user's probability value.

In step 741, a determination may be made as to whether a content history boost is available in the boost table 600. A content history boost may be granted based on the purchasing user's prior usage of content. For example, a content history boost may be granted if the user watches a predetermined minimum number of episodes in a video program, or if the user has achieved a certain progress level in playing a video game (e.g., reaching a point in the game, completing the game, playing a game for at least 40 hours, receiving an achievement or trophy, etc.).

In step 742, a user's relevant content history may be retrieved. This may comprise, for example, sending a request to a gaming server 122 (or a gaming server in walled garden 119) along with (if desired) access credentials. The gaming server 122 may verify the credentials and respond to the request by providing information indicating the user's viewing history, video game history, etc. as needed to determine whether the content history boost conditions are satisfied.

In step 743, the content history information may be compared with the content history boost conditions, and if a condition is satisfied, then in step 744 a corresponding boost may be applied to the user's probability value.

The above discussion addresses several example types of boosts and conditions that may be applied, but those are merely examples, and other types may be applied as well. Also, the various boosts and conditions above may be applied in combination as well. For example, a single boost may comprise geographic and match state conditions. A single boost may comprise geographic, match state, and social media conditions. Any of the examples above may be used in combination.

In step 745, the user's probability value, to which the various applicable boosts have been applied, may then be compared against a loot table 400 to determine whether the user is to be granted a variant of the item(s) selected for purchase. In the FIG. 4 example loot table 400, a boosted probability value between 00.0 and 91.9 would result in no variant being granted. If no variant is to be granted, then in step 746 the user's purchase (or other item acquisition transaction) may be processed as normal. For example, the user may proceed to provide payment information and confirm the purchase, and the item would be processed for delivery pursuant to the purchase terms (e.g., arranged to be delivered via a selected shipping procedure, shipped, etc.).

In the FIG. 4 example table 400, a boosted probability value between 92.0 and 100.0 would result in the user being granted a variant of the item that was selected for purchase. If the user is lucky enough to be granted a variant, then in step 747 the user may be alerted to the lucky event. The user may be presented, for example, with the screen 204, which may inform the user the details of the variant item. In the FIG. 4 example, the screen 204 indicates the original product details, and adds details regarding the rarity, production run, and product differences of the variant item that the user has been granted.

The user may be presented with an option to accept 206 or decline 205 the variant item, and in step 748 a determination may be made as to which option the user has chosen. If the user prefers to receive the original item instead of the variant, then the user may choose to decline the variant, and in step 746 the purchase of the common item would be processed. If the user prefers to accept the variant item, then in step 749 the user's profile data may be updated to indicate that the user has acquired the variant item. In step 750, the item registry may also be updated to indicate that the user has acquired the variant item. The registry may be updated to indicate the user identification (e.g., username), the date and/or time of the acquisition, and descriptive details of the item variant that the user has acquired. The registry may comprise the information shown in the ownership history screen 300 for each variant item.

In step 751, the purchase of the variant item may be completed. This may comprise the same steps as in the normal purchase 746, although additional treatment of the variant item may be provided. For example, the shipping may be performed using a different method (e.g., prioritized delivery as opposed to standard delivery), the packaging of the variant item may be different (e.g., different labeling, colors to indicate variant), etc.

A user may wish to transfer ownership of the variant item. For example, rare variant items may be collectible and desirable, and demand may be high on a secondary or resale market. In step 752, a determination may be made as to whether a title transfer request has been received. A user may have decided to offer their rare variant item for sale, for example on a secondary reseller site or auction site, and the user may log into the retailer server 120 to request an update in the ownership status. The user may view the item registry screen 300, and may select a Record New Transfer option to enter details (e.g., date, time, new owner, etc.) for a transfer of ownership of the variant item. The reseller site (which may be retailer server 120 or another similar server) may be provided with the selling user's authentication information as part of the sale listing for the variant item, and the reseller site may automatically log into the retailer server 120 and update the ownership information as part of processing a resale transaction of the variant item. A new user purchasing the item from the reseller site may provide the reseller site with their own identification information (e.g., username), and may also provide authentication credentials for retailer server 120 if the new user also has an account.

If a title transfer request has been received in step 752, then in step 753 a validation determination may be made to verify that the request is legitimate. The validation may comprise requesting and receiving a username and password from the user, as well as information identifying the variant item (e.g., a serial number, item number, name, etc.). The item registry may be checked to determine if the identified user is indeed the current registered owner of the identified item, and the password may be checked to verify that it is the correct password for the user. Other forms of validation and/or authentication, such as security certificates, biometric (e.g., fingerprint, optical, facial recognition, etc.), and others may be used as well for validating the user identity.

If the validation fails, then in step 754 the title transfer request may simply be denied. If the validation is successful, then in step 755 the item registry may be updated to indicate the new owner and the date/time of the transfer. Other details, such as the sale price, may also be stored in the item registry.

In step 756, a user's general loyalty level may be updated using any and/or all of the various boosts discussed above (e.g., purchase history boost 717, social network boost 721, etc.). The user may be provided with an option to view their own loyalty status, and see the current boost(s) that would be applied if they were to make a purchase. This visibility may further encourage participation in the various boosting events, as the user may be encouraged to increase their boost level for future purchases, and may be informed as to new missions, quests, boost conditions, etc. to pursue.

As may occur with item acquisition transactions, users may sometimes change their mind about an item. A user who has received a rare variant item may request to return the item for a refund. In such a situation, the user may be given the option to apply their boosted probability value towards obtaining a different item. For example, a user who received a rare variant of a sweatshirt, may later (either after receiving the item, or even earlier such as in step 748 when accepting the item) decide to obtain a different item instead. To help avoid abuse, the application of a user's boosted probability value may be limited to items having an equal or lesser cost of the original item that was purchased. For example, if a user purchases a low-cost item such as socks, and gets a lucky probability value, the user may be entitled to receive a Legendary rarity version of the socks. But if the user wishes to exchange the socks for a more expensive item, such as a sweatshirt, the user may be limited to receive only a common version of the sweatshirt because the sweatshirt is more expensive than the socks. The probability value, which may be stored as part of the retailer's record of the transaction, may be adjusted based on a difference in cost or value between the exchanged item and its replacement, to determine whether the user will receive a variant version of the replacement item.

To further facilitate user engagement, some users may be given the option of giving advance approval to automatically purchase a particular variant item if the user satisfies certain conditions associated with the variant. For example, a user may request to automatically purchase a particular player's variant sweatshirt if a boost condition involving that player (e.g., scoring a minimum number of points in a match) is satisfied.

Figure 8:
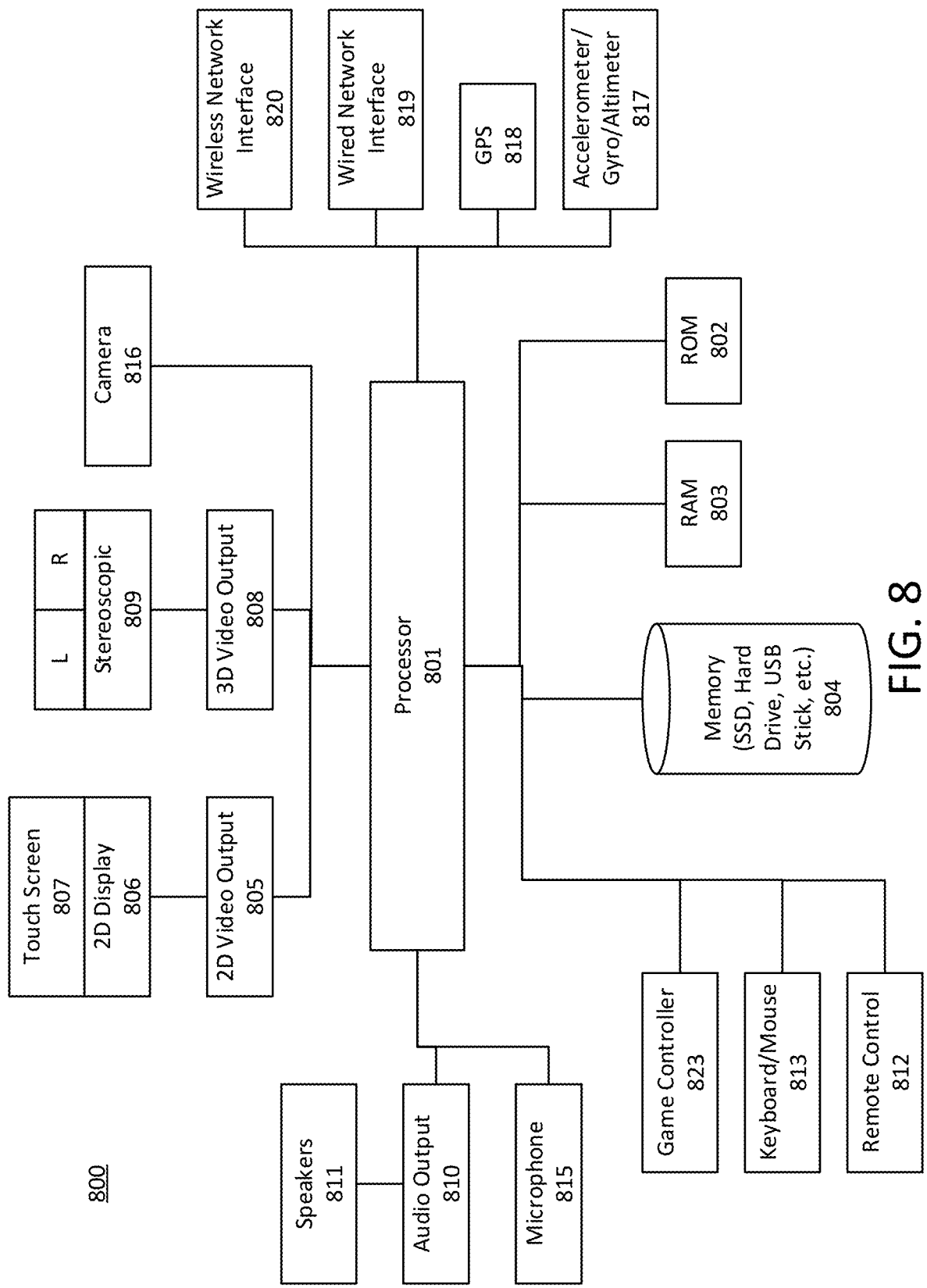
FIG. 8 shows example hardware elements of a computing device.

FIG. 8 shows hardware elements of a computing device 800 that may be used to implement any of the computing devices shown in FIG. 1 and any other computing devices discussed herein. The computing device 800 may comprise one or more processors 801, which may execute instructions of a computer program to perform any of the functions described herein. The instructions may be stored in a read-only memory (ROM) 802, random access memory (RAM) 803, other memory media 804 (e.g., a USB drive, a compact disk (CD), a digital versatile disk (DVD)), and/or in any other type of computer-readable medium or memory. Instructions may also be stored in an attached (or internal) storage (e.g., a solid-state hard drive, disc hard drive, etc.) or other types of storage media.

The computing device 800 may comprise one or more video output options. For example, a two-dimensional video output circuit 805 may provide video output signals to a two-dimensional display device 806 (e.g., television, display monitor, integrated display, etc.), which may comprise a touch sensitive screen 807. A three-dimensional video output circuit 808 may provide stereoscopic video output signals to a stereoscopic three-dimensional display 809 having left- and right-eye display capabilities, such as a head-worn display, goggles, or other stereoscopic display. Audio outputs may also be provided by audio output circuitry 810 to various speakers 811.

The computing device 800 may comprise various input devices, such as a wired or wireless remote control 812, keyboard and mouse 813, video game controller 814, etc. A microphone 815 may capture audio sounds, and a camera 816 may capture video images. An accelerometer/gyroscope/altimeter 817 may provide acceleration, orientation, and altitude information for interaction involving tilting or moving the computing device 800. A global positioning system (GPS) 818 may determine a geographic location of the computing device 800.

The computing device 800 may also comprise one or more network interfaces to communicate with local and/or remote external devices. A wired interface 819 may comprise Ethernet, Universal Serial Bus (USB), coaxial, optical fiber, radio frequency (RF), power line network, etc. wired connections to various devices and networks, and a wireless interface 820 may comprise cellular (e.g., 2G, 3G, 4G, LTE, 5G, etc.), wi-fi, IEEE 802.11, WiMax, Bluetooth, satellite, etc. wireless connections to various devices and networks. The network interfaces 819/820 may comprise a modem to modulate and demodulate data for transmission and receipt.

The computing device 800 may also comprise other sensors, such as a magnetometer, a digital compass, a proximity sensor, an ambient light sensor, a pedometer, a barcode/QR code sensor, a barometer, a thermometer, an air humidity sensor, a heart rate sensor, a biometric sensor (e.g., a fingerprint sensor, an eye scanner), a Near-Field Communication (NFC) receiver, etc. The computing device 800 may also comprise a radio signal receiver, such as an FM tuner.

Although FIG. 8 shows an example hardware configuration, it is only a nonlimiting example. The illustrated elements may be combined, duplicated, separated, and otherwise altered as desired. One or more of the elements of the computing device 800 may be implemented as software or a combination of hardware and software. Modifications may be made to add, remove, combine, divide, etc. components of the computing device 800. Additionally, the elements shown in FIG. 8 may be implemented using basic computing devices and components that have been configured to perform operations such as are described herein. For example, a memory of the computing device 800 may store computer-executable instructions that, when executed by the processor 801 and/or one or more other processors of the computing device 800, cause the computing device 800 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 7C:
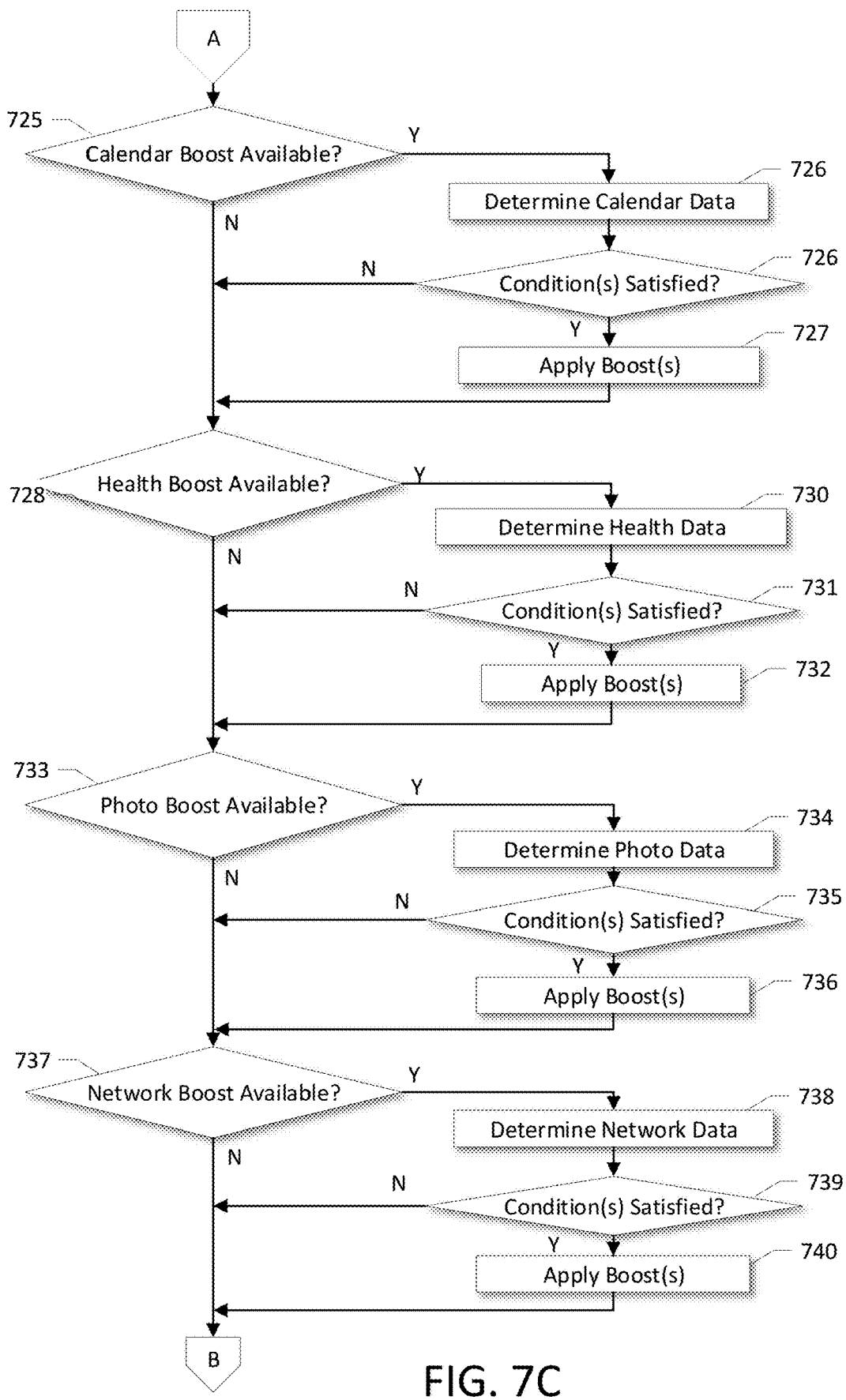
Figure 7D:
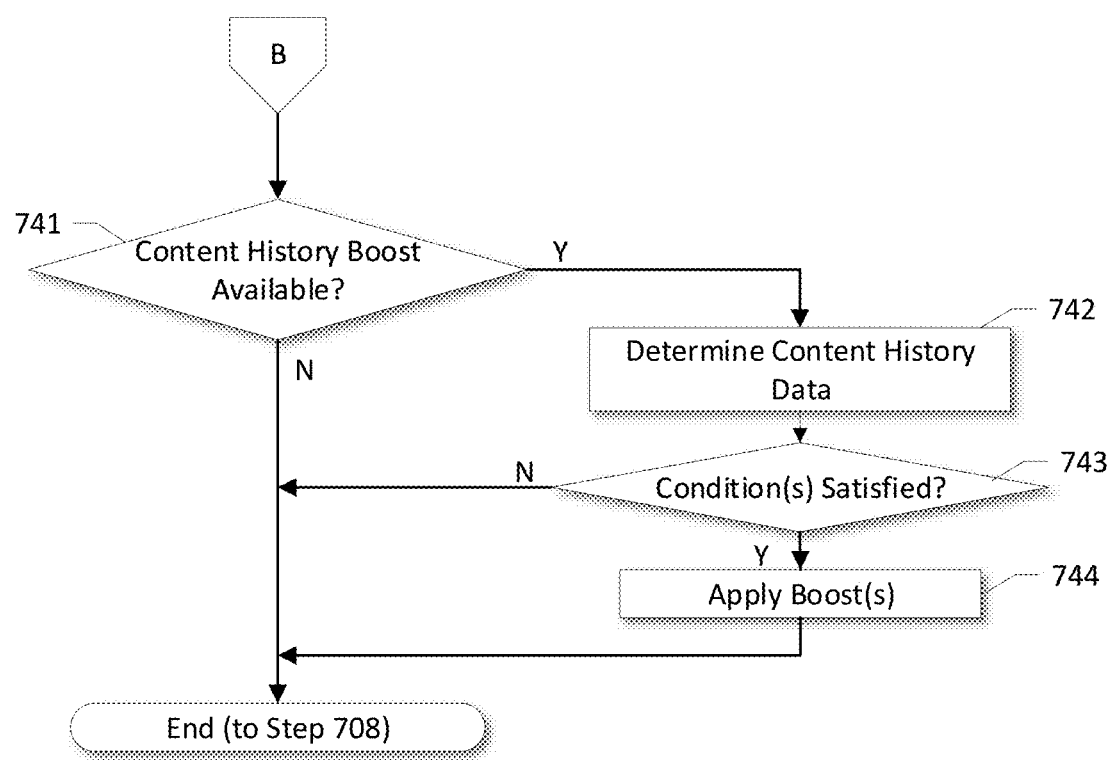

While FIGS. 7B-7D illustrate various boosts that a user may receive, additional examples include, but are not limited to, the following: 1) how many times has this user purchased a particular product (e.g., higher boost if the user purchases a particular product more than a 10 quantity of times), 2) the cost of the purchased product or service (e.g., different boosts for basic vs. higher tiers of cost), 3) the particular supplier (e.g., different boosts for different suppliers of a particular product or service), 4) how many other services are used from one or more related suppliers (e.g., higher boost if the user subscribes to services from a predetermined set of service providers), 5) demographics of user such as age, income, location, time of the day, 6) environment associated with the interaction with the user such as in-stadium purchases or in-theme park purchases, 7) holidays (e.g., Christmas bonus), 6) reoccurring sales (e.g., high VOD purchases), 8) determinations of loyalty levels (e.g., strong positive feelings toward the service provider), 9) social media interactions (e.g., higher boost for positive feedback via Twitter, Instagram, Linkedin, Facebook, etc.), and 10) other relevant factors such as those associated with targeted advertising metrics. A service provider can leverage cross-platform metrics such as use of wireless, home security, solar, universal parks, and other products and services offered by the service provider. A service provider can monitor using an anonymized server to gauge, and encourage a user to improve his or her loyalty score. A service provider offering Internet service may use deep packet inspection techniques to monitor a user's data traffic, and may use this traffic to adjust the user's boost values as described above.

A user who creates a large "buzz" on social media and other outlets around the product or service can obtain a positive feedback effect and increase his or her odds of winning another rare item. The "buzz" factor can be feedback into the loyalty probability algorithm as a boost factor, such as in evaluating the social network boost 721, and hence increase the user's probability of receiving another rare item. This, in turn, increases the chances of generating more attention and free advertising for the product or service.

Information obtained from the loyalty and rewards program can then be feedback into the cross-platform system confidentially in an anonymized manner to improve metrics for such purposes as cross-platform targeted advertisements. For example, where the user chooses a rarity item associated with a particular character or particular sports team, they may be used to provide more relevant advertisements to the user such as ads associated with the sports team or new shows featuring the character.

Cross-platform technology can automate the loot processes and find relevant metrics that otherwise wouldn't be available. For example, the loot server 125 may be configured and enable by the user to track brand loyalty of customers across multiple platforms including such items as content, gaming, retail, sports teams (including e-sports teams), arenas, service providers, telecommunication providers, streaming video providers, social media, theme parks, etc. The loot server 125 can then transmit rewards via advertisements, retail purchase pages, joint promotional programs, and/or directly to the user across multiple platforms including streaming games and video programs to build brand loyalty and increase user engagement.

The loot server 125 may track loyalty factors inside and outside the walled garden 119 using metrics like have you shopped with us before, have you made purchases with us before, purchases within certain geographic locations (purchases in a stadium in Philadelphia this week and Universal Park the following week generates a probability bonus). The loot server 125 can also (with user permission) use geolocation information in, for example, a mobile phone or smartwatch and various purchases such as using APPLE PAY™ or cooperative arrangements with retailers such as Amazon.com or sports teams like NHL.com. Similarly, social components may provide a boost to the user within loot server 125. For example, if you encourage your friends or followers to do or buy something (attend Universal Park or go to Flyers game), there could be a boost towards granted to you and your friends, but you all have to sign up and do it at the same time—which allows the loot server to increase your boost score. Additionally, the loot server 125 may work cooperatively with other servers (e.g., each of the servers within the walled garden 119) and/or content server 114, advertisement server 115, application server 116, social media server 121, retail server 120, gaming server 122, eSports streaming server 123 and/or video on demand server 124 to create missions that can be assigned to a user or groups of users (e.g., e-sports teams) to boost probabilities such as going to a specified restaurant and take a photo with the restaurant owner, going to a soccer match and taking a photo behind the net, etc. The loot server 125 and/or advertisement server 115 may structure these missions in either the real world or in the virtual world like once you get to a certain level of a game, you receive loyalty rewards or watched this X many episodes of a show. For example, if a team of Philadelphia Fusion fans achieve a difficult collective mission to achieve a virtual goal, the loot server 125 may increase their odds of winning a rare item (e.g., box seats) at an associated Fusion event. Once the mission is completed and authenticated, the loot server 125 may provide a boost whether it's a short term boost or a permanent boost depending on the complexity of the mission. The loot server 125 may be configured to allow boosting factors (e.g., missions for restaurants) to be auctioned off to retailers using common targeted software applications such as those offered by Canoe Ventures and/or Google Ads/Google Display Network via the advertisement server 115. For example, the owner of the advertised product or service (e.g., restaurant) may contribute monetarily to the rare item in addition to paying for the opportunity to participate in the mission. The advertisement server 115 may communicate these opportunities to various cross-platform entities and then feedback the opportunities to the loot server along with a shared revenue stream. For example, the loot server 125 may offer an extremely rare item to the advertisement server 115 capable of generating a great deal of online "buzz" and hence a greater level of exposure for the sponsor. The advertisement server 115 can auction off this rare item to a sponsor for a joint promotion. The loot server 125 may receive a portion of the proceeds for creating and promoting the rare item and offering the rare item as part of the loot process.

Cross-platform metrics may be utilized by the loot server 125 to foster loyalty and rewards systems and methods (including sponsorship and rewards) to create a more robust echo system to increase user engagement across a wide variety of products and services and leverage online and social media "buzz" to maximize impact and minimize overall costs from a particular marketing campaign. These techniques are particularly applicable to service providers who typically offer a wide range of products and services. For example, where the service provider owns a stadium or sports team, the loot server 125 may interface with the retail server 120 associated with the stadium and/or sports team (assuming user permissions) to monitor metrics such as tickets purchased, how many times they play games associated with the team, promotions on social media, and time spent watching games and/or associated programming. In this manner, the most loyal customers may be rewarded appropriately using cross-platform metrics collected by loot server 125.

Users who check in as a guest (e.g., without a registered account from step 704) are unlikely to obtain rare items or simply may be prohibited from obtaining a rare item depending on the rule set and probabilities set in the loot server 125. Users who register with the loot server 125 such as providing their e-mail and permissions to access certain loyalty information, the users can boost their chances of obtaining a rare item or other loot. If the user provides his or her Twitter, Discord, Instagram, Facebook, and/or other socials, then the user can obtain an additional boost depending on the magnitude of their presence on social media. The loot server 125 can give additional boosts for users which go on missions and/or demonstrate enhanced loyalty to the system. The loot server 125 may provide added boost values depending on the number of followers a user has and the extent to which the user promotes a particular game, team, event, program, product, mobile service provider, and/or other service. The loot server 125 may, for example, weigh users with a larger following more. The loot server 125 may, for example, leverage its cross-platform information to determine that a user has the service providers mobile device, is at the service providers game, bought tickets through the service provider, and reward the customer for his or her loyalty in unique ways in order to build brand loyalty. Further, service providers could interconnect various loot servers 125 and advertisement servers 115 with other service provider's loot servers and advertising servers (not shown) to share loyalty rewards across platforms such as XFINITY teaming with Verizon or other NHL teams to cross-promote certain products or services and share advertising revenue and potential loot. This can be done in an automated way to create a robust market place with national and international reach.

For example, the loot server 125 could arrange for a quest for dinner or a photo with one of the players and build out challenges and tasks (e.g., using Gaming server in the walled garden 119 and/or eSports streaming server 123) designed to give one or more users a quest. The quest can be in the real world or the virtual world and any variation in between to keep the process interesting. Additional, a reality TV show can track the quest of the real-life teams and promote the quests. By varying the design of the quests and loot process, the loot server 125 can help keep the process interesting and maintain the buzz about the loot options.

Additionally, the loot server 125 may tie expensive buys such as a suite at Comcast Center to specialized loot such as a signed jersey or maybe a jersey signed by the whole team. It may not happen with every purchase, but as the loyalty score increases and the price of the suite increases, the probability of receiving a rare item also increases based on examples of the loot probability calculation in the loot server 125.

For video games, the loot may include virtual products in the video game that are unavailable otherwise such as a special gun or armor. In general, individuals and especially those who frequent social media typically are attracted to and work hard for things that are really unique and hence can become really valuable. The loot server 125 creates a market place for these unique and valuable items that can be authenticated.

The loot server 125 may be paired with identification technology such as a near field communication device, RFID device, security chip and/or other portable authentication device that can be read by a reader including a cell phone with or without an inductive charger. That database can be used and managed by the loot server in conjunction with the retailer, network, sports team, service provider, etc. so that items may be authenticated and transferred in the market place. The loot server 125 may also charge an authentication fee and provide insurance to ensure the items authenticity. The control and transfer of the items can be tracked using various technologies, including algorithms used by electronic currency such as the SHA-256 algorithm used by Bitcoin. In this manner, the loot server 125 may organize the transfer and authentication of rare items in the secondary market—increasing brand loyalty and the value of the rare items. Further, the team can track ownership and the really rare items or loot and super privileges, and hence determine additional loyal customers assuming they agree to enter into the system. With proper authentication, the loot server 125 can create and support an entire submarket and demand for virtual as well as merchandise products that are authenticated via technology (e.g., SHA 256 hash algorithm) and hence make the loot even more valuable by supercharging the secondary market for trading in those products. This process substantially increases brand loyalty and feeds back into the rewards process and creates greater incentive to participate.

The loot server 125 allows individuals to invest in the loot because the loot may go up in value over time, especially if a player retires or if the loot is truly unique. Where you have a player's ultra-rare jersey worn at a special game, then the value is going to skyrocket increase.

The loot server 125 over time can track of where their rarity items are going, how many are left in the world, and that can be used to create value and track value and to track from people who are all in on the game. For example, the loot server 125 may boost their loyalty points if they collect X number of legendary items. Increasing their loyalty points will make their chances of getting additional legendary items increased and hence build further brand loyalty.

The loot server 125 interacts with various other servers such as servers in the walled garden 119 and servers outside of the walled garden such as servers 120-124. When a user logs into his account, and for example buys a hoodie, a transaction is made to the loot server 125 via an application program interface (API) to determine if the user is eligible for a rare hoodie. If the user is eligible for the rare hoodie, and purchases the rare hoodie, the user can still return the hoodie if it does not fit and receive a different rare hoodie of a different size. The loot server 125 authentication, and loot registry 300, may be updated after a returned item is received—a vendor may verify that the returned item is indeed the one in the registry (e.g., by visual inspection, scanning a bar code or embedded RFID tag, etc.), and update the registry to indicate that the rare hoodie is in fact returned. Ideally, the user would be able to exchange a rare item for an item of comparable rarity (or even type, such as an exchange for different colors of the same rare hoodie) but if the user does not want an exchange, the user may be limited to receiving a nonrefundable credit, and the credit may be limited in its use. For example, the store credit might only be used to purchase other items of the same rarity as the returned hoodie. Such store credit might also be limited to purchasing items of equal or lesser value than the exchanged item—this restriction may prevent users who may try to game the system by purchasing large quantities of low-cost items (e.g., socks) in order to get a good random value for a rare item, and then trying to exchange that rare low-cost item for credit towards a rare high-cost item. So the loot server 125 allows flexibility in cases where it doesn't fit but prohibits gaming the system to up your rarity value.

A marketing team supports the loot server 125 with both advertisers and social media users to inform those involved of the availability of rare items. For example, if fans are on social media for a sports team and a rare jersey for the quarterback is being offered as loot, a lot of buzz through social channels may be created by letting the audience know of the availability of the jersey and how to increase the probability of winning the jersey. Winners would similarly be promoted. The goal would be to sell more jerseys and hence help market the team, improve brand loyalty, and increase the overall buzz around the team during the off-season.

The loot server 125 may promote certain products such as Universal Studios Theme Park tickets that allow the individual to bypass any lines for a year, meet the roller coaster designer, and/or go behind the scenes. Loyalty points (boosts) can be awarded through search history, past purchases, social media interactions, etc. The loot server 125 may be used to identity rarity and the sponsor, coordinate the authentication of the award in the third party market place and for the sponsor (e.g., Universal), facilitate the delivery and promotion of the rarity on social media and the news media, and operate the ecosystem in an efficient transaction. Universal can advertise the availability of the "super ticket" via advertisement server 115 in the ecosystem too, for example, 50 million subscribers using the Canoe Ventures platform. After a user has won one of the super tickets, it may be authenticated by the loot server 125, and then the winner can be promoted through further advertisements. The process can be coordinated and authenticated across multiple hardware and/or software platforms making for a low cost and efficient transaction.

The loot server 125 co-promote various entities for example, Universal and Nike who is coming on to the Canoe Ventures platform, and might say they want to reach a gaming audience, people who play this game or follow this esports team. They want to reach within this demographic and provide a promotion of a super ticket or willing to fund the loot either individually or collectively. The loot may be distributed based on loyalty points associated with the retailer whether that is Nike and/or Universal, and may include additional tasks such as playing this game or watching this Amazon TV series via streaming on an Xfinity platform, etc. For example, there may be a probability of winning Nike swag at your next visit to Universal theme parks.

After an individual registers on the loot server 125, the individual accrue anniversaries that give a higher boost. Further, more purchases and additional loyalty may unlock additional functionality on the storefront, so sometimes a user cannot see certain functionality until the user attains a certain level. This creates exclusivity and encourages people to reach a higher reward level—e.g., gold status. The loot server 125 can maintain track of loyalty across multiple outlets (e.g., Budweiser and Universal) and across joint reward ventures. In this way, a user is not required to have hundreds of reward cards, but a single account on the loot server 125. Loyalty points (boosts) may be tracked and promoted separately and with options for cross-pollination for different loyalty programs, vendors, teams, and service providers. By tying the loot server 125 to social media interactions, the most loyal customers that are promoting the service, have substantially increased probabilities of obtaining rarer loot. The loot server 125 probability system utilizes a variety of factors to maximize the buzz and provide transparency to explain rules and conditions for the loot rewards that the user may have received, and hence substantially increases the value of the rewards program by weighting online and social media and gaming feedback. With cross-platform metrics, the loot server can determine who's doing what online through deep packet inspection, tie that to individual users who have signed up through the loot server system to give permission to take a look at that data and then reward them appropriately. The people who are out there that have a million followers that are pitching a particular sports team, or game, or product or service get a much higher reward basis from the loot server 125. By adjusting the probabilities to weight and categorize social media interactions as favorable and promotional, the loot server 125 can increase loyalty and the reasons you should be tweeting about stuff or sharing things on Instagram to promote the product or service.

The loot server 125 creates a multiplicative impact to encourage social media users to promote their team, an important game, a network, a service provider, and/or other service. A user who has a large social media following may have a much higher probability of being awarded rarity items associated with that product that they are helping to promote. With that positive feedback, people will try to get those rare items, which may also create a secondary market to make those items more profitable. Thus, the loot server 125 using cross-platform metrics creates a new marketing technique and advertising echo system that is highly integrated, efficient, and creates positive feedback to encourage further support and allow items to go viral.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only and is not limiting.

For example, the example above applied boost values to the user's initial probability value. Additionally or alternatively, boost values may be applied to the table 400 itself. For example, a 3% increase to the user's probability may be implemented as a 3% decrease in the listed probabilities in table 400.

Figure 9A:
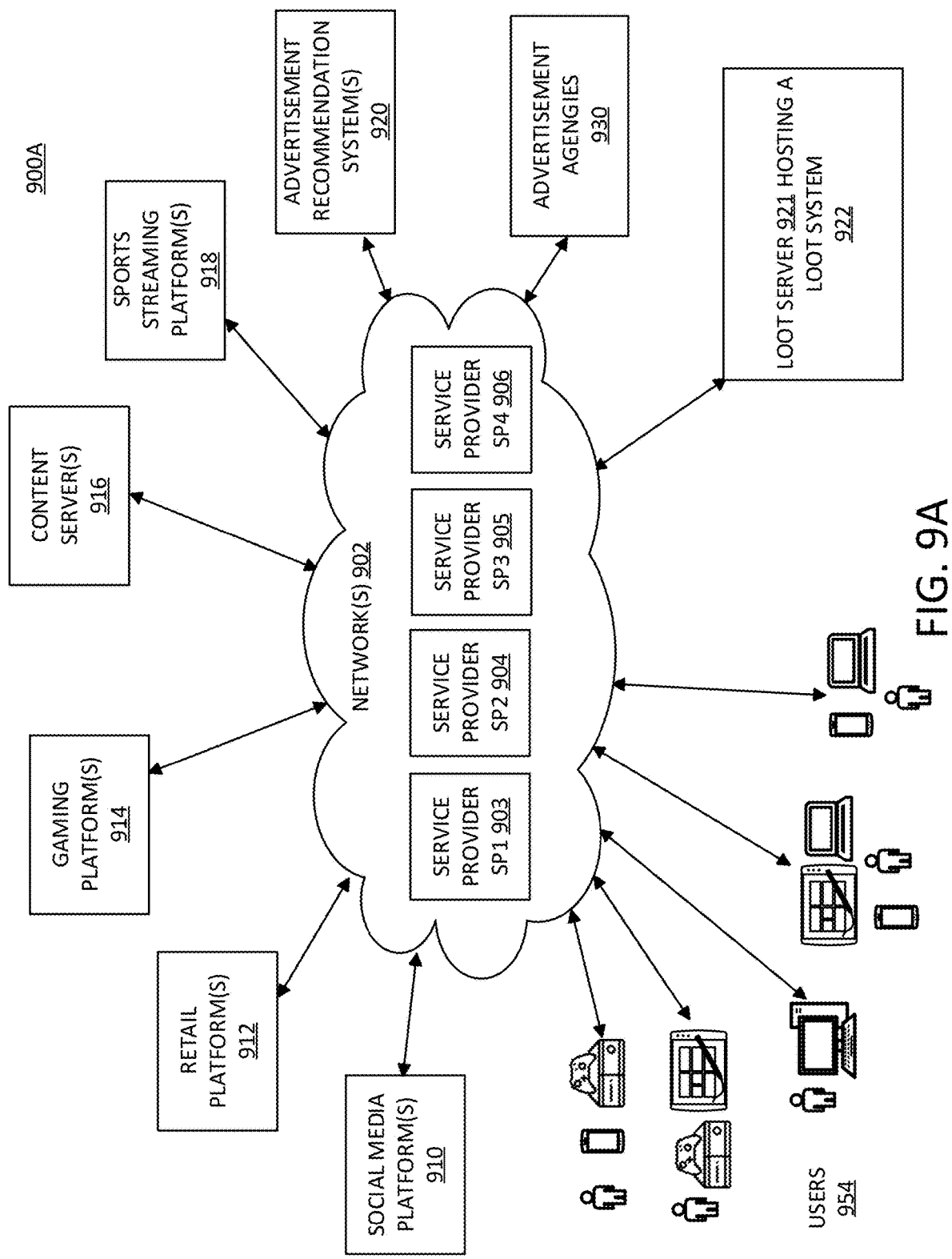
FIGS. 9A and 9B show architectural level schematics of environments that include loot systems.

FIG. 9A illustrates an architectural level schematic of an example environment 900A of system 100 where certain details are abstracted. The loot server 922 may be hosted in a cloud based system such as Amazon Web Services (AWS) and may be localized or distributed nationally or internationally and may include load balancing to handle multiple requests from large number of users. The environment 900 includes the network(s) 902 (e.g., the Internet, service provider networks 903, 904, 905, and 906 such as COMCAST, VERIZON, SPRINT, AT&T, T-MOBILE, STARLINK, GOOGLE FIBER, LAN, WAN, WiFi, wireless such as 5G and other networks), multiple social media platforms 910 (e.g., FACEBOOK, TWITTER, INSTAGRAM, LINKEDIN), retail platforms 912 (e.g., AMAZON, WALMART, BUDWEISER), gaming platforms 914 (e.g., OVERWATCH), content servers 916 (e.g., HBO, CNN, MSNBC, CBS, NBC, Netflix, AMAZON, APPLE, HULU), sport streaming platforms 918 (e.g., NFL, MLB, NBA, NLH, MANCHESTER UNITED), advertisement recommendation systems/support 920 (e.g., COMCAST TECHNOLOGY SERVICES, GOOGLE AD MANAGER, FREEWHEEL, VUBIQUITY), advertisement agencies 930, and a loot server 921 hosting a loot system 922. Users 954 may be connected to the loot server 921 through any suitable mechanism such as the network 902. Users 954 may include one or more individuals who utilize the functionality of the loot system 922 hosted by the loot server 921. Users 954 can interact with the loot system 922 through many devices including in some examples the following devices: a smartphone, a personal computing (PC) device such as a desktop or laptop computer, a media center device or other PC derivative, portable media consumption device (mobile terminal, personal digital assistant (PDA), gaming and/or media console, etc.), a tablet computer, television, gaming device, voice assistant, IOT device, consumer electronic device, or the like. In some examples, the devices of the users 954 may include an application for interacting and communicating with the loot system 922. For the sake of the current discussion, only five users are shown to be connected to the loot system 922 through the network 902. However, any number of users can be connected to the loot system 922 through the network 902. References to the users 954 may include their devices.

Network(s) 902 couple the users 954, the multiple social media platforms 910, the multiple retailers 912, the multiple gaming platforms 914, the multiple content servers 916, the multiple sport streaming platforms 918, the multiple advertisement recommendation systems 920, the advertisement agencies 930 and the loot server 921 hosting the loot system 922, all in communication with each other. The actual communication path through the network(s) 902 can be point-to-point, mesh, distributed, and span public and/or private networks, including the Internet.

The loot system 922 may interact with multiple social media platforms 910 in order to monitor the behaviors of the users 954 of the loot system 922 on the social media platforms. The loot system may award rare loot items to the users 954 based on their behaviors on the social media platforms 910. Examples of social media platforms include FACEBOOK, INSTAGRAM, OZONE, WEIBO, TWITTER, REDDIT, PINTEREST, TUMBLR, FLIKR, LINKEDIN, MEETUP, etc.

The loot system 922 may interact with multiple retail platforms 912 in order to monitor the purchase histories of the users 954 of the loot system 922. The loot system may award rare loot items to the users 954 based on their purchase histories and behaviors. Examples of retail platforms include AMAZON, TARGET, WALMART, MACY'S, NFLSHOP.COM, NHL.COM, FANATICS.COM, etc.

The loot system 922 may interact with multiple gaming platforms 914 in order to monitor the behaviors of the users 954 of the loot system 922 in the gaming platforms 914. The loot system may award loot items to the users 954 based on their behavior and winnings in the gaming platforms. Examples of gaming platforms include OVERWATCH, FORTNITE, LEAGUE OF THE LEGENDS, WORLD OF WARCRAFT, LEAGUE OF THE LEGENDS, PALADINS, STAR WARS BATTLEFRONT, etc.

The loot system 922 may interact with multiple content servers 916. The content servers 916 may be configured to provide content to the devices of the users 954. The content servers may provide, for example, video, audio, text, web pages, images, files, and so on to the users 954. The content servers 916 may be configured to broadcast live events to massive audience, video on demand, recorded content, and/or broadcast pre-recorded content. The loot system 922 may monitor the viewing histories and behaviors of the users 954 in the content servers 916 either directly via deep packet inspection and/or machine learning-based models. The loot system may award loot items to the users 954 based on their viewing behavior. Examples of content servers include NETFLIX, AMAZON PRIME, HULU, COMCAST, YOUTUBE, REDBOX, etc.

The loot system 922 may interact with one or more sport streaming platforms 918. A sport streaming platform provides a way to broadcast live sport competitions or video game competitions to the users 954. The most common video game genres associated with video game competitions are multiplayer online battle arena (MOBA), first-person shooter (FPS), fighting, digital collectible card games, battle royale games and real-time strategy (RTS). Popular video games played in the video game competitions include LEAGUE OF LEGENDS, DOTA 2 AND SMITE, COUNTER-STRIKE, CALL OF DUTY, CROSSFIRE, RAINBOW SIX SIEGE, OVERWATCH, STREET FIGHTER, SUPER SMASH BROS., MORTAL KOMBAT, SOULCALIBUR, etc. Examples of video game competitions include LEAGUE OF LEGENDS WORLD CHAMPIONSHIP, OVERWATCH LEAGUE, etc. Examples of sport streaming platforms for video games include Twitch, YouTube Live Gaming, Dailymotion Games, Smashcast.tv. ESPN, TBS, etc. Examples of live sport competitions include sporting events from Major League Baseball (MLB), the National Basketball Association (NBA), the National Football League (NFL), and the National Hockey League (NHL), U.S. OPEN (GOLF), U.S. OPEN (TENNIS), DAYTONA 500, etc. Examples of sport streaming platforms for live sports competition include StreamSports, WatchESPN, FuboTV, YouTube, etc.

The advertisement recommendation systems 920 may be configured to provide advertisement services associated with loot items and loot scores awarded by the loot system 922. The advertisements recommended by the advertisement recommendation systems 920 may be associated with and/or derived through the social media platforms 910, the retail platforms 912, the gaming platforms 914, the content servers 916, the sport streaming platforms 918, advertising agencies 930, advertising data providers, and/or service providers hosting/utilizing various networks 902. The advertisement recommendation systems 920 may store and provide advertisement files to be presented to users 954 with audio and/or video (e.g., audiovisual) programs, Internet access, video games, etc. The advertisement recommendation systems 920 may be responsible for formatting and inserting advertisements in a video stream being transmitted to devices of the users 954. The advertisements may be targeted to users 954 and/or their devices based on various demographic information, content consumption history, purchase histories, behavior in social media platforms, sports consumption history, device capabilities, and configurations, etc. Certain advertisements may only be available to users who have a certain loot score. For example, if the user has received enough boosts, the user may be provided advertisements for certain unique or difficult to obtain items. Examples of advertisement recommendation systems include the Project Canoe initiative including Comcast, Time Warner Cable, Cablevision, Cox Communications, Charter Communications, and Bright House Networks, Google Ads, Quantifi Digital, etc.

Advertisement agencies 930 may handle advertising and promotion of loot score and items for one or more retailers, gaming platforms, content server, service providers, and sports streaming platforms.

Figure 9B:
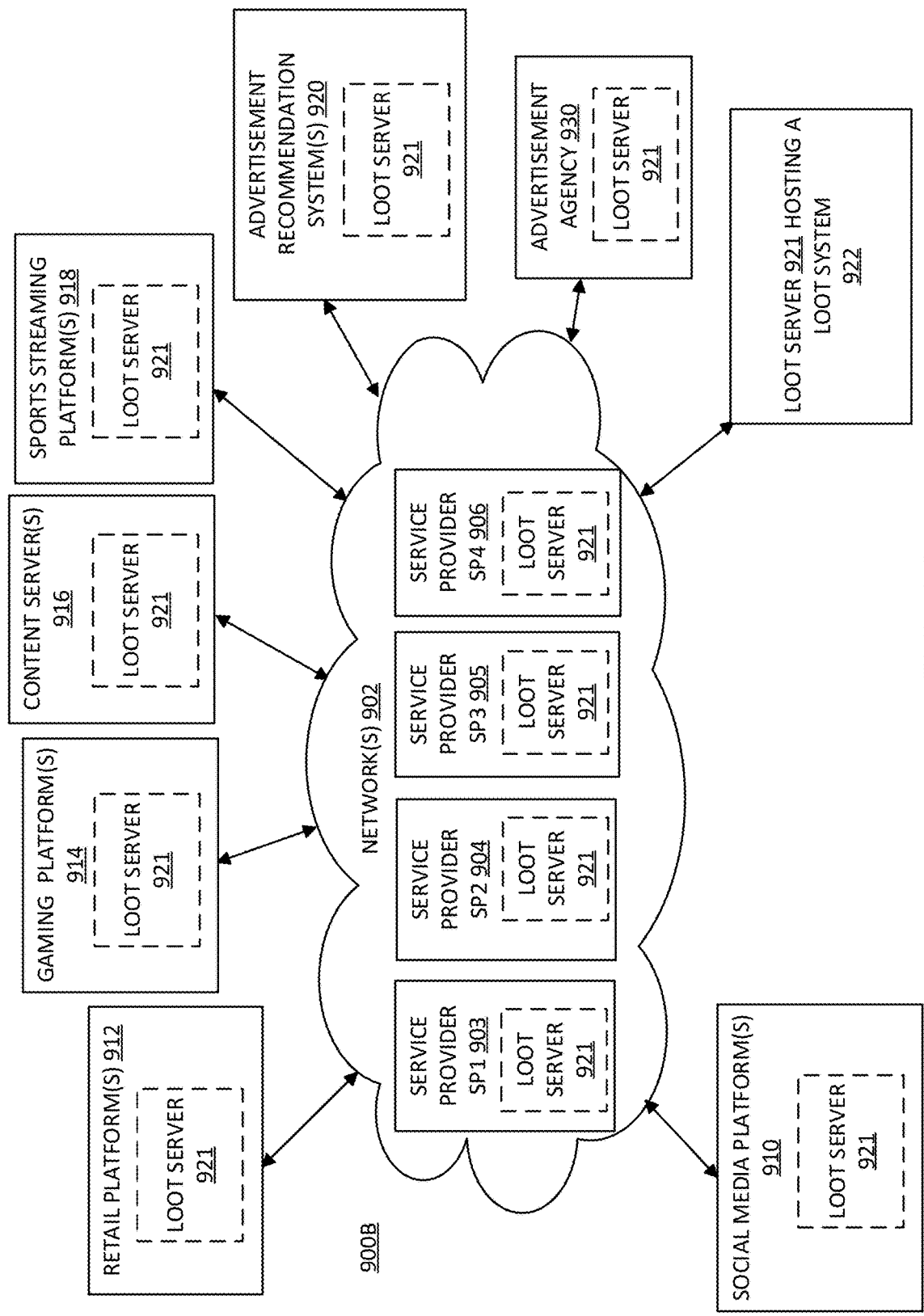

FIG. 9B illustrates an architectural level schematic of a second example environment 900B of system 100 where any of the multiple social media platforms, retail platforms, gaming platforms 914, content servers 916, sports streaming platforms 918, advertisements recommendation systems 921, and advertisement agencies 930 may be configured to host their own loot server 921 comprising a loot system. Content sources 916, gaming platforms 914, sports streaming platforms 918, retail platforms 912, social media platforms 910, and service providers 903-906 are all increasing in number and sophistication. For example, users and advertisers have a vast array and ever increasing choice of content sources 916, gaming platforms 914, sports streaming platforms 918, retail platforms 912, social media platforms 910, and service providers 903-906. The transaction costs for advertising agency to run a unified target advertising campaign across all of these various entities is ever increasing. Incorporating a loot server 921 in each of these entities (either directly or virtually e.g., in the cloud using services such as Amazon Web Services) reduces transaction costs for advertisers by creating a seamless architecture to share 1) loot (e.g., unique, rare, or more rate items) that may be offered by one loot server 921 to other loot servers 921 to use in an advertising campaign, 2) offers of classes of customers which may receive targeted advertisements (e.g., 500,000 households with an income level over $50K that live in certain zip codes), and offers of types of ad placement opportunities available (e.g., ads inserted in to various types of content such as VOD, games, social media and inserted in a particular fashion (video ads, static ads, product placements dynamically incorporated into scenes)), and/or 3)

requests to place ads by advertising agencies which may be responded to within the loot ecosystem. In this way, an ad agency or a dealership in N.J. may log onto a loot server and ad agencies for creating a advertising campaign, service providers for distributing the advertising campaign, and content in which to place the advertising campaign in order to reach the dealerships target audience. The transactions may all be coordinated and facilitated via the loot server ecosystem using loot servers 921 working cooperatively to exchange secure anonymized data which protects the privacy of the target customers as well as the business processes (e.g., price of an ad placement) of each of the entities in FIG. 9B including a loot server. The loot server ecosystem described herein substantially reduces transaction costs for all parties and allows advertisers to create and field advertising campaigns with substantially reduced transaction costs. As described herein, loot servers/systems from various platforms may communicate with each other for promoting merchandise and loot items and scores in a secure and anonymized manner to protect privacy.

Figure 10:
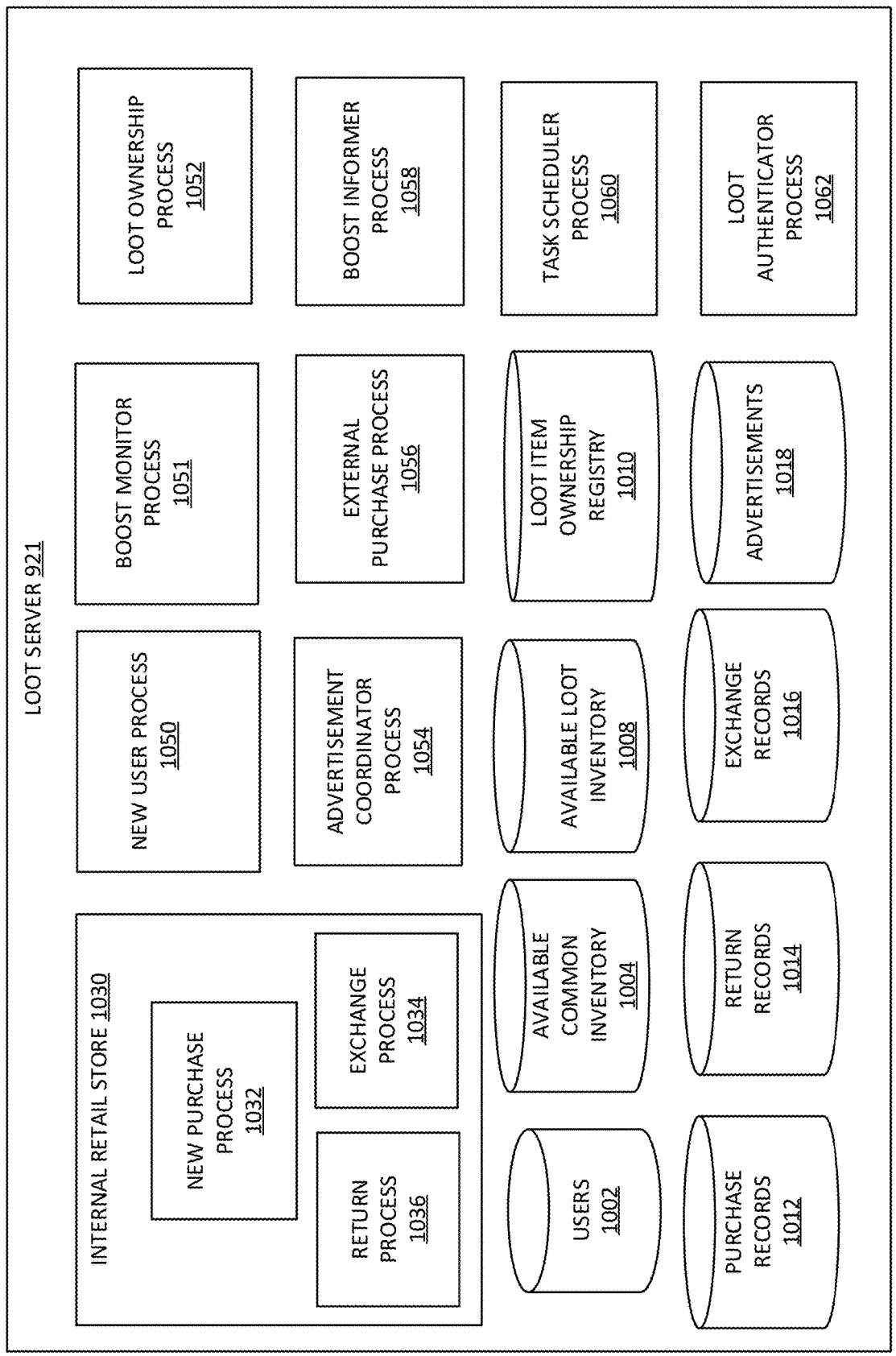
FIG. 10 illustrates an example loot system.

FIG. 10 illustrates an example loot system 922, which may be implemented, for example, on one or more a loot server(s) 921. The loot server(s) 921 can be one or more computing device(s) such as the one illustrated in FIG. 8 and may be implemented on a cloud service such as Amazon Web Services (AWS) and may also include load balancing. The loot system 922 can be implemented on the loot server(s) 921 as a Software-as-a-Service (SaaS) application, a web-architected application or a cloud-delivered service. The loot system 922 can be implemented in the context of any computer-implemented system, including a database system, a multi-tenant environment, or a relational database implementation.

Referring to FIG. 10, the loot system 922 may be variously configured and may include software components such as an internal retail store process 1030, a new user process 1050, a boost monitor process 1051, a loot ownership process 1052, an advertisement coordinator process 1054, an external purchase process 1056, a loot authenticator process 1062 and/or a boost informer process 1058. The internal retail store 1030 may include additional software components such as a new purchase process 1032, a return process 1036, an exchange process 1032. The loot system 922 may also include a users database 1002, an available common inventory database 1004, an available loot inventory database 1008, a loot item ownership registry 1010, a purchase records database 1012, a return records database 1014, an advertisement database 1018 and/or an exchange records database 1016. A database may comprise two or more separate databases, and when considered together, still constitute a "database" as that term is used herein and a database distributed across a cloud or the Internet may still be a "database."

The internal retail store 1030 may offer a website for the sale of merchandise from the available common inventory database 1004 and the available loot inventory database 1008 to the users 954. The new purchase process 1032 processes purchase of merchandise by the users 954 of the loot system from the available common inventory database 1004 and applies loot scores of the users 954 to bolster their chances of obtaining rarer merchandise or loot items from the available loot inventory database 1008. The new purchase process 1032 records the processed purchases in the purchase records database 1012. The return process 1036 processes returns of merchandises and records the return transactions in the return records database 1014. The exchange process 1034 processes exchanges of merchandises and records the exchange transactions in the exchange records database 1016.

The new user process 1050 processes the registration of new users of the loot system 922. The loot ownership process 1052 processes changes in the ownership of loot items in the loot item ownership registry process 1010, and allows the users 954 to verify ownership to facilitate future transfers of the items. The loot ownership process 1052 allows users 954 to record and track transfers of a loot item along with relevant authentication data such as data associated with an embedded authentication tag in the item. The advertisement coordinator process 1054 interacts with the advertisement recommendation systems 920 for providing advertisement services associated with loot items and loot scores awarded by the loot system 922. The external purchase process 1056 coordinates the application of loot scores during the purchase of merchandise by the users 954 from the retail platforms 912 outside the loot server 921. The application of the loot scores bolsters the users' chances of obtaining rarer merchandise or loot items. The boost informer process 1058 informs the users 954 of available loot scores and upcoming chances for winning loot scores and loot items. The boost monitor process 1051 monitors the behavior of the users 954 of the loot system 922 across multiple platforms, such as the social media platforms 910, the retail platforms 912, the gaming platforms 914, the content servers 916, and the sport streaming platforms 918.

The loot authenticator process 1062 processes the authentication of loot items. Each loot item can be paired with identification technology such as a near field communication device, RFID device, and/or security chip. The loot item ownership registry 1010 may be configured as a database and may be used to track ownership of the loot items in conjunction with the retail platforms 912.

The loot server 922 may also include a task scheduler process 1060. The task scheduler process 1060 may be variously configured such as to schedule various tasks in the loot system 922, such as requesting the boost monitor process 1051 to monitor the behavior of the users 954 of the loot system 922 across multiple platforms, such as the social media platforms 910, the retail platforms 912, the gaming platforms 914, the content servers 916, the network(s) 902 and the sport streaming platforms 918. The boost monitor process 1051 may request the boost informer process 1058 to inform the users 954 of available boosts and upcoming chances for winning boosts. This feedback provides an added incentive for the users and encourages the users to maximize activities that will boost their probabilities.

Figure 11:
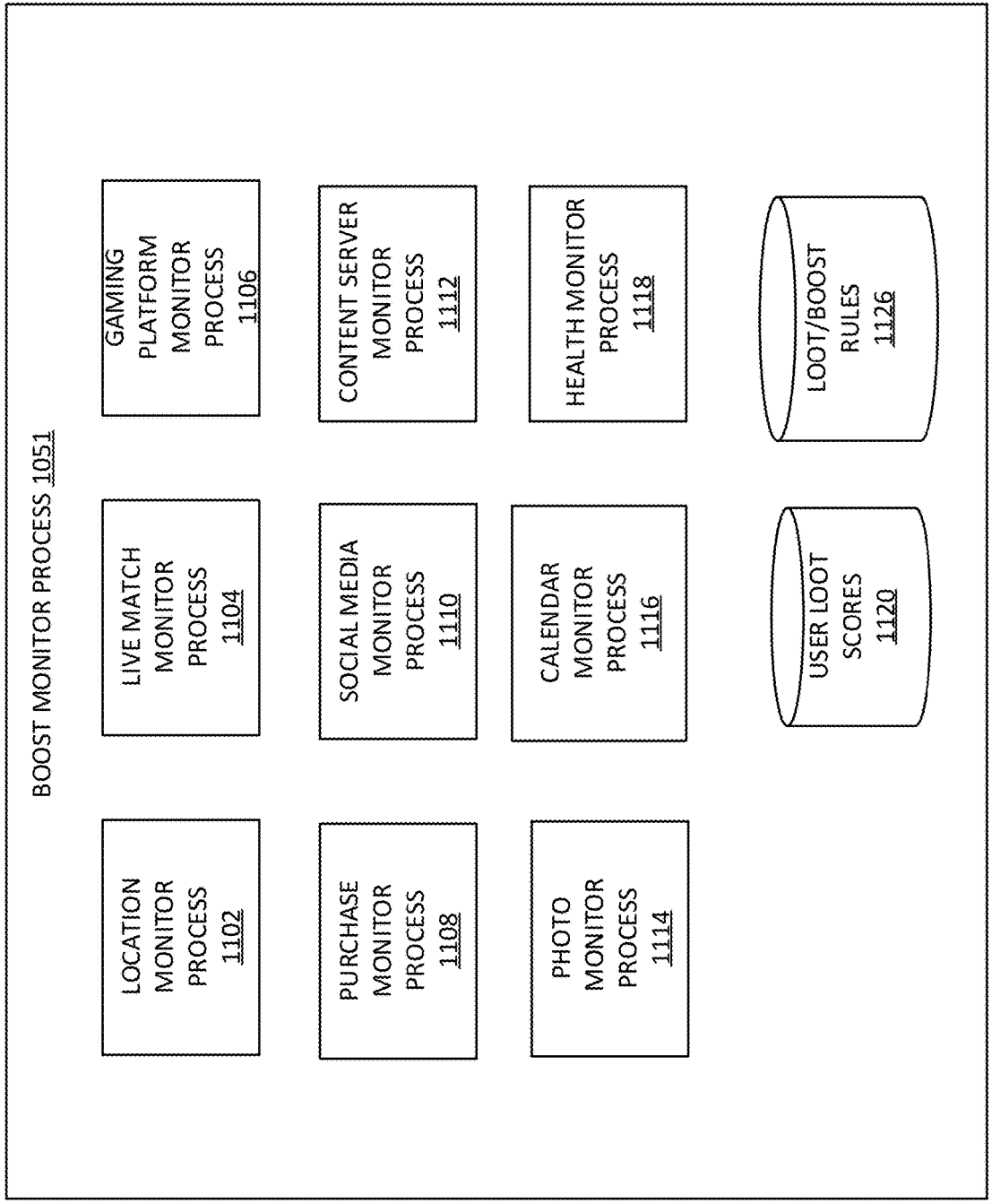
FIG. 11 illustrates an example boost monitor in the loot system.

FIG. 11 illustrates an example boost monitor process 1051. The boost monitor process 1051 may include software components referred to herein as a location monitor process 1102 for monitoring a user's location, a live match monitor process 1104 for monitoring a user's location and/or activities during a live match, a gaming platform monitor process 1106 for monitoring a user's interaction with various games, game related activities, and/or gaming platforms, a purchase monitor process 1108 for monitoring a user's purchase activities, a social media monitor process 1110 for monitoring a user's interaction with social media, a content server monitor process 1112 for monitoring a user's interaction with content, a photo monitor process 1112 for monitoring a user's interaction with various photo content, a calendar monitor process 116 for monitoring a user's interaction with calendars, and/or a health monitor process 1118 for monitoring a user's interaction with health related application such as an Apple Watch or Fitbit. These processes may comprise one or more processes co-hosted on a single server and/or distributed across multiple computer platforms. These may be selectively enabled or disabled by a user participating in the boost program to preserve a user's privacy. The boost monitor process 1051 also includes a user loot scores database 1120 and a loot boost rules database 1126. The loot boost rules database 1126 may comprise a table, such as the boost table 600 in FIG. 6 and the loot boost rules database 1126 may include rules (e.g., as described elsewhere herein) as to how to boost a user's probabilities based on user's activities.

FIG. 12A shows an example of the users database 1002 in FIG. 10. The users database 1002 may be configured, for example, to contain information regarding the registered users of the loot system 922. The users database 1002 may include, for example, a unique user ID 1202 for each user and/or various identifying information about the user such as the name of the user 1004. The users database 1002 may be configured to include, for example, one or more email address(es) 1206 and/or one or more phone number(s) 1208 of the users. The users database 1002 may also include, for example, account ID and/or login credentials for various accounts the user may have across multiple platforms, such as the social media platforms 910, the retail platforms 912, the gaming platforms 914, the content servers 916, and/or the sport streaming platforms 918. For example, the user may be provided an option to opt in for tracking various activities to allow for increased boost loot probabilities. The users database 1002 may include account ID and/or login credentials for the social media A 1210, the social media B 1212, the esports platform A 1214, the gaming platform 1216, and the content server 1218. As shown in FIG. 12A, an example entry in the users database 1002 includes the user John Smith with the user ID 1001, the email address jsmith@gmail.com, the phone number 438-729-7214, jsmithy as ID for the social media A, JohnSmith as the ID for the social media B, BugsBuggy as the ID for the esports platform A, Pluto as the ID for the gaming Platform A and jsmith as the ID for the content server A. Columns for only two social media platforms, one sports platform, one gaming platform and one content server are shown in the users database 1002 in FIG. 12A. However, account ID and login credentials for any number of social media platforms, sport streaming platforms, gaming platforms, retail platforms, networks, and/or content servers can be included in the users database 1002. The users database 1002 may also include other optional user information 1220 that might be helpful for the functionality of the loot system 922, e.g., the password for the user account, the timestamp of last sign in, the timestamp for user account creation, user organization, profile picture, time and dates of activities that boosted or reduced the loot probabilities, and/or other items such as those discussed herein.

FIG. 12B shows an example of the available common inventory database 1004 in FIG. 10. Merchandise or items listed in the available common inventory database 1004 may or may not be considered a loot item. For each type of item available for purchase in the loot system 922, the available common inventory database 1004 may include an item ID or a stock keeping unit (SKU) ID 1222, an item description 1224, a loot class 1230 indicating that the item is "common", the price 1232 and number of items available 1234. For clothing items, the available common inventory database 1004 may also include a size 1226 and color 1228 of the item. The available common inventory database 1004 may also include other optional information 1238 that might be helpful for the functionality of the loot system 922, e.g., the name and contact information of the supplier of the item, the timestamp of last order, the order number, and so on.

FIG. 12C shows an example of the available loot inventory database 1008 in FIG. 10. Merchandise or items listed in the available loot inventory database 1008 may be considered a loot item or a rare item. For each type of loot item available in the loot system 922, the available loot inventory database 1008 may include a stock keeping unit (SKU) ID 1240, an item description 1242, a loot class 1248, the price 1250 and number of loot items available 1252 for the loot type. For clothing items, the available loot inventory database 1008 may also include a size 1244 and color 1246 of the loot item. The loot class 1248 may indicate the rarity of the loot item (e.g., Good, Rare, Superior, Epic, Legendary). The available loot inventory database 1008 may also include other optional information 1254 that might be helpful for the functionality of the loot system 922, e.g., the name and contact information of the supplier of the loot item, the timestamp of last order, the order number, and/or other information as discussed herein.

FIG. 12D shows an example of the loot item ownership registry database 1010 in FIG. 10. The loot item ownership registry database 1010 may track the ownership of loot items, and track transfers of the loot item along with relevant authentication data such as data associated with an embedded authentication tag which may be included in the item. For each loot item, the loot item ownership registry database 1010 may include an item ID 1260, an item description 1262, a loot class 1268, the name 1276 of the owner of the loot item, the user ID 1274 of the owner, the stating date 1270 of ownership, the end date 1272 of ownership and/or credentials for the authentication tags 1278 embedded in the loot item. For clothing items, the loot item ownership registry database 1010 may also include a size 1264 and/or color 1266 of the loot item. The loot class 1268 may indicate the rarity of the loot item (e.g., Good, Rare, Superior, Epic, Legendary). For example, the loot item ownership registry database 1010 may include ownership record of the loot item with item ID 23516b from Mar. 4, 2019 to Aug. 1, 2019. From Mar. 1, 2019 to May 2, 2019, the loot item with item ID 23516b was owned by Bob Smith. Alice Jones owned the loot item with item ID 23516b from May 2, 2019 to Jul. 1, 2019. Chad Davis owned the loot item from Jul. 1, 2019 to Jul. 5, 2019. Deadshot_Dale owned the loot item from Jul. 5, 2019 to Aug. 1, 2019. An owner with the email ID 51324 @email.com currently owns the loot item with item ID 23516b. The loot item ownership registry database 1010 may also include other optional information 1280 that might be helpful for the functionality of the loot system 922, e.g., the mailing address and phone numbers of the owners and/or a one way hash code that can generate a new hash code or blockchain cipher code value for printing on a certificate to pass on to a purchaser to authenticate the loot item.

FIG. 12E shows an example of the user loot score database 1120 in FIG. 11. The user loot score database 1120 records unused and unexpired loot scores for the users 954 of the loot system 922. The user loot score database 1120 includes a loot score 1284, the user ID 1982 of the user associated with the loot score, and an expiry date 1286 for the loot score. In some examples of the loot system 922, loot scores may not expire and may be available for use till the users associated with the loot scores use them during purchase of merchandise. In some examples of the loot system 922, there may be one entry for a user of the loot system in the user loot score database 1120 indicating a total loot score available for the user. In some examples of the loot system 922, there may be multiple entries for a user of the loot system in the user loot score database 1120, and the total loot score available for the user can be determined by summing the loot scores of the multiple entries. In some examples of the loot system 922, the loot server may remove entries with loot scores that are past their expiry dates. The user loot score database 1120 may also include other optional information that might be helpful for the functionality of the loot system 922.

FIG. 12F shows an example of the loot/boost rules database 1126 in FIG. 11. The user loot score database 1120 records boosts/loot scores associated with various advertisement campaigns that may be initiated by any one of the multiple social media platforms, retail platforms, gaming platforms, content servers, sports streaming platforms, advertisements recommendation systems, and advertisement agencies or by the loot system. The boosts/loot scores database 1126 may include information regarding the advertisement campaign 1291, a name for a boost 1292 associated with the advertisement campaign, the loot score 1293 and rules 1294 associated with the boost. For example, an advertisement campaign for retailer A indicates that 0.5% boost may be awarded to a user if the user purchases at least five items from retailer A in one day. Some boosts may comprise multiple rules. The boosts/loot scores database 1126 may also include other optional information that may be useful for the functionality of the loot system 922, such as an expiry date for the boost and/or an expiry date for all boosts from an advertisement campaign. For example, as the user's active participation becomes older in time, the boost provided to that user eventually begins to decrease. This may also trigger processes within the loot system 922 to reengage the user and encourage the user to reengage such as providing a promotion of a unique or rare loot item believed to be of interest to the user.

Figure 13:
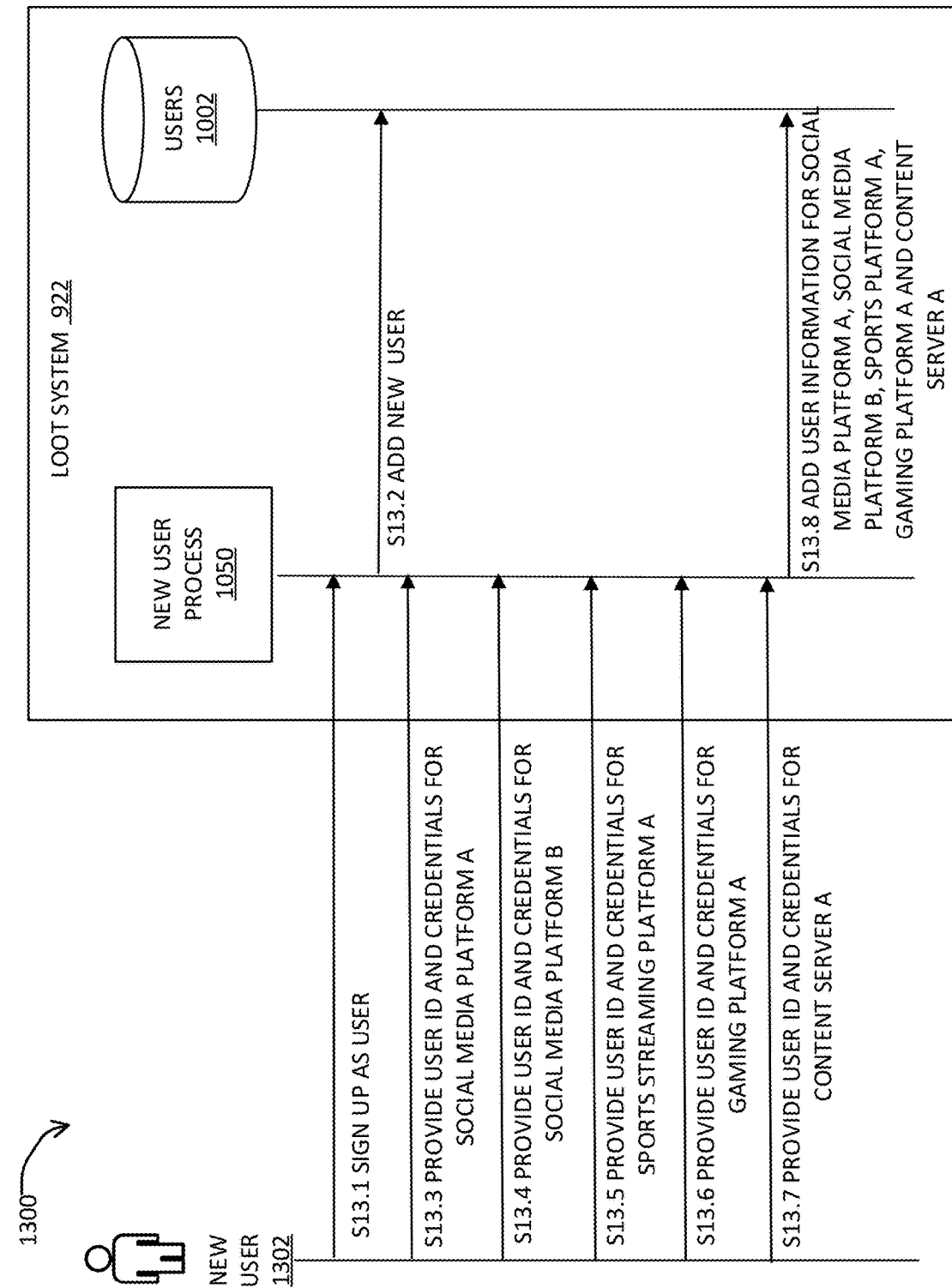
FIG. 13 is a sequence diagram illustrating a representative method of processing a new user in the loot system.

FIG. 13 is an example workflow 1300 illustrating a representative method of processing a new user 1302 in the loot system 922. The actions in the workflow 1300 may be performed in different orders and with different, fewer, or additional actions than those illustrated in FIG. 13. Multiple actions can be combined in some implementations.

FIG. 13 includes an example workflow 1300 that begins at step S13.1 where a new user 1302 may sign up as a user in the loot system 922. Workflow 1300 continues at step S13.2 where the new user process 1050 may add information about the user 1302 to the users database 1002. At step S13.3, the new user 1302 may provide information about his/her account (e.g., user ID and login credentials) in the social media platform A to the new user process 1050. At step S13.4, the new user 1302 may provide information about his/her account (e.g., user ID and login credentials) in the social media platform B to the new user process 1050. At step S13.5, the new user 1302 may provide information about his/her account (e.g., user ID and login credentials) in the sport streaming platform A to the new user process 1050. At step S13.6, the new user 1302 may provide information about his/her account (e.g., user ID and login credentials) in the gaming platform A to the new user process 1050. At step S13.7, the new user 1302 provides information about his/her account (e.g., user ID and login credentials) in the content server A to the new user process 1050. At step S13.8, the new user process 1050 may add information regarding the new user 1302 accounts in the social media platform A, the social media platform B, the sport streaming platform A, the gaming platform A, and the content server A in the users database 1002. The new user 1302 may provide information about his/or account in more social media platforms, sport streaming platforms, gaming platforms, and content servers to the new user process 1050. While the processes in FIG. 13 have been described in terms of user input, this information may also be obtained via secured exchange with the various platforms, for example, once the user grants permissions the exchange of data may occur automatically.

FIG. 14A is an example workflow 1400 illustrating a representative method of monitoring the location of a user 1402 by the location monitor 1102 in the boost monitor 1051 in the loot system 922. This may be done via GPS enabled devices such as phones, watches, or tablets, via triangulation or distance and bearing in the case of wireless devices, MAC and/or IP address location techniques. The workflow 1400 begins at step S14.1 where the location monitor 1102 may retrieve information regarding a personal device (e.g., a phone number) of the user 1302 with, for example, location sensing capabilities from the users database 1002. The personal devices with location sensing capabilities can estimate their locations through beacons (e.g., IBEACONS and SENION beacons), communications with one more GPS satellites, proximity to one or more WiFi sources, multilateration of radio signals between several nearby cell towers, IP addresses of the personal devices, and so on. At step S14.2, the location monitor 1102 may determine the location of the user 1402 by determining the location of the personal device of the user 1402. The personal device of the user 1402 may send the geospatial coordinates of the location (e.g., the latitude and the longitude) and/or other location indicating information including physical address, zip code, and/or approximate address.

Figure 14B:
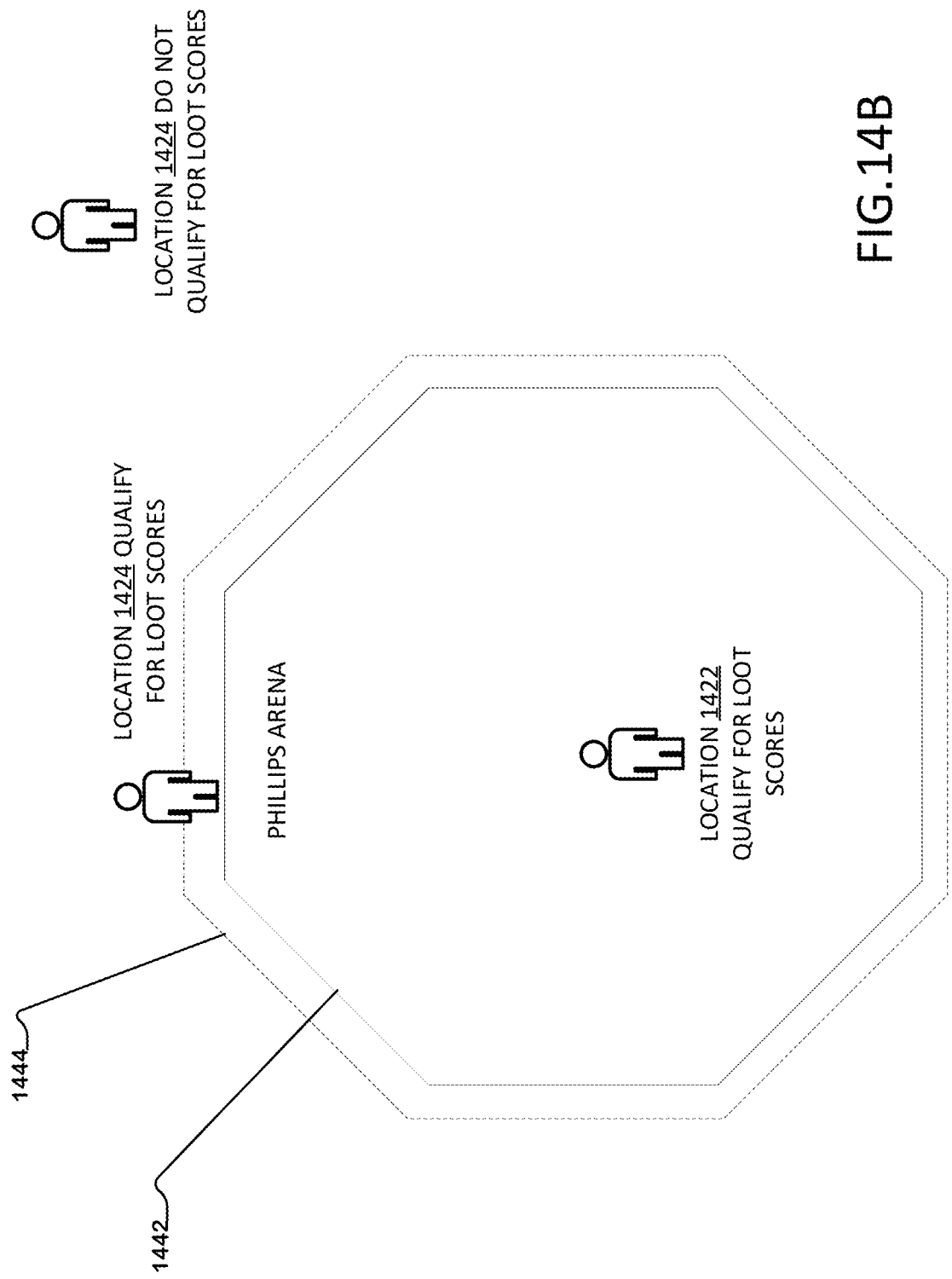

At step S14.3, the location monitor 1102 may determine if the location of the user 1402 is within a place-of-interest such as a place of interest as determined by the loot/boost rules database 1126, such as the Phillips Arena 1442 in FIG. 14B, or within a certain distance or boundary of a place-of-interest, such as boundary 1444 of the Phillips Arena 1442. A place-of-interest may be a specific location that someone may find useful or interesting or it may be specified in the loot/boost rules database 1126. In some examples of the loot server 922, the location monitor 1102 and/or rules database can include a database of places-of-interests. The database of point of interests may include places-of-interests from one or more places-of-interests sources, such as Google Map, Bing Maps, Apple Maps, MapQuest, Roadtrippers, and/or as specified by one or more advertisers. The loot server 922 may include a location monitor 1102 that may interact with one or more of the above places-of-interest sources to determine if the location of the user 1402 is within a place-of-interest. After determining if the location of the user 1402 is within a place-of-interest or within the boundary of the place-of-interest, the location monitor 1102 may determine whether the location of the user 1402 qualify for a loot score based on the loot/boost rules in the loot/boost rules database 1126 in the boost monitor 1051. For example, rules in the loot/boost rules database 1126 may indicate that the location 1422 inside the Phillips Arena 1442 or within the boundary 1444 of the Phillips Arena qualify for a loot score of 1%. However, the location 1424 outside the Phillips Arena 1442 do not qualify for a loot score.

At step S14.4, the location monitor 1102 may award the loot score to the user 1402 if the location of the user 1402 qualify for a loot score. The loot score awarded to the user 1402 may be recorded in the user loot scores database 1120. At step S14.5, the location monitor 1102 may notify the user 1402 of the awarded loot score. The notification may be sent through an email, a text message, or a notification through an application communicating with the loot system 922 in the personal device of the user 1402. This may increase the user feedback and provide added incentive for the user to engage in activities that are being encourage, and that may result in an increase in his/her loot scores.

Figure 15:
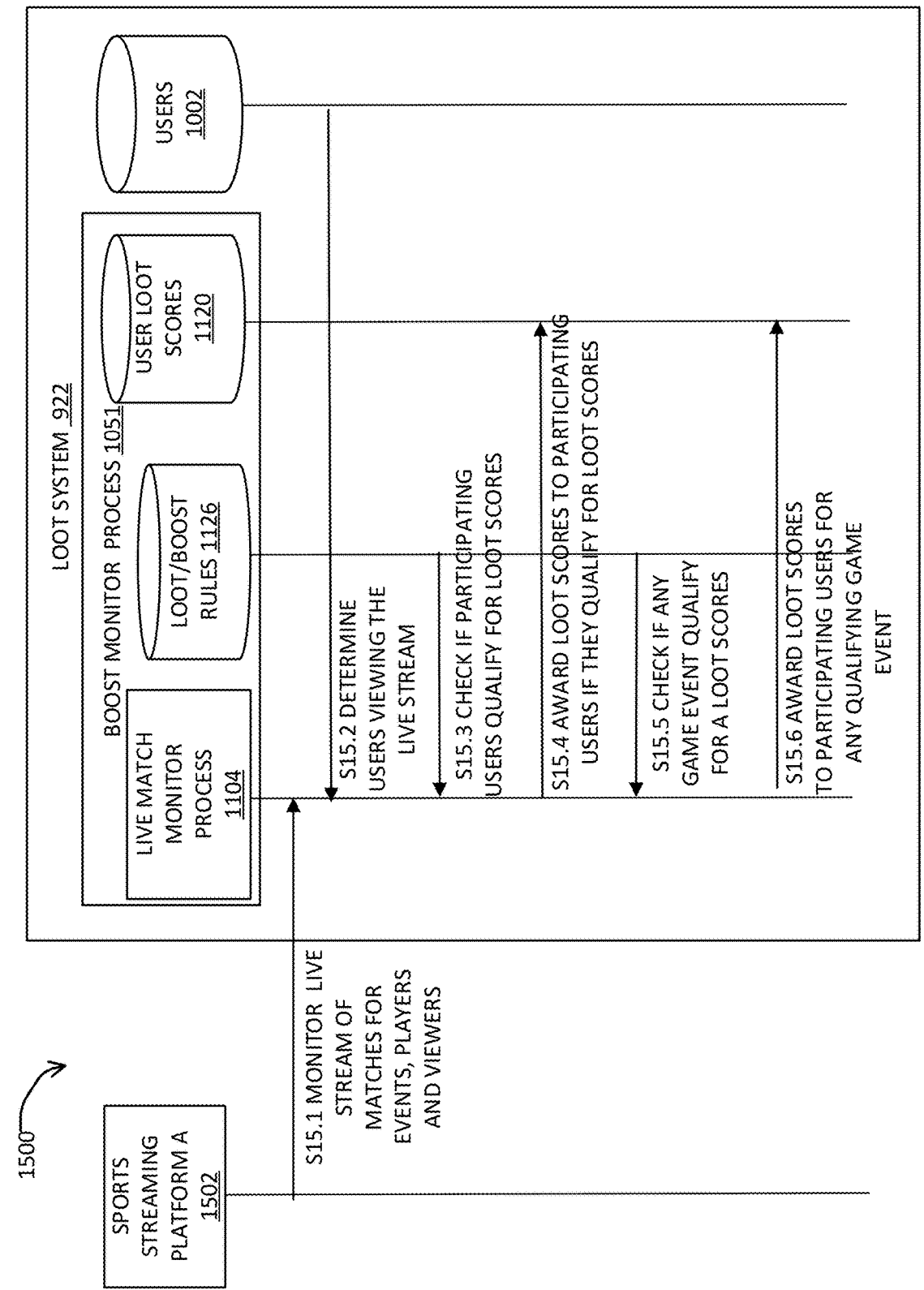
FIG. 15 is a sequence diagram illustrating a representative method of monitoring a live sports event by the boost monitor in the loot system.

FIG. 15 is an example workflow 1500 illustrating a representative method of monitoring a live game event by the live match monitor 1103 in the boost monitor 1051. The workflow 1500 begins at step S15.1 where the live match monitor 1104 may receive one or more of a live video stream from the sport streaming platform A 1502 and monitors the video streams, the players in the video streams and/or the viewers of the live match.

The live match monitor 1104 may analyze and learn the behavior of various objects (e.g., players, sporting objects such as a ball, a bat, etc.) in the video frames of the video streams by using any suitable technique such as machine learning-based models. The video stream may be formatted using known such formats, e.g., MPEG2, MJPEG, MPEG4, H.263, H.264, and the like. Examples of machine learning-based models include regression-based models, neural network-based models, and/or fully-connected network-based models. Objects depicted in the video streams by the machine learning-based models may be determined based on an analysis of the video frames. Each object may have a corresponding search model, which may be used to track objects motions frame-to-frame. The machine learning-based models may be configured to determine the classes of the objects and generate semantic representations of the objects. For example, in a live game event of a soccer match, the machine learning-based models may be able to identify the various players, the ball and the goal posts. The machine learning-based models may also be able to identify specific events or behaviors in the video streams, such as a certain player scoring a goal. Streamsage classifies events in certain video streams using various techniques. These techniques may be used to determine various events in the game that may give a boost to a loot score if a purchase and/or other activity is made close in time to the event.

At step S15.2, the live match monitor 1104 may compare the users in the user's database 1002 and the viewers of the live match in order to determine a list of users of the loot system 922 that are watching the live match. At step S15.3, the live match monitor 1104 may determine whether watching the live match qualify for a loot score based on the loot/boost rules in the loot/boost rules database 1126 in the boost monitor 1051. In some examples, the users watching the live match may qualify for a loot score after watching the live match for a minimum amount of time. At step S15.4, the live match monitor 1104 may award the loot score to users watching the live match if watching the live match qualify for a loot score. The loot scores awarded to the users may be recorded in the user loot scores database 1120. The live match monitor 1104 may notify the users viewing the live match of the awarded loot scores. The notification may be sent through an email, a text message, or a notification through an application communicating with the loot system 922 in the personal devices of the users.

At step S15.5, the live match monitor 1104 may determine if any game events in the live match qualify for a loot score. For example, a loot score of 2% may be awarded to all viewers if the soccer player Messi scores a goal in a soccer match. At step S15.6, the live match monitor 1104 may award the loot score to users watching the live match if the game event in step S15.4 qualify for a loot score. Any loot scores awarded to the users may be recorded in the user loot scores database 1120. The live match monitor 1104 may notify the users viewing the live match of the awarded loot score. The notification may be sent through an email, a text message, or a notification through an application communicating with the loot system 922 in the personal device of the users.

Figure 16:
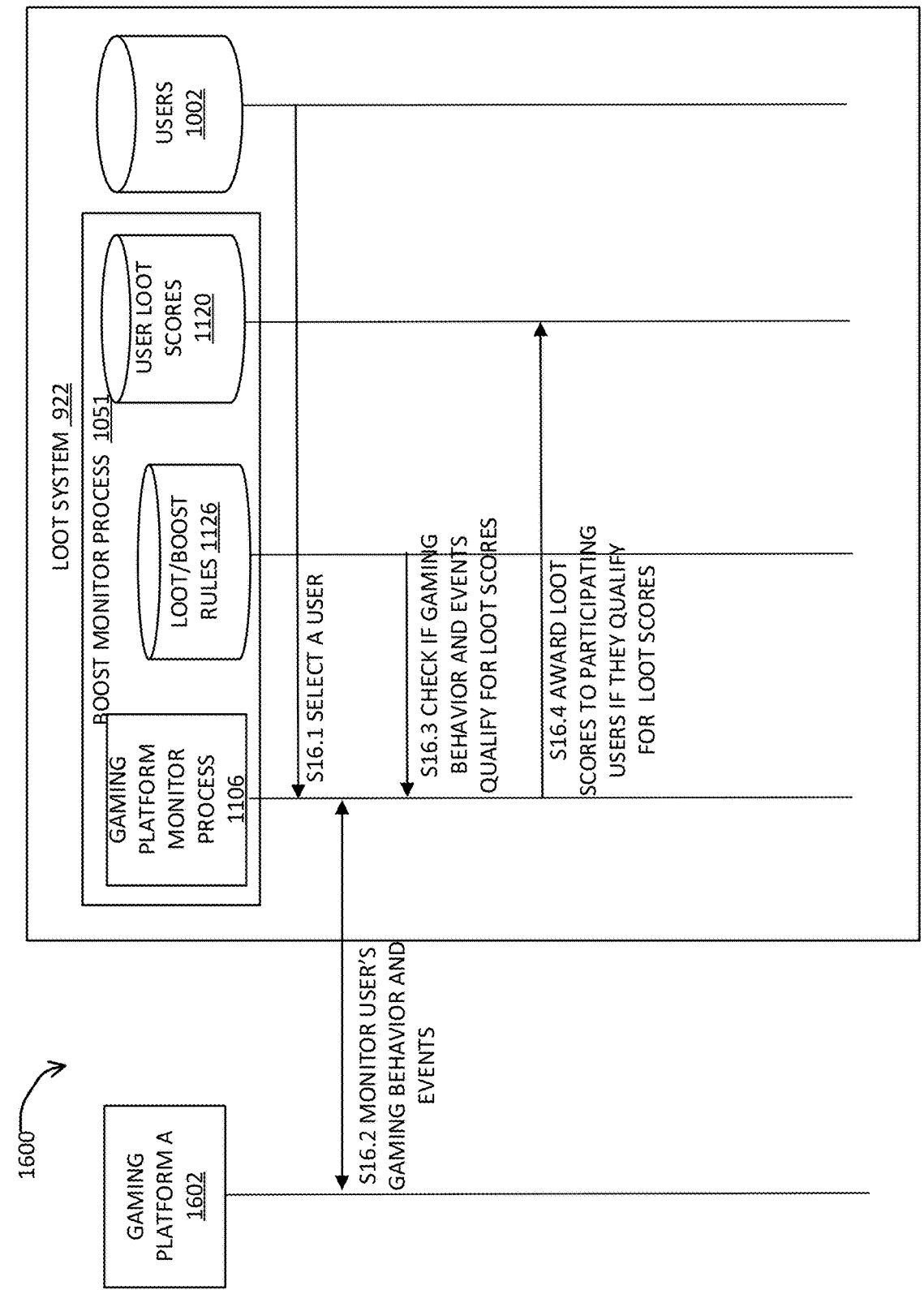
FIG. 16 is a sequence diagram illustrating a representative method of monitoring participants in a gaming platform by the boost monitor in the loot system.

FIG. 16 is an example workflow 1600 illustrating a representative method of monitoring video games played in a gaming platform A 1602 by the users of the loot system. The gaming behavior and histories of the users may be monitored by the gaming platform monitor 1106 in the boost monitor 1051. The workflow 1600 begins at step S16.1 where the gaming platform monitor 1106 may select a user and retrieves information regarding an account ID and/or login credentials of the user in the gaming platform A 1602 from the users database 1002. At step S16.2, the gaming platform monitor 1106 may determine the gaming behavior and/or events of the selected user. The gaming behavior of the user may indicate the amount of time that user spends in the gaming platform, the user's interaction with other players in the gaming platform A, and other related behaviors. Game events of the user may indicate the winning and/or the success level of the users while playing video games in the gaming platform. Examples of gaming events include the user reaching a certain stage/level in the game, winning awards, and/or achieving a milestone.

At step S16.3, the gaming platform monitor 1106 may analyze the behavior of the user and his/her significant gaming events to determine whether the user qualifies for loot scores. For example, a loot score of 0.1% may be awarded to the user if the user plays video games in the gaming platform A for two hours a day, or a loot score of 1% may be awarded to the user if the user plays video games in the gaming platform A for five days in a row. Loot scores may also be awarded to the user for significant gaming events, such as winning five games in row and/or attaining certain levels in a game. The gaming platform monitor 1106 may use machine learning-based models to determine whether the user qualifies for loot scores.

At step S16.4, the gaming platform monitor 1106 may award loot scores to the users if the gaming behavior and/or significant game events of the user qualify for loot scores. The loot scores awarded to the user may be recorded in the user loot scores database 1120. The gaming platform monitor 1106 may notify the user of the awarded loot score. The notification may be sent through an email, a text message, or a notification through an application communicating with the loot system 922 in the personal device of the users.

Figure 17:
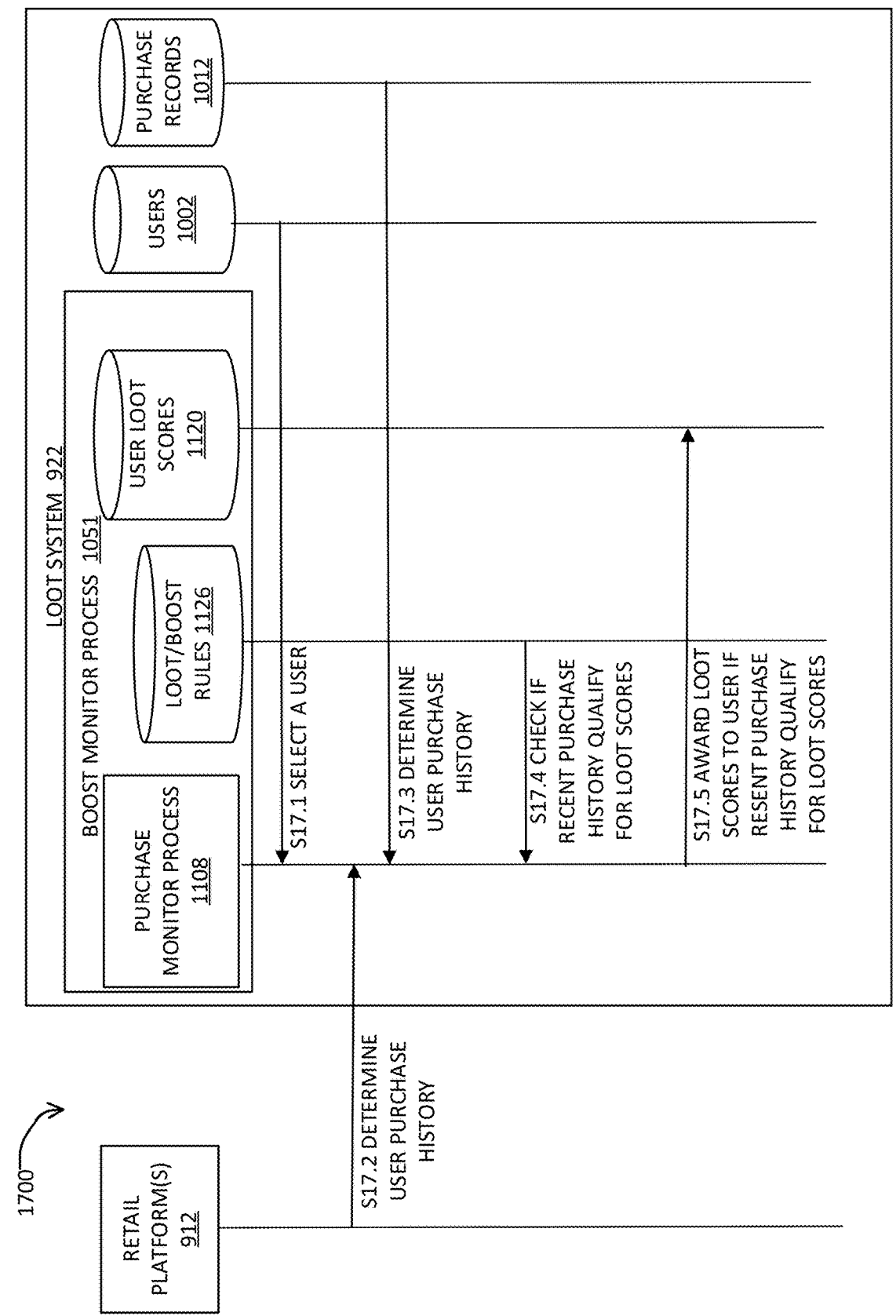
FIG. 17 is a sequence diagram illustrating a representative method of monitoring purchase histories of users by the boost monitor in the loot system.

FIG. 17 is an example workflow 1700 illustrating a representative method of monitoring purchase histories of users by the purchase monitor 1108 in the boost monitor 1051. The workflow 1700 begins at step S17.1 where the purchase monitor 1108 may select a user and may retrieve information regarding account IDs and/or login credentials of the user from the users database 1002 for online accounts in one or more retail platforms 912. At step S17.2, the purchase monitor 1108 may determine the purchase history of the selected user from the retail platforms 912. The purchase behavior of the user may indicate the amount the user spends in purchasing merchandise, items bought, and so on. At step S17.2, the purchase monitor 1108 may determine the purchase history of the selected user from the internal retail store 1030 from the purchase records database 1012.

At step S17.3, the purchase monitor 1108 may analyze the purchase behavior of the user to determine whether the user qualifies for loot scores. For example, a loot score of 0.5% may be awarded to the user if the user buys $500 worth of merchandise from Amazon.com, or a loot score of 1% may be awarded to the user if the user bought seasons tickets for Los Angeles Lakers from Ticketmaster.com. The purchase monitor 1108 may use using machine learning-based models to determine whether the user qualifies for loot scores.

At step S17.4, the purchase monitor 1108 may award the loot scores to the users if the purchase behavior of the users qualifies for loot scores. The loot scores awarded to the user may be recorded in the user loot scores database 1120. The gaming platform monitor 1106 may notify the users of the awarded loot scores. The notification may be sent through an email, a text message, or a notification through an application communicating with the loot system 922 in the personal device of the users.

Figure 18A:
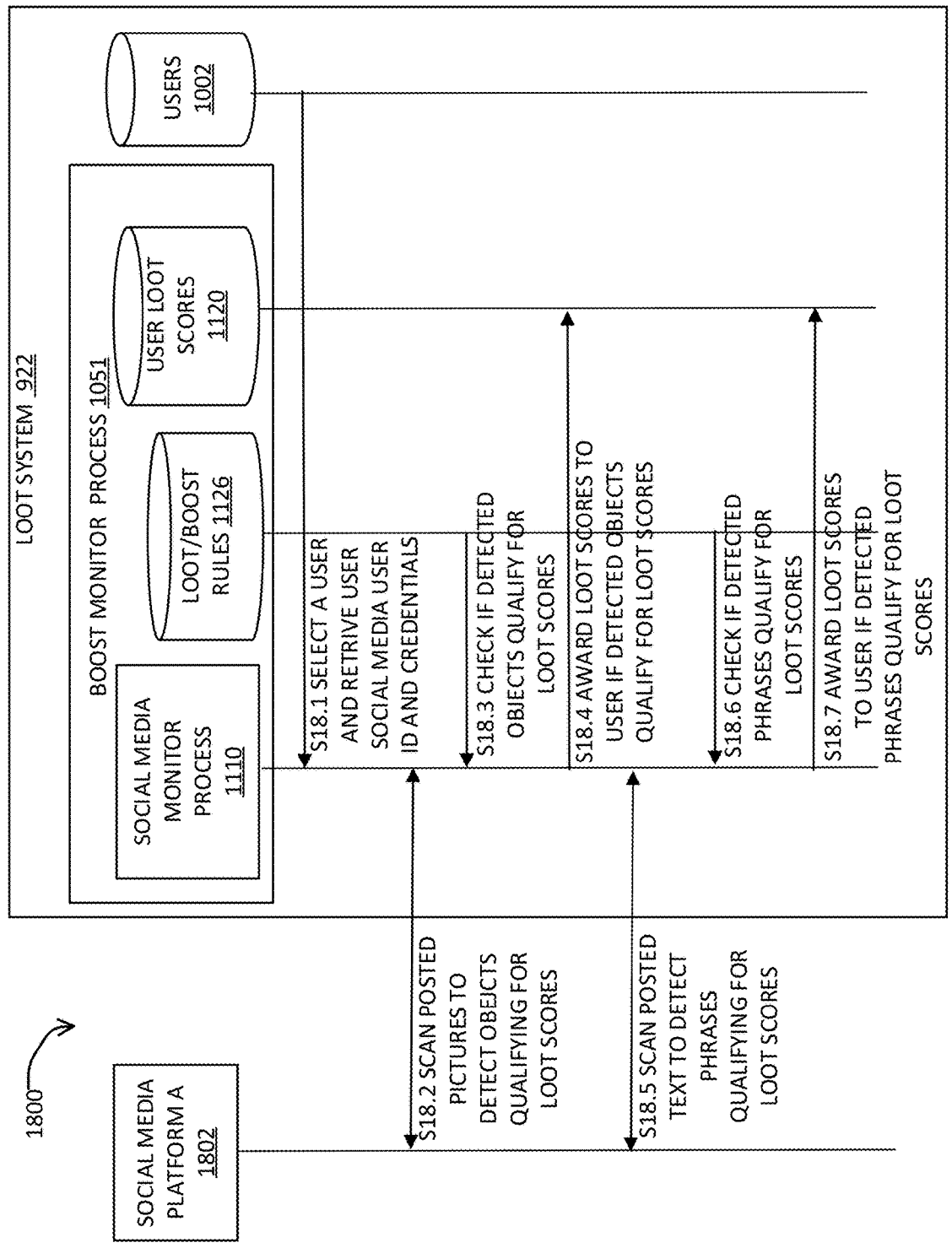
FIGS. 18A and 18B illustrate a representative method of monitoring social media accounts of users by the boost monitor in the loot system.

FIG. 18A is an example workflow 1800 illustrating a representative method of monitoring social media accounts of a user by the social media monitor 1110 in the boost monitor 1051. The workflow 1800 begins at step S18.1 where the social media monitor 1110 may select a user and retrieves information regarding account IDs and login credentials of the user from the users database 1002 for the social media platform A 1802.

Figure 18B:
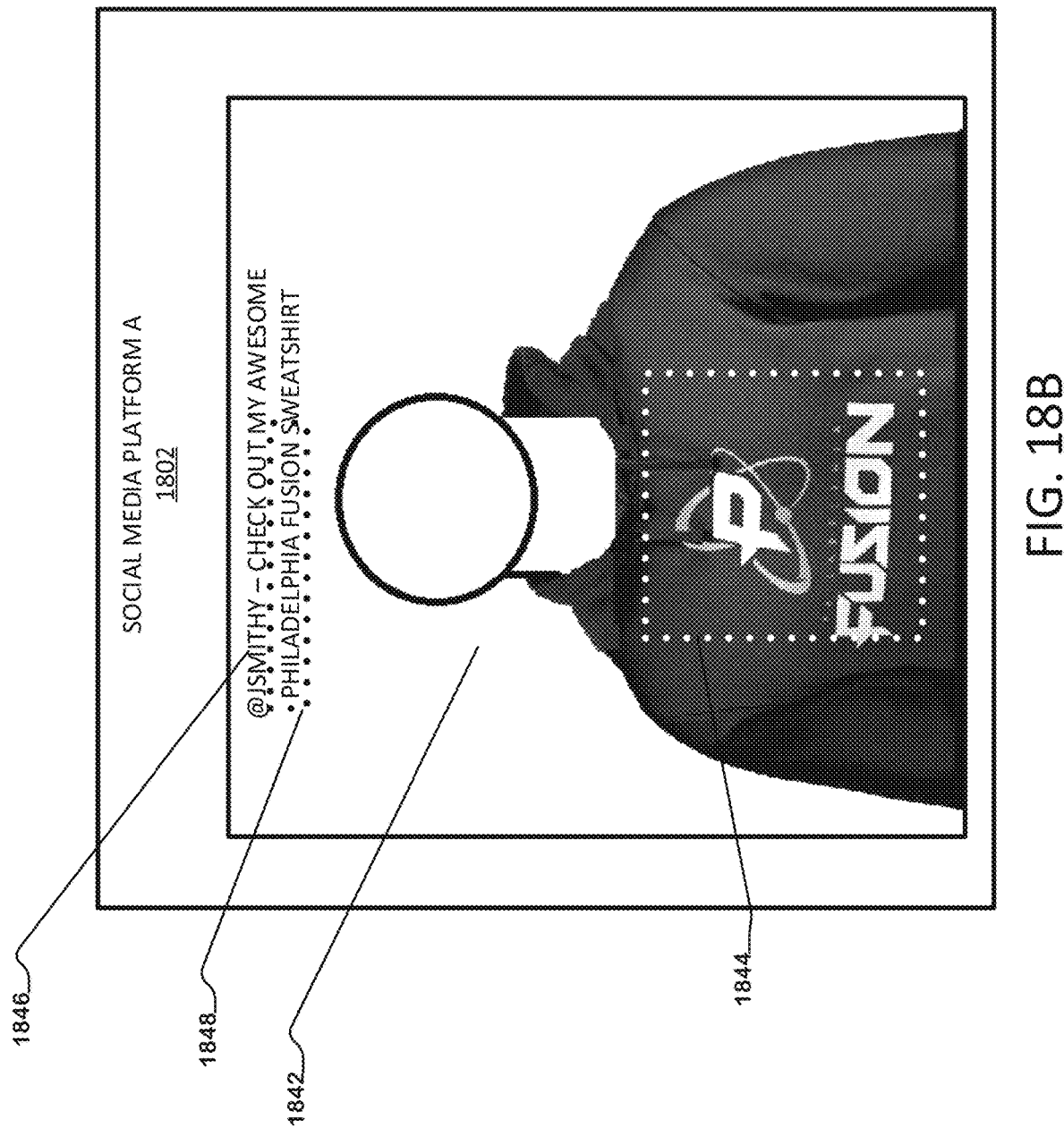

At step S18.2, the social media monitor 1110 may analyze posted pictures and videos in the social media platform A 1802 to determine items and patterns that qualify for loot scores by using machine learning-based models. Examples of machine learning-based models include regression-based models, neural network-based models, and/or fully-connected network-based models. Items and patterns depicted in the posted photos and/or videos by the machine learning-based models are determined based on an analysis of the pixel frames in the images. The recognition of a pattern, logo, and text in the images may be done by dissecting the image or videos into pieces to find features or objects. For example, the machine learning-based models may analyze the photo 1842 in FIG. 18B posted the user John Smith of himself wearing a sweatshirt in the social media platform A 1802 to detect the logo 1844 for a sports team.

At step S18.3, the social media monitor 1110 may determine whether the detected item, such as the logo 1842, qualify for loot scores. For example, a loot score of 0.5% may be awarded to the user if the logo is for Philadelphia Fusion. At step S18.4, the social media monitor 1110 may award the loot score to the users if the detected items qualify for loot scores. The loot score awarded to the user may be recorded in the user loot scores database 1120.

At step S18.5, the social media monitor 1110 may analyze text 1846 posted by the user in the social media platform A 1802 to determine phrases in the text that qualify for loot scores. The social media monitor 1110 may apply a heuristics-based string analysis to the text to detect phrases. The heuristics-based analysis may extract brand key terms in the texts and detect associated brand labels based on the extracted brand key terms based on a set of learned rules. For example, the heuristic based analysis may identify the brand key term 1848 "Philadelphia Fusion" in the text "Check out my awesome Philadelphia Fusion sweatshirt" and associate the brand key term with the sports team Philadelphia Fusion. In some embodiments, the heuristics-based string analysis may include comparing phrases in the text to known aliases of the recognized brands. The heuristics-based analysis may also extract positive key terms in the text, such as the phrase "awesome" in the text 1846. Other possible positive key terms may include "good," "best," "loving it," "like," and so on. The heuristics-based analysis may also extract negative key terms in the text, such as the phrases "hate," "dislike," "not good," "sucks," and so on.

At step S18.6, the social media monitor 1110 may determine whether the detected phrases, such as the phrase 1848, qualify for loot scores. For example, a loot score of 0.5% may be awarded to the user if the text posted includes the brand key term "Philadelphia Fusion." In some examples, the loot score may be awarded only if the positive key terms are also included with the brand key terms in the posted texts. Loot scored may not be awarded if negative key terms are detected in the texts, such as the negative key term "hate" in the text "I hate this Philadelphia Fusion sweatshirt! ! ! !". In some circumstances, loot scores may be deducted for certain unfavorable circumstances. At step S18.7, the social media monitor 1110 may award the loot score to the users if the detected phrases qualify for loot scores. The loot score awarded to the user may be recorded in the user loot scores database 1120. The social media monitor 1110 may notify the user of the awarded loot score. The notification may be sent through an email, a text message, or a notification through an application communicating with the loot system 922 in the personal device of the users.

Figure 19:
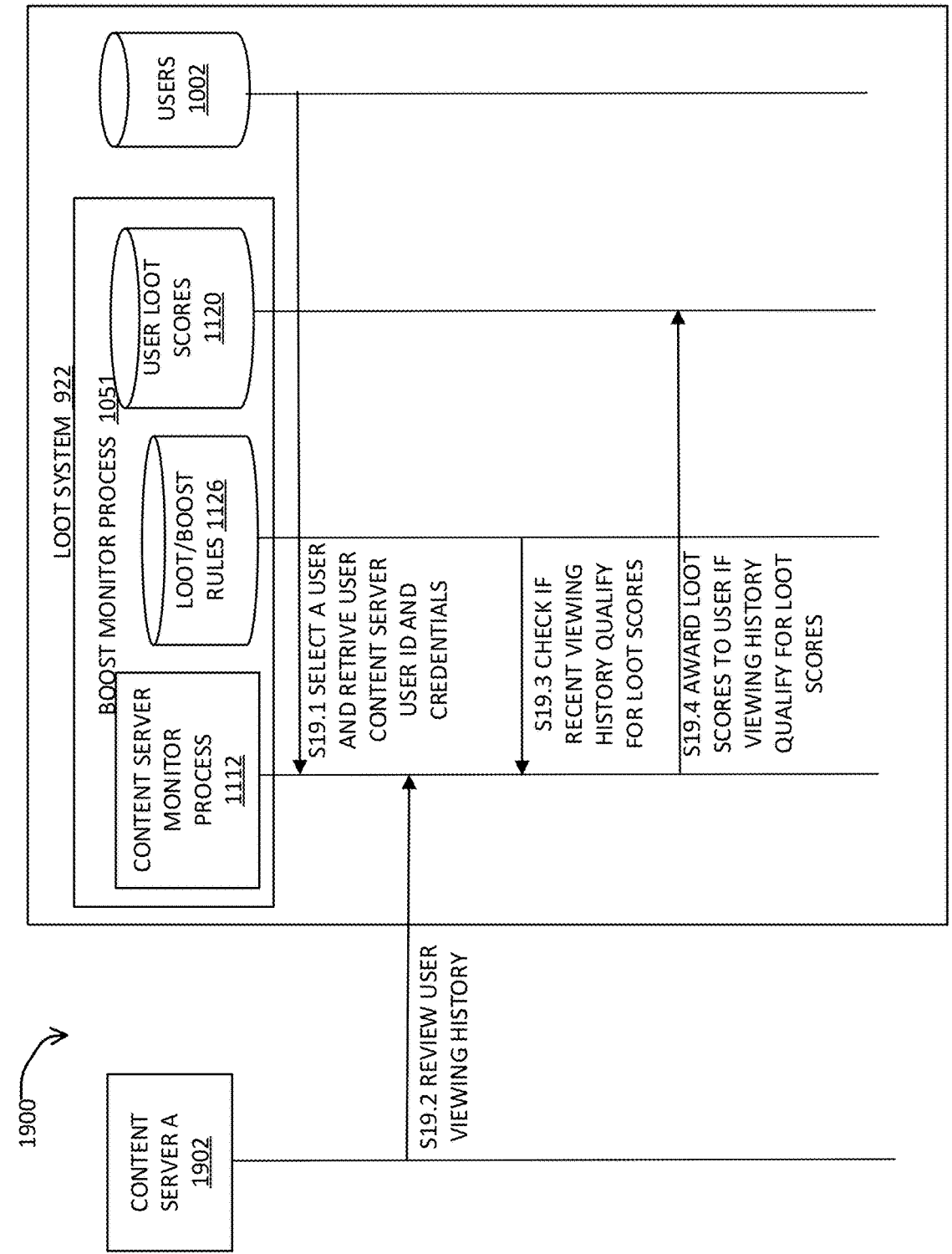
FIG. 19 is a sequence diagram illustrating a representative method of monitoring content viewing histories of users by the boost monitor in the loot system.

FIG. 19 is an example workflow 1900 illustrating a representative method of monitoring content viewing histories of users by the content server monitor 1112 in the boost monitor 1051. The workflow 1900 begins at step S19.1 where the content server monitor 1112 may select a user and retrieves information regarding account IDs and login credentials of the user from the users database 1002 for an account in the content server A 1902. At step S19.2, the content server monitor 1112 may determine the viewing history of the selected user from the content server A 1902. The viewing behavior of the user may indicate the amount of time the user spends in viewing content from the content server A 1902, shows and movies watched, number of episodes watches in a show and so on.

At step S19.3, the content server monitor 1112 may analyze the viewing behavior of the user to determine whether the user qualify for loot scores. For example, a loot score of 0.5% may be awarded to the user if the user watches ten episodes of Star Wars Rebels within a time period, and/or a loot score of 1% may be awarded to the user if the user watches an entire season of Game of Thrones in one week. The content server monitor 1112 may use using machine learning-based models to determine whether the user qualify for loot scores.

At step S19.4, the content server monitor 1112 may award the loot score to the users if the viewing behavior of the user qualify for loot scores. The loot scores awarded to the user may be recorded in the user loot scores database 1120. The content server monitor 1112 may notify the user of the awarded loot score. The notification may be sent through an email, a text message, and/or a notification through an application communicating with the loot system 922 in the personal device of the users.

Figure 20:
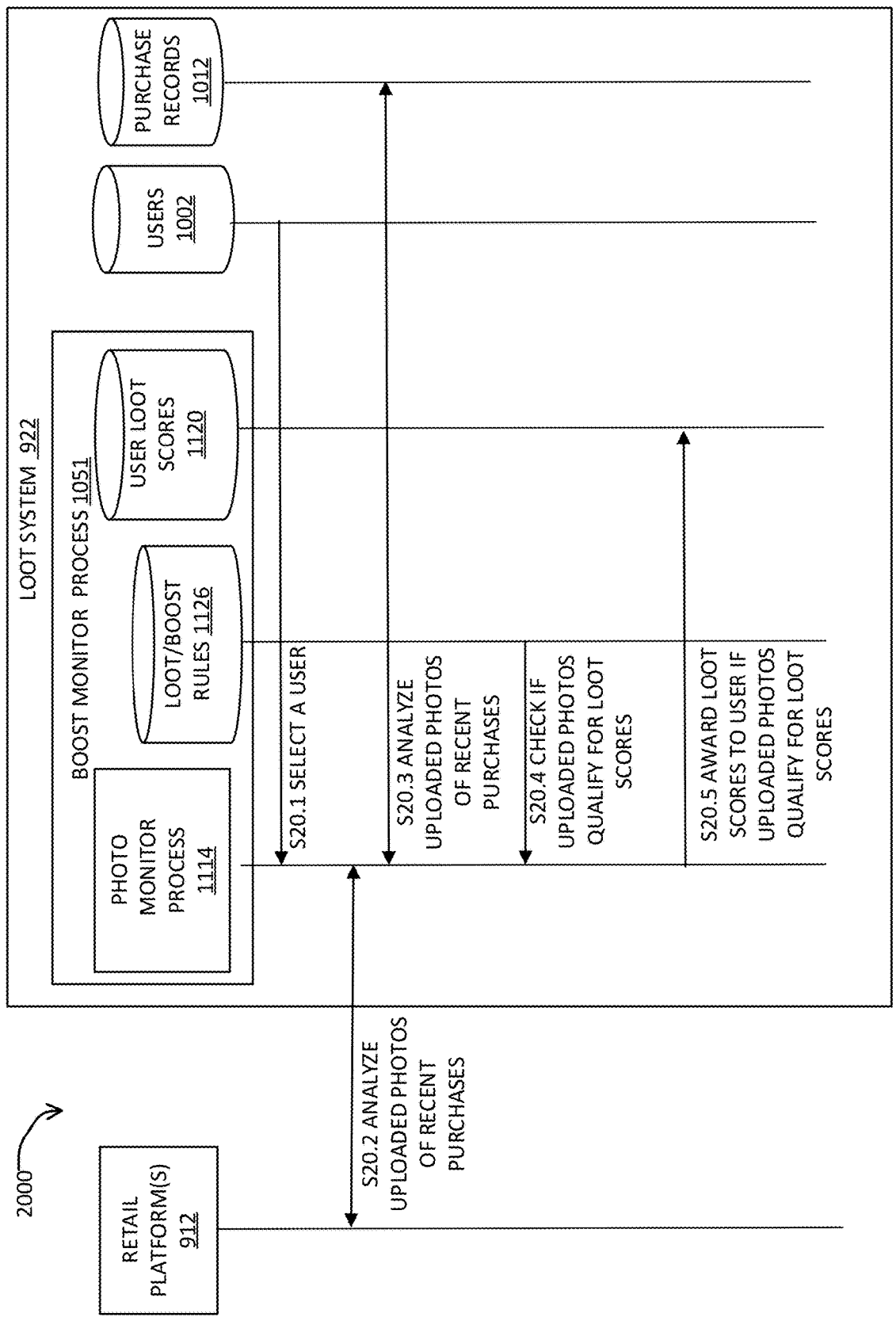
FIG. 20 is a sequence diagram illustrating a representative method of monitoring photo uploaded by users by the boost monitor in the loot system.

FIG. 20 is an example workflow 2000 illustrating a representative method of monitoring uploaded photos of recent purchases of a user by the photo monitor 1112 in the boost monitor 1051. The workflow 2000 begins at step S20.1 where the photo monitor 1112 may select a user and retrieves information regarding account IDs and/or login credentials of the selected user from the users database 1002 for online accounts in one or more retail platforms 912. At step S20.2, the photo monitor 1112 may analyze posted pictures and videos on the retail platforms 912 platform to determine items and/or patterns qualify for loot scores by using machine learning-based models described herein. At step S20.3, the photo monitor 1112 may analyze posted pictures and videos from the internal retail store 1030 from the purchase records database 1012 to, for example, determine items, and patterns qualify for loot scores.

At step S20.4, the photo monitor 1112 may determine whether the detected items in the uploaded photos in the retail platforms platform and/or the internal retail store qualify for loot scores. At step S20.5, the photo monitor 1112 may award the loot scores to the user if items and objects in the uploaded photos qualify for loot scores. The loot scores awarded to the user may be recorded in the user loot scores database 1120.

Figure 21:
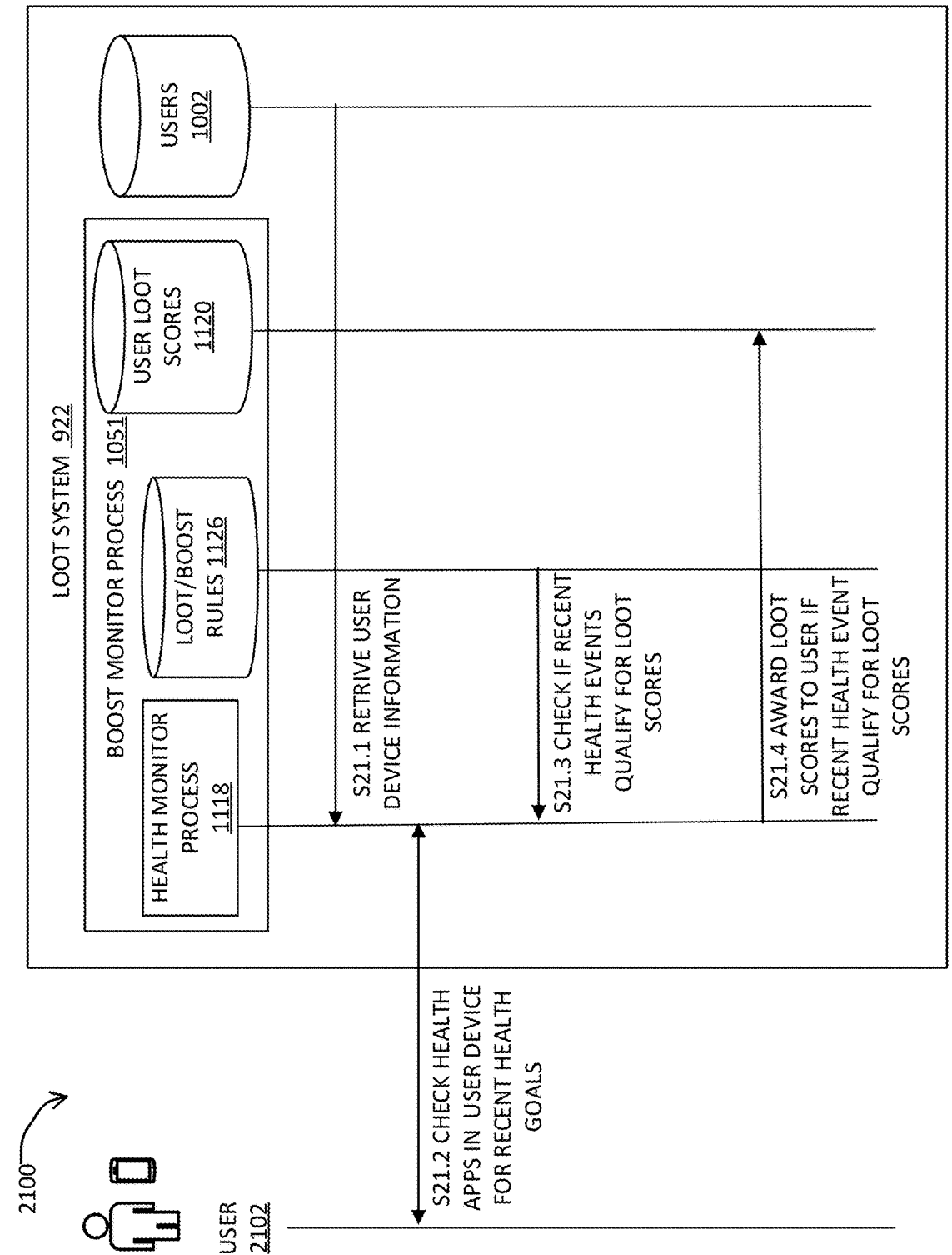
FIG. 21 is a sequence diagram illustrating a representative method of monitoring health goals achieved by users by the boost monitor in the loot system.

FIG. 21 is an example workflow 2100 illustrating a representative method of monitoring health goals achieved by a user 2102 by the health monitor 1118 in the boost monitor 1051. The workflow 2100 begins at step S21.1 where the health monitor 1118 retrieves information regarding a personal device (e.g., a phone number) of the user 2102. The personal device of the user may include applications that track health goals of the user. Examples of such applications include Fitbit, MyFitnessPal, MapMyRun, MapMyFitness and so on. Examples health goals may include drinking ten glasses of water per day, running a marathon, working out five days a week, and so on. At step S21.2, the health monitor 1118 checks the health applications installed in the user's personal device for recent achieved health goals. At step S21.3, the health monitor 1118 may determine whether any of the recent health goals achieved by the user 2102 qualify for a loot score based on the loot/boost rules in the loot/boost rules database 1126. For example, rules in the loot/boost rules database 1126 may indicate that the running a marathon qualify for a loot score of 1%. At step S21.4, the health monitor 1118 may award the loot score to the user 2102 if any of the recent health goals qualify for a loot score. The loot score awarded to the user 1402 may be recorded in the user loot scores database 1120. In this example of the loot system, an athletic company may have some legendary swag that they can award to the "biggest loser" of weight over a predetermined period based on the boost rules outlined herein. This may create substantial buzz around the application, the athletic company, and motivate positive activities on the part of users.

Figure 22:
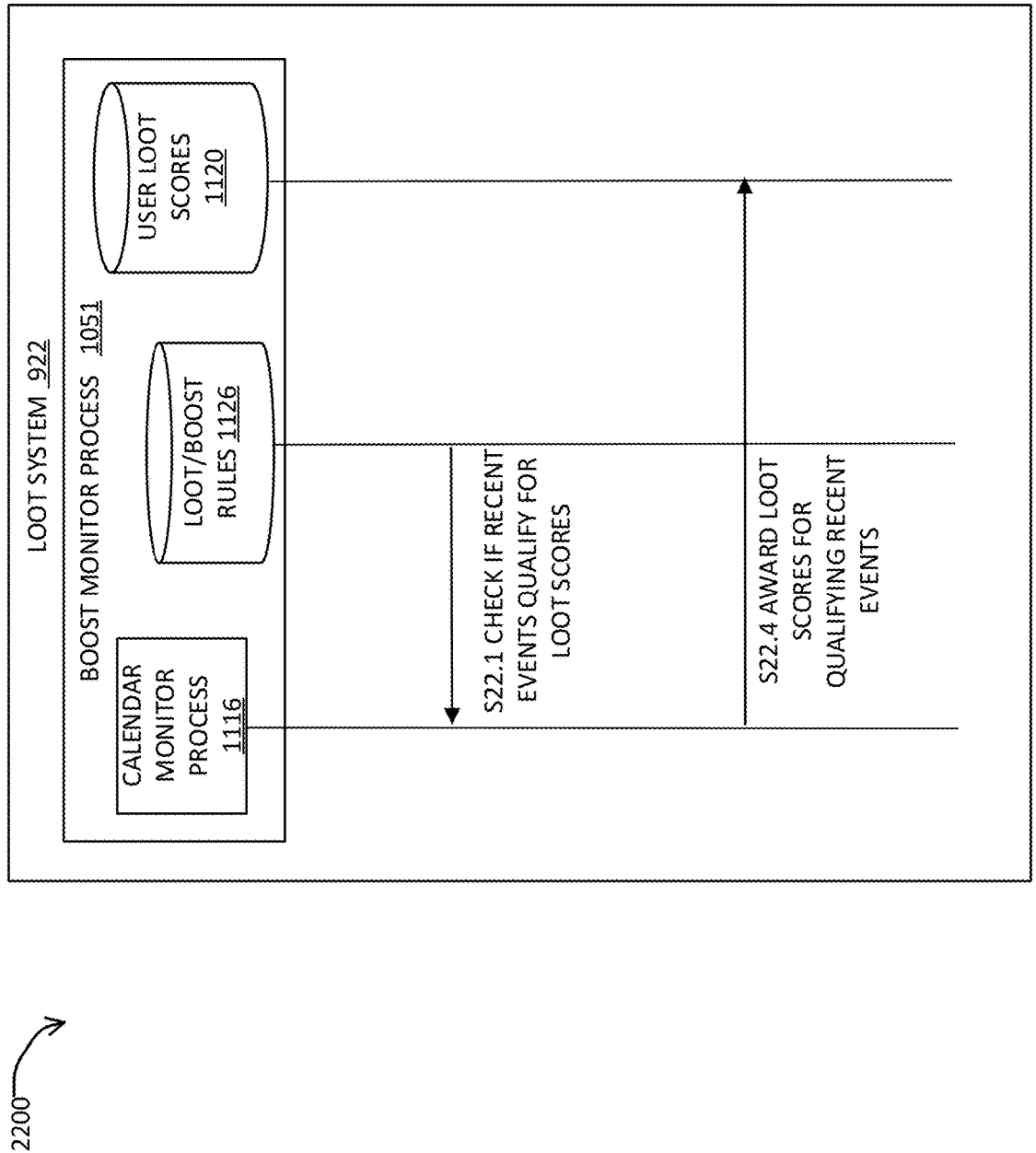
FIG. 22 is a sequence diagram illustrating a representative method of monitoring calendar events by the boost monitor in the loot system.

FIG. 22 is an example workflow 2200 illustrating a representative method of monitoring calendar events by the calendar monitor 1116 in the boost monitor 1051. The workflow 2100 starts at step S22.1 where the calendar monitor 1116 checks whether any of the recent events qualify for a loot score based on the loot/boost rules in the loot/boost rules database 1126. For example, rules in the loot/boost rules database 1126 may indicate that all users of the loot system 922 qualify for a loot score of 1% during Thanksgiving day and that all users qualify for a loot score of 0.5% during the Super Bowl game. At step S21.2, the calendar monitor 1116 may award the loot scores to the users if any of the recent events qualify for a loot score. For example, if the user attends the Super Bowl game, he/she may be awarded additional loot scores. The loot scores awarded to the users may be recorded in the user loot scores database 1120.

Figure 23A:
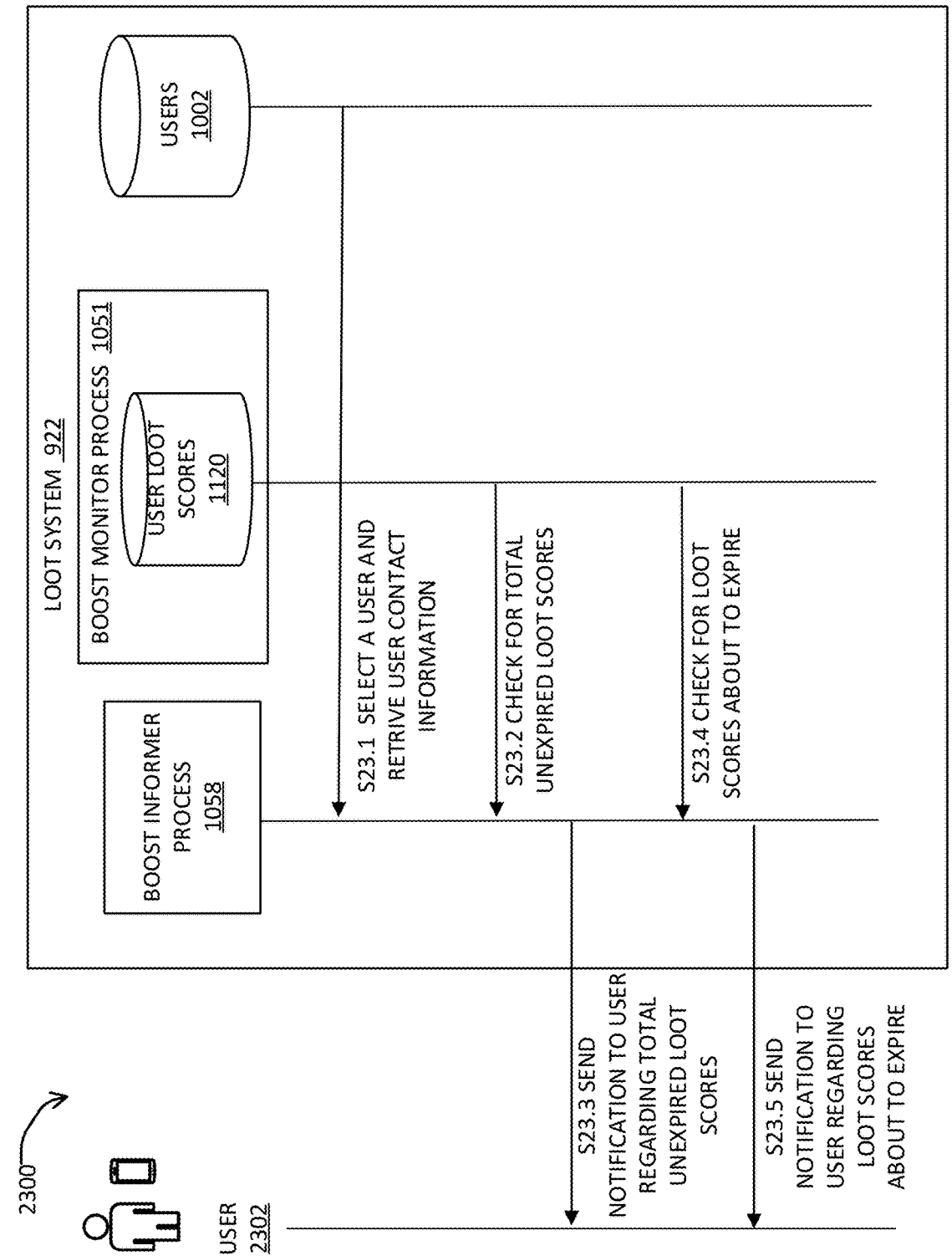

FIG. 23A is an example workflow 2300 illustrating a representative method of informing users of available loot scores by the boost informer 1058 in the loot system 922. The workflow 2300 starts at step S23.1 where the boost informer 1058 retrieves information regarding a personal device (e.g., a phone number) of a user 2302 from the users database 1002. At step S23.2, the boost informer 1058 checks the user loot scores database 1120 for total unexpired loot scores available to the user. At step S23.3, the boost informer 1058 notifies the user of the total unexpired loot score. The notification may be sent through an email, a text message, and/or a notification through an application communicating with the loot system 922 in the personal device of the users. FIG. 23B shows an example notification 2342 sent to a user's personal device 2340 about available, unexpired loot scores. At step S23.4, the boost informer 1058 checks the user loot scores database 1120 for loot scores that may be about to expire for the selected user. At step S23.5, the boost informer 1058 may notify the user of the loot scores that are about to expire. FIG. 23B shows an example notification 2344 about loot scores about to the expired sent to the user's personal device 2340.

Figure 24A:
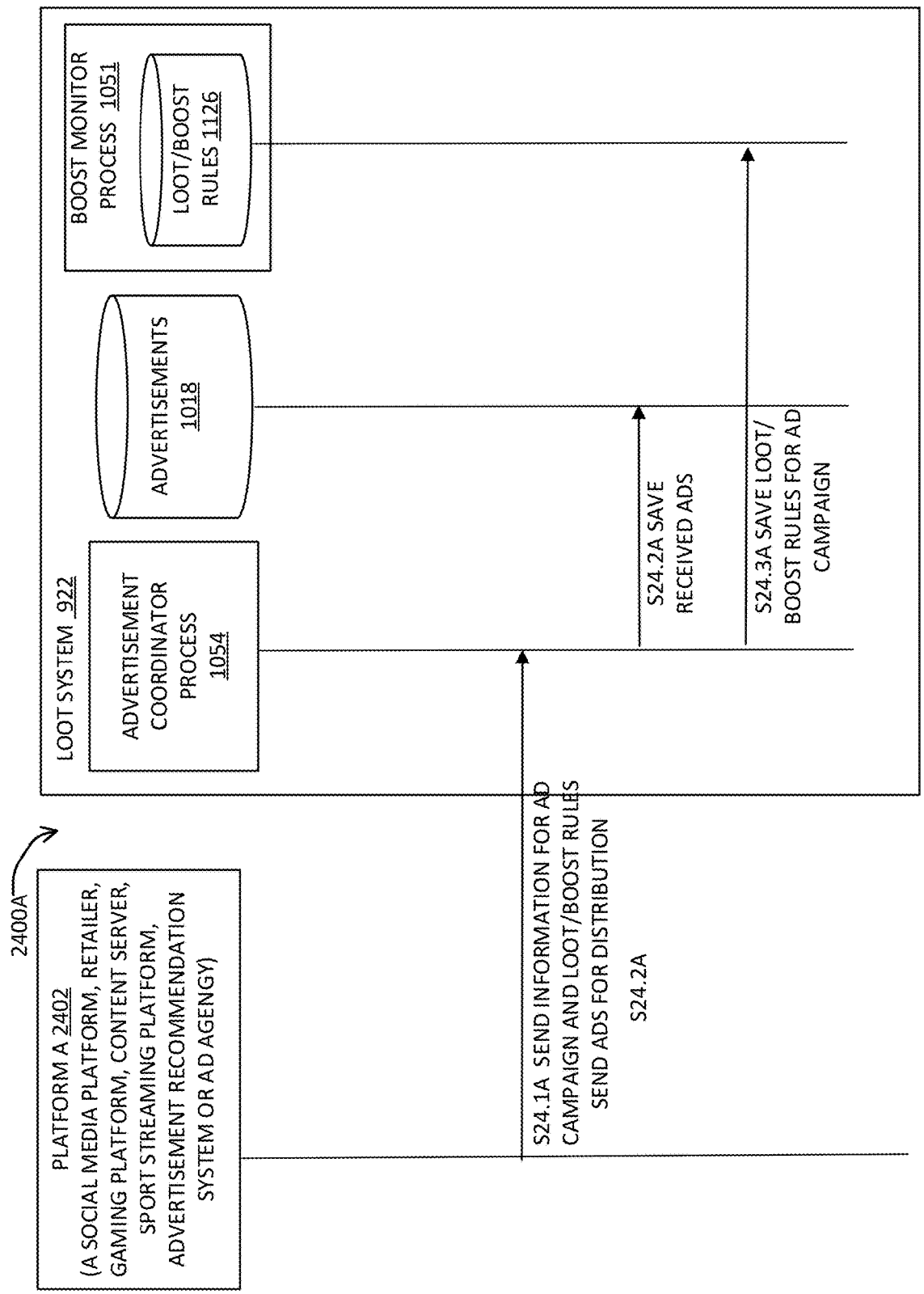
FIGS. 24A, 24B and 24C are sequence diagrams illustrating representative methods of sending targeted advertisements for upcoming chances to win loot scores and loot items.

FIG. 24A is an example workflow 2400A illustrating a representative method of setting up an advertisement campaign by the advertisement coordinator process 1054 for a platform A 2402. The platform A 2402 may be a social media platform, a retailer, a gaming platform, a content server, a sports streaming platform, an advertisement recommendation system, or an advertisement agency. The advertisement campaign may comprise targeted advertisements for upcoming chances to win boosts and loot items. At step S24.1A of the workflow 2400A, the platform A may send information for an advertisement campaign to the advertisement coordinator process 1054. The advertisement campaign may comprise boosts/loot scores for the campaign and advertisements associated with the boosts/loot scores. At step S24.2B, the advertisement coordinator 1054 may record the received advertisements in the advertisements database 1018 and record the received boost/loot scores in the loot/boost rules database 1126 at step S24.3.

Figure 24B:
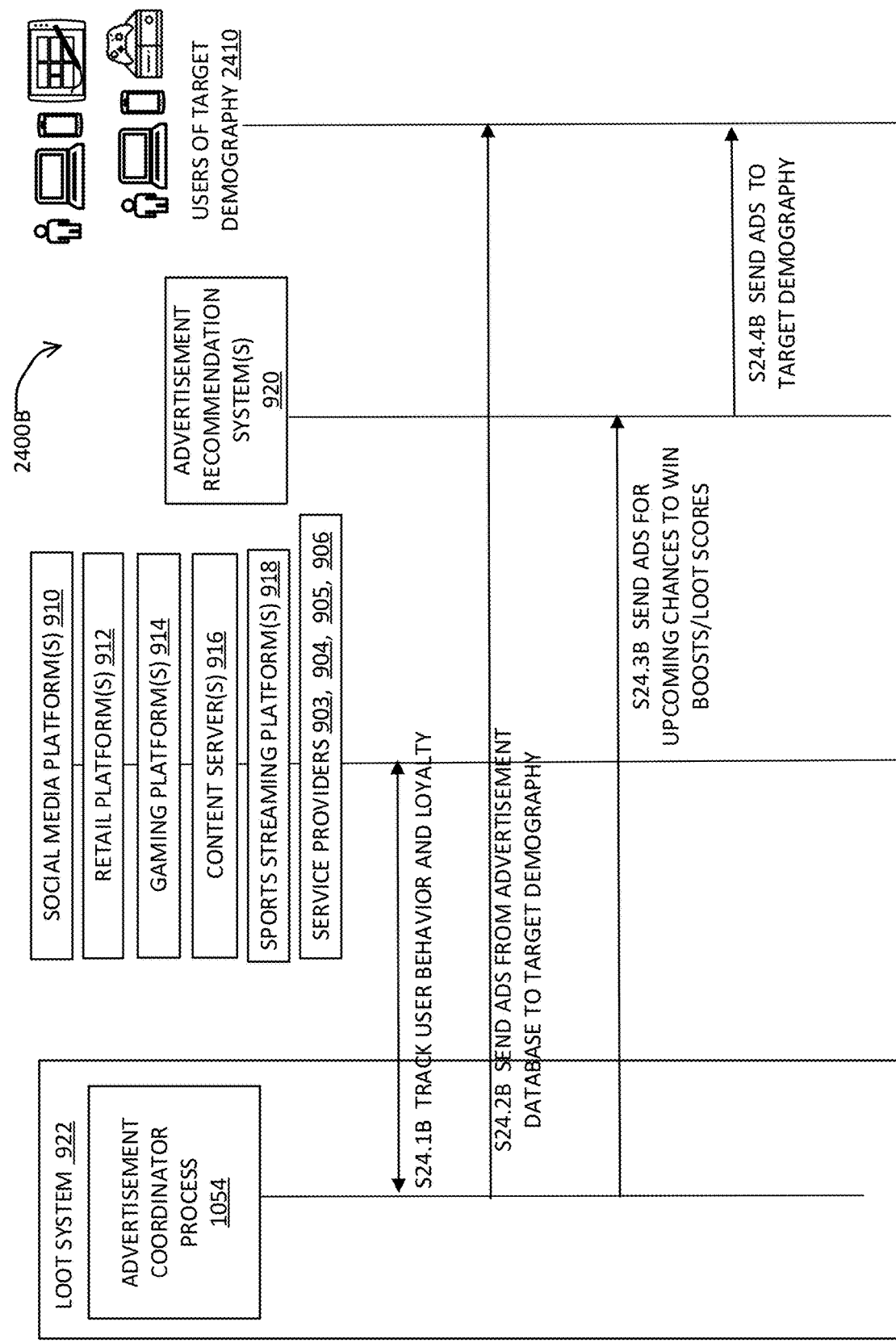

FIG. 24B is an example workflow 2400B illustrating a representative method of sending targeted advertisements for upcoming chances to win boosts. The loot system 922 promote upcoming chances to win loot scores via direct advertisements to the users, and/or joint promotional with the retail platforms 912. At step S24.1B of the workflow 2400, the advertisement coordinator 1054 may be configured to track brand loyalty of users across multiple platforms including the social media platforms 910, the retail platforms 912, the gaming platforms 914, the content servers 916, and the sport streaming platforms 918. At step S24.2B, the advertisement coordinator 1054 may then transmit targeted advertisements to users of a certain demographic based on the data collected at step S24.1. At step S24.3B, the advertisement coordinator 1054 may also interact with the advertisement recommendation systems 920 for providing targeted advertisements to the users of the loot system 922. At step 24.4B, the advertisement recommendation systems 920 may transmit targeted advertisements to users of a certain demography. The users may be provided with options to opt out of targeted advertisements, and other measures may be taken to protect user's privacy.

Figure 24C:
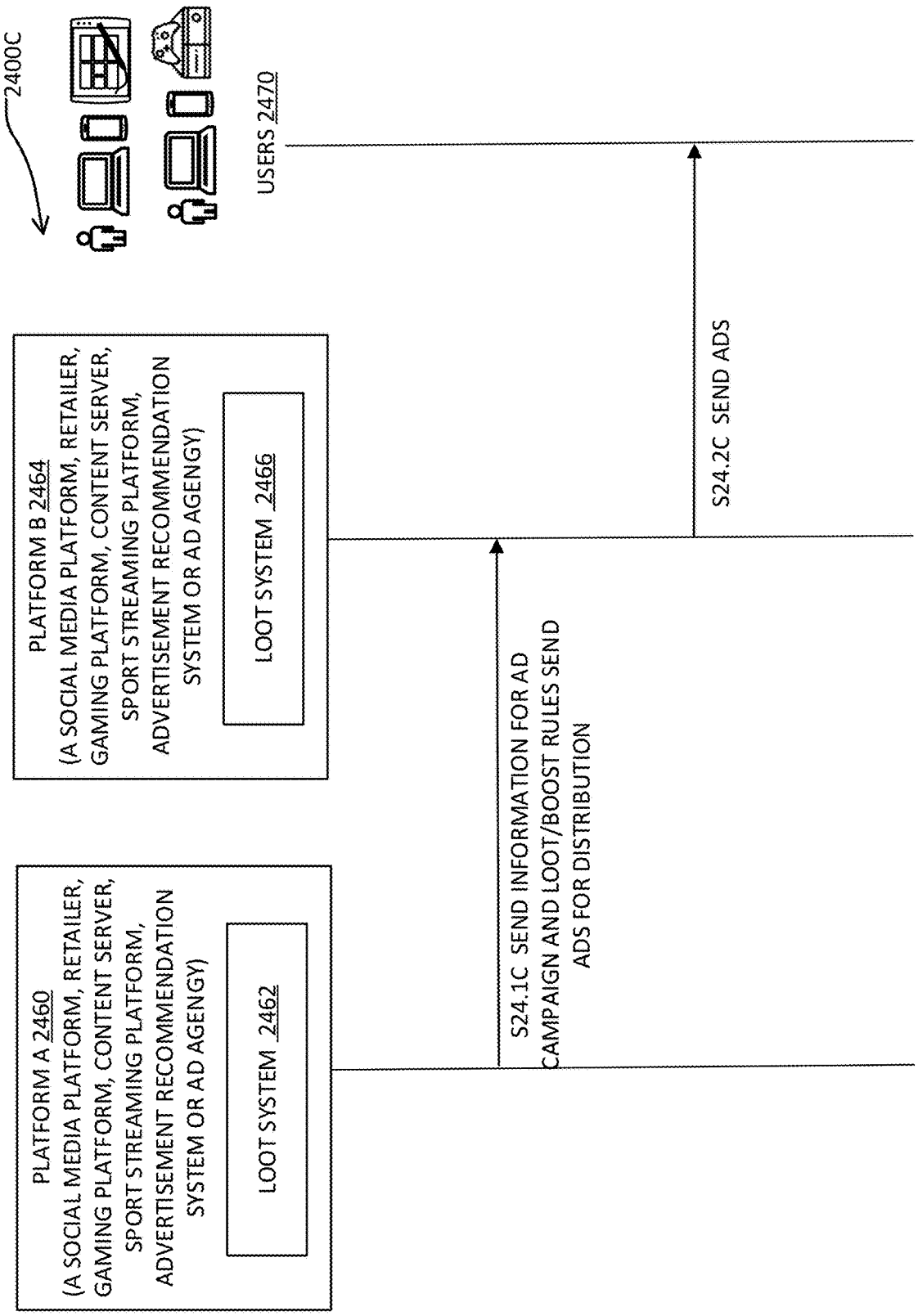

FIG. 24C is an example workflow 2400C illustrating a representative method of setting up an advertisement campaign in platform B 2464 by platform A 2460. The platform A 2460 and/or the platform B may host a loot server comprising a loot system. The platform A and/or platform B may be a social media platform, a retailer, a gaming platform, a content server, a sports streaming platform, an advertisement recommendation system or an advertisement agency. The advertisement campaign may comprise targeted advertisements for upcoming chances to win boosts and loot items. At step S24.1C of the workflow 2400A, the platform A 2460 may send information for an advertisement campaign to the platform B 2464. The advertisement campaign may comprise boosts/loot scores for the campaign and advertisements associated with the boosts/loot scores. At step S24.2C, the platform B 2464 may transmit targeted advertisements to users of a certain demography. The users may be provided with options to opt out of targeted advertisements, and other measures may be taken to protect user's privacy.

Figure 25:
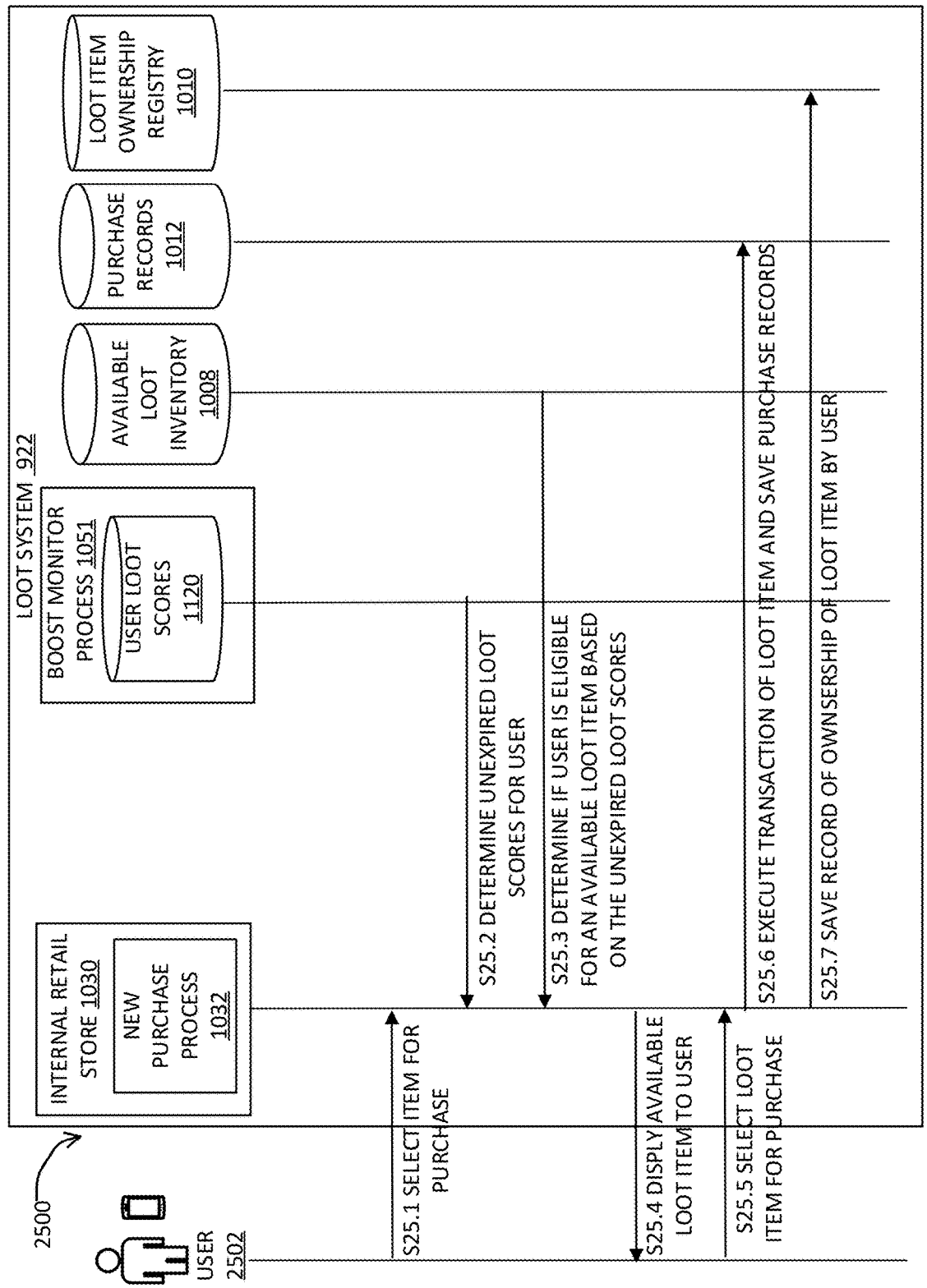
FIG. 25 is a sequence diagram illustrating a representative method of receiving a loot item during purchase of a common item from an internal retail store of the loot system.

FIG. 25 is an example workflow 2500 that illustrates a representative method of receiving a loot item during purchase of a common item from an internal retail store 1030 of the loot system 922. The workflow 2500 starts at step S25.1 where the new purchase process 1032 in the internal retail store 1030 receives an indication from a user 2502 to acquire an item. For example, the indication may be sent to the new purchase process 1058 if the user selects the checkout button 203 in FIG. 2B in an online purchase, and/or if the user otherwise acquires a new item from the available common loot inventory database 1004. The acquisition may be described above as a purchase, but it need not be a purchase. Any type of acquisition, such as a free gift and/or other reward, may qualify for a chance at an item variant.

At step S25.2, the new purchase process 1058 may determine the unexpired loot scores for the user 2502 from the user loot score database 1120. There may be one entry for the user 2502 in the user loot score database 1120 indicating a total loot score available for the user, or there may be multiple entries in the user loot score database 1120, and the total loot score available for the user 2502 may be determined by summing the loot scores of the multiple entries.

At step S25.2, the new purchase process 1032 may determine if the user 2592 may be eligible for a loot item in the available loot inventory database 1008 based on the unexpired loot scores of the user. As described in step 707 of FIG. 7A, an initial probability value may be determined for the user's purchase transaction by the new purchase process 1032. The initial probability value may be a random value between 00.0 and 100.0. These values may be merely examples, though, and any desired random value generation may be used. If the user 2502 has selected multiple items for purchase, a separate initial probability value may be determined for each item, or a single initial probability value may be determined for the entire purchase (e.g., one probability value for all items in the user's checkout cart).

The initial probability value may be used to determine if the user 2502 qualifies for a loot. For example, if the initial probability value may be between 00.0 and 91.9, the user may not be eligible for a loot item. An initial probability value between 92.0 and 97.9 may result in the user 2502 being granted an item from the available loot inventory with the loot class "good." An initial probability value between 98.0 and 99.0 may result in the user 2502 being granted an item from the available loot inventory with the loot class "rare." An initial probability value between 99.1 and 99.5 may result in the user 2502 being granted an item from the available loot inventory with the loot class "superior." An initial probability value between 99.5 and 100 may result in the user 2502 being granted an item from the available loot inventory with the loot class "epic." Of course, the values and details are merely examples, and other probabilities, variations, and items may be used. Different items may have different probabilities, items may have greater or fewer numbers of variants than other items, and other modifications may be made as desired.

If the user 2502 does not qualify for a loot item based on the initial probability value, the new purchase process 1058 applies the unexpired loot scores of the user 2502 to the initial probability value to boost the value. For example, an initial probability value of 90 may be increased to 91.8 by applying a loot score of +2%. The new purchase process 1058 may determine if the user 2502 may be eligible for a loot item based on the increased probably score.

At step 25.4, if the user 2502 may be eligible for a loot item from the available loot inventory database 1008 based on the initial probability value or the increased probability value, the loot item may be displayed to the user by the new purchase process 1032.

At step S25.5, the new purchase process 1032 may receive an indication from a user 2502 to acquire the displayed loot item. For example, the indication may be sent to the new purchase process 1058 if the user may select the "Great!" button 206 in FIG. 2C to accept and/or purchase the loot item. At step S25.5, the new purchase process 1032 may execute the purchase of the loot item and/or records the purchase transaction in the purchase records database 1012. The new purchase process 1032 may also record ownership of the loot item by the owner 2502 in the loot item ownership registry database 1010.

Figure 26:
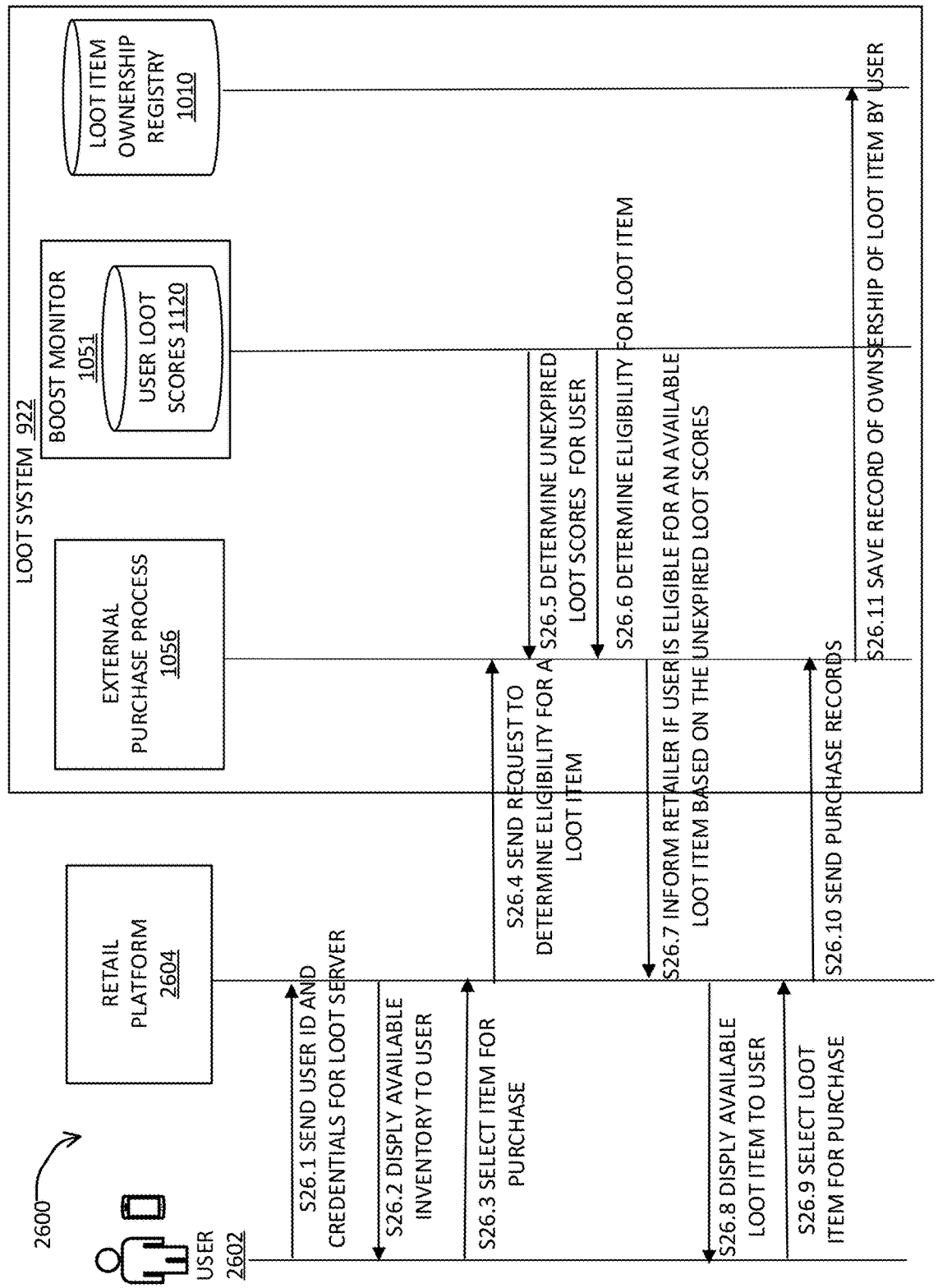
FIG. 26 is a sequence diagram illustrating a representative method of receiving a loot item during purchase of a common item from an external retail store.

FIG. 26 an example workflow 2600 that illustrates a representative method of receiving a loot item during purchase of a common item from a retailer 2604 outside the loot system 922 or the loot server 921. The workflow 2600 starts at step S26.1 where the user 2602 may provide user ID and login credentials to access the loot system 922 to the retailer 2604. The user 2602 may be assigned an electronic rewards "card" such as a cookie, profile, and/or other tag in a user's personal device and/or the user's account in the retailer 2604 may be tagged to the user's account/profile in the loot system 922. At step 26.2, the retailer 2604 displays available inventory to the user 2602. At step 26.3, the retailer 2604 receives an indication from the user 2602 to purchase an item. At step 26.4, the retailer 2604 sends a request to the external purchase process 1056 in the loot system 922 to determine the eligibility of the user 2602 to acquire a loot item. At step S26.5, the external purchase process 1056 may determine the unexpired loot scores for the user 2602 from the user loot score database 1120.

At step S26.6, the external purchase process 1056 may determine if the user 2602 may be eligible for a loot item based on the unexpired loot scores of the user. The external purchase process 1056 may generate an initial probability value to determine which version of an item the user 2602 may receive. If the user 2502 does not qualify for a loot item based on the initial probability value, the external purchase process 1056 applies the unexpired loot scores of the user 2602 to the initial probability value to boost the value. For example, an initial probability value of 90 may be increased to 91.8 by applying a loot score of +2%. The external purchase process 1056 may determine if the user 2502 may be eligible for a loot item based on the increased probably score.

At step S26.7, the external purchase process 1056 may send an indication to the retailer 2604 whether the user 2602 may be eligible for a loot item and if so, which class of loot item may be presented to the user. At step S26.8, if the user is eligible for a loot item, the retailer 2604 displays the loot item to the user 2602.

At step S26.9, the retailer 2604 may receive an indication from the user 2602 to acquire the displayed loot item. At step S26.10, the retailer may execute the purchase transaction and may send a record of the purchase to the external purchase process 1056. At step S26.11, the external purchase process 1056 may record ownership of the loot item by the owner 2602 in the loot item ownership registry database 1010.

Figure 27:
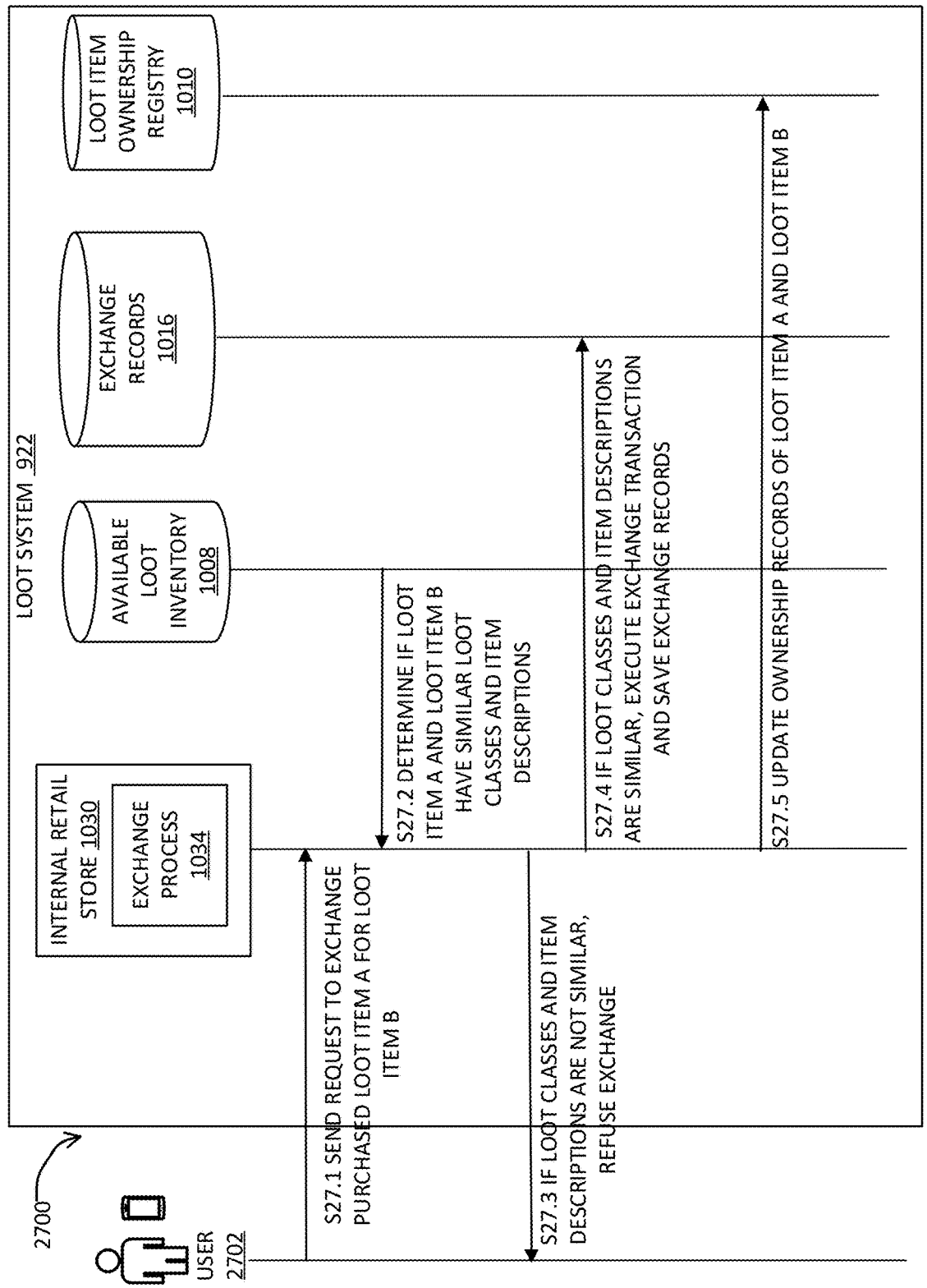
FIG. 27 is a sequence diagram illustrating a representative method of exchanging loot items in the internal retail store of the loot system.

FIG. 27 is an example workflow 2700 that illustrates a representative method of exchanging loot items in the internal retail store 1030 of the loot system 922. The workflow 2700 starts at step S27.1 where the exchange process 1034 in the internal retail store 1030 may receive an indication from a user 2702 to exchange a loot item A for loot item B. At step 26.3, the exchange process 1034 may determine if the loot item B may be available in the available loot item inventory database 1008 and whether the loot item A and the loot item B may have similar loot classes and item description. For example, a black sweatshirt with the loot class "rare" may be exchanged with a red sweatshirt with the loot class "rare." The black sweatshirt with the loot class "rare" may not be exchanged with a black sweatshirt with the loot class "superior." At step S27.4, if the loot item B may be available in the available loot item inventory database 1008 and the loot item A and the loot item B have similar loot classes and item descriptions, the exchange process 1034 executes the exchange transaction and records the transaction in the exchange records database 1016. At step S26.11, the exchange process 1034 records ownership of the loot item B by the owner 2702 in the loot item ownership registry database 1010 and updates ownership of the loot item A to indicate that it may be no longer owned by the user 2702.

Figure 28:
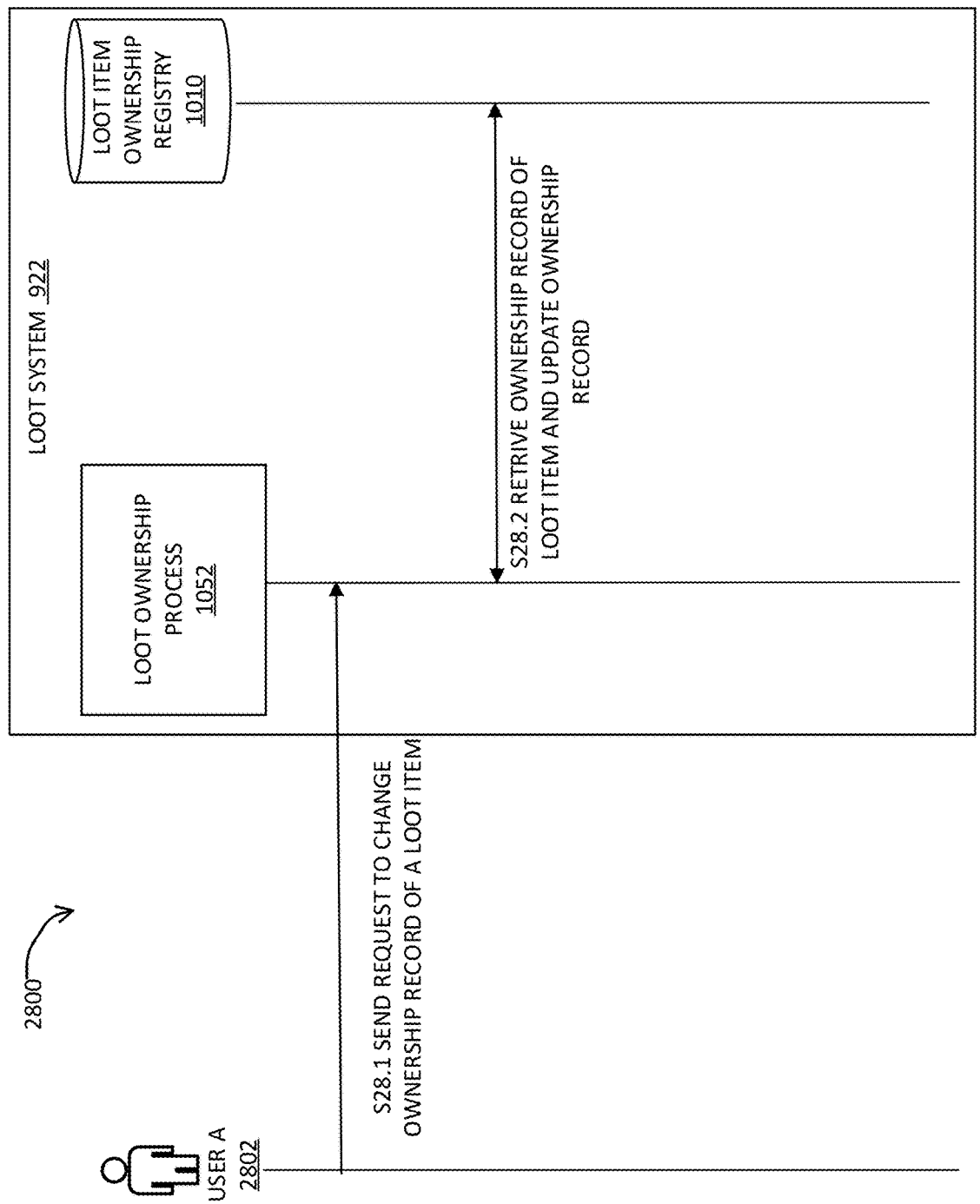
FIG. 28 is a sequence diagram illustrating a representative method of requesting change in ownership of a loot item.

Ownership of a variant item may be tracked, and this may facilitate subsequent transfers of the item, as users may choose to sell their items as collectible items on a marketplace (e.g., in one of the retail platforms 912, and/or another online marketplace). FIG. 28 is an example workflow 2800 that illustrates a representative method of requesting change in ownership of a loot item in the loot system 922. The workflow 2800 starts at step S28.1 where the loot ownership process 1052 receives an indication from a user 2802 to record new ownership of a loot item with an authorization tag ABCD. The user 2802 may verify that the loot item is indeed the one in the registry through an authentication tag (e.g., by visual inspection, scanning a bar code and/or embedded RFID tag, etc.). At step 28.2, the loot ownership process 1052 retrieves the ownership record of the loot item through the authentication tag from the loot item ownership registry database 1010 and records the new ownership of the loot item by the owner 2802.

With all workflows described herein, it will be appreciated that many of the steps may be combined, performed in parallel, or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

The invention claimed is:

1. A method comprising:
   establishing, by a computing device, communications with a social media server, a retail server, a sport streaming server, a gaming server, and a content server;
   receiving, by the computing device and via the communications, behavior data associated with one or more user devices of a user account, wherein the behavior data comprises: social media behavior data from the social media server, purchase history data from the retail server, streaming live match participation data from the sport streaming server, gaming behavior data from the gaming server, and content viewing history data from the content server;
   inputting, by the computing device and into a machine learning model, the behavior data;
   receiving, by the computing device and from the machine learning model, information indicating a probability value boost;
   based on receiving, from the one or more user devices, a selection, associated with the user account, of a common item, generating, by the computing device, a random probability value using a random probability generator;
   updating, by the computing device and based on the probability value boost, the random probability value; and
   causing, by the computing device and based on a comparison of the updated random probability value with an acquisition value of a rarer version of the common item, display of a user interface indicating that the rarer version of the common item is available to the user account.

2. The method of claim 1, further comprising:
   determining geospatial coordinates of the one or more user devices;
   determining whether the geospatial coordinates are within a threshold distance of a place of interest; and
   updating, based on a determination that the geospatial coordinates are within the threshold distance of the place of interest, the probability value boost.

3. The method of claim 1, further comprising:
   identifying, from the streaming live match participation data, an indication of participation of the user account in a live broadcast of a gaming event; and
   determining, based on the indication of the participation of the user account in the live broadcast, the probability value boost.

4. The method of claim 1, further comprising:
   identifying, from the gaming behavior data, information indicating a quantity of time spent by the user account interacting with the gaming server;
   identifying, from the gaming behavior data, information indicating game winning events associated with the user account; and
   determining, based on the information indicating the quantity of time spent by the user account interacting with the gaming server or based on the information indicating the game winning events associated with the user account, the probability value boost.

5. The method of claim 1, further comprising:
   identifying, from the purchasing history data, information indicating purchasing behavior of the user account;
   identifying, from the purchasing history data, an object or a phrase in a picture posted via the retail server and associated with the user account; and
   determining, based on the information indicating the purchasing behavior of the user account, on the identified object, or on the identified phrase, the probability value boost.

6. The method of claim 1, further comprising:
   identifying, from the social media behavior data, images and phrases associated with the user account;
   identifying, by analyzing pixel frames of the images, one or more objects in the images;
   identifying, from the phrases and by using heuristics-based string analysis, key terms in the phrases;

determining, from the social media behavior data, a quantity of contacts associated with the user account in the social media server; and determining, based on the quantity of contacts, on the one or more objects in the images, or on the key terms in the phrases, the probability value boost.

7. The method of claim 1, further comprising:

prior to receiving the selection of the common item, sending, to the one or more user devices and based on the behavior data, information indicating one or more rarer versions of the common item.

8. The method of claim 1, further comprising:

receiving second behavior data of associated with one or more user devices of a second user account, wherein the second behavior data comprises one or more of: data from the social media server, data from the retail server, data from the sport streaming server, data from the gaming server, or data from the content server;

inputting, into the machine learning model, the second behavior data; and receiving, from the machine learning model, information indicating a second probability value boost, wherein updating the random probability value comprises updating, based on the probability value boost and the second probability value boost, the random probability value.

9. The method of claim 1, further comprising:

receiving, from the one or more user devices associated with the user account, device data associated with the user account;

inputting, into the machine learning model, the device data; and receiving, from the machine learning model, information indicating a second probability value boost, wherein updating the random probability value comprises updating, based on the probability value boost and the second probability value boost, the random probability value.

10. A non-transitory computer readable medium storing instructions that, when executed, cause:

establishing communications with a social media server, a retail server, a sport streaming server, a gaming server, and a content server;

receiving, via the communications, behavior data associated with one or more user devices of a user account, wherein the behavior data comprises: social media behavior data from the social media server, purchase history data from the retail server, streaming live match participation data from the sport streaming server, gaming behavior data from the gaming server, and content viewing history data from the content server;

inputting, into a machine learning model, the behavior data;

receiving, from the machine learning model, information indicating a probability value boost;

based on receiving, from the one or more user devices, a selection, associated with the user account, of a common item, generating a random probability value using a random probability generator;

updating, based on the probability value boost, the random probability value; and causing, based on a comparison of the updated random probability value with an acquisition value of a rarer version of the common item, display of a user interface indicating that the rarer version of the common item is available to the user account.

11. The non-transitory computer readable medium of claim 10, wherein the instructions, when executed, further cause:

determining geospatial coordinates of the one or more user devices;

determining whether the geospatial coordinates are within a threshold distance of a place of interest; and updating, based on a determination that the geospatial coordinates are within the threshold distance of the place of interest, the probability value boost.

12. The non-transitory computer readable medium of claim 10, wherein the instructions, when executed, further cause:

identifying, from the streaming live match participation data, an indication of participation of the user account in a live broadcast of a gaming event; and determining, based on the indication of the participation of the user account in the live broadcast, the probability value boost.

13. The non-transitory computer readable medium of claim 10, wherein the instructions, when executed, further cause:

identifying, from the gaming behavior data, information indicating a quantity of time spent by the user account interacting with the gaming server;

identifying, from the gaming behavior data, information indicating game winning events associated with the user account; and determining, based on the information indicating the quantity of time spent by the user account interacting with the gaming server or based on the information indicating the game winning events associated with the user account, the probability value boost.

14. The non-transitory computer readable medium of claim 10, wherein the instructions, when executed, further cause:

identifying, from the purchasing history data, information indicating purchasing behavior of the user account;

identifying, from the purchasing history data, an object or a phrase in a picture posted via the retail server and associated with the user account; and determining, based on the information indicating the purchasing behavior of the user account, on the identified object, or on the identified phrase, the probability value boost.

15. The non-transitory computer readable medium of claim 10, wherein the instructions, when executed, further cause:

identifying, from the social media behavior data, images and phrases associated with the user account;

identifying, by analyzing pixel frames of the images, one or more objects in the images;

identifying, from the phrases and by using heuristics-based string analysis, key terms in the phrases;

determining, from the social media behavior data, a quantity of contacts associated with the user account in the social media server; and determining, based on the quantity of contacts, on the one or more objects in the images, or on the key terms in the phrases, the probability value boost.

16. The non-transitory computer readable medium of claim 10, wherein the instructions, when executed, further cause:

prior to receiving the selection of the common item, sending, to the one or more user devices and based on the behavior data, information indicating one or more rarer versions of the common item.

17. The non-transitory computer readable medium of claim 10, wherein the instructions, when executed, further cause:

receiving second behavior data of associated with one or more user devices of a second user account, wherein the second behavior data comprises one or more of: data from the social media server, data from the retail server, data from the sport streaming server, data from the gaming server, or data from the content server;

inputting, into the machine learning model, the second behavior data; and receiving, from the machine learning model, information indicating a second probability value boost, wherein the instructions, when executed, cause updating the random probability value by updating, based on the probability value boost and the second probability value boost, the random probability value.

18. The non-transitory computer readable medium of claim 10, wherein the instructions, when executed, further cause:

receiving, from the one or more user devices associated with the user account, device data associated with the user account;

inputting, into the machine learning model, the device data; and receiving, from the machine learning model, information indicating a second probability value boost, and wherein the instructions, when executed, cause updating the random probability value by updating, based on the probability value boost and the second probability value boost, the random probability value.

19. An apparatus comprising:
one or more processors; and
memory storing instructions that, when executed by the one or more processors, cause the apparatus to:
establish communications with a social media server, a retail server, a sport streaming server, a gaming server, and a content server;
receive, via the communications, behavior data associated with one or more user devices of a user account, wherein the behavior data comprises: social media behavior data from the social media server, purchase history data from the retail server, streaming live match participation data from the sport streaming server, gaming behavior data from the gaming server, and content viewing history data from the content server;
input, into a machine learning model, the behavior data;
receive, from the machine learning model, information indicating a probability value boost;
based on receiving, from the one or more user devices, a selection, associated with the user account, of a common item, generate a random probability value using a random probability generator;
update, based on the probability value boost, the random probability value; and
cause, based on a comparison of the updated random probability value with an acquisition value of a rarer version of the common item, display of a user interface indicating that the rarer version of the common item is available to the user account.

20. The apparatus of claim 19, wherein the instructions, when executed by the one or more processors, further cause the apparatus to:
determine geospatial coordinates of the one or more user devices;
determine whether the geospatial coordinates are within a threshold distance of a place of interest; and
update, based on a determination that the geospatial coordinates are within the threshold distance of the place of interest, the probability value boost.

21. The apparatus of claim 19, wherein the instructions, when executed by the one or more processors, further cause the apparatus to:
identify, from the streaming live match participation data, an indication of participation of the user account in a live broadcast of a gaming event; and
determine, based on the indication of the participation of the user account in the live broadcast, the probability value boost.

22. The apparatus of claim 19, wherein the instructions, when executed by the one or more processors, further cause the apparatus to:
identify, from the gaming behavior data, information indicating a quantity of time spent by the user account interacting with the gaming server;
identify, from the gaming behavior data, information indicating game winning events associated with the user account; and
determine, based on the information indicating the quantity of time spent by the user account interacting with the gaming server or based on the information indicating the game winning events associated with the user account, the probability value boost.

23. The apparatus of claim 19, wherein the instructions, when executed by the one or more processors, further cause the apparatus to:
identify, from the purchasing history data, information indicating purchasing behavior of the user account;
identify, from the purchasing history data, an object or a phrase in a picture posted via the retail server and associated with the user account; and
determine, based on the information indicating the purchasing behavior of the user account, on the identified object, or on the identified phrase, the probability value boost.

24. The apparatus of claim 19, wherein the instructions, when executed by the one or more processors, further cause the apparatus to:
identify, from the social media behavior data, images and phrases associated with the user account;
identify, by analyzing pixel frames of the images, one or more objects in the images;
identify, from the phrases and by using heuristics-based string analysis, key terms in the phrases;
determine, from the social media behavior data, a quantity of contacts associated with the user account in the social media server; and
determine, based on the quantity of contacts, on the one or more objects in the images, or on the key terms in the phrases, the probability value boost.

25. The apparatus of claim 19, wherein the instructions, when executed by the one or more processors, further cause the apparatus to:
prior to receiving the selection of the common item, send, to the one or more user devices and based on the behavior data, information indicating one or more rarer versions of the common item.

26. The apparatus of claim 19, wherein the instructions, when executed by the one or more processors, further cause the apparatus to:
receive second behavior data associated with one or more user devices of a second user account, wherein the second behavior data comprises one or more of: data from the social media server, data from the retail server, data from the sport streaming server, data from the gaming server, or data from the content server;

input, into the machine learning model, the second behavior data; and receive, from the machine learning model, information indicating a second probability value boost, and wherein the instructions, when executed by the one or more processors, further cause the apparatus to update the random probability value by updating, based on the probability value boost and the second probability value boost, the random probability value.

27. The apparatus of claim 19, wherein the instructions, when executed by the one or more processors, further cause the apparatus to:

receive, from the one or more user devices associated with the user account, device data associated with the user account;

input, into the machine learning model, the device data; and receive, from the machine learning model, information indicating a second probability value boost, and wherein the instructions, when executed by the one or more processors, further cause the apparatus to update the random probability value by updating, based on the probability value boost and the second probability value boost, the random probability value.

\* \* \* \* \*

UNITED STATES PATENT AND TRADEMARK OFFICE
CERTIFICATE OF CORRECTION

PATENT NO. : 11,587,109 B2
APPLICATION NO. : 17/104999
DATED : February 21, 2023
INVENTOR(S) : Roberts It is certified that error appears in the above-identified patent and that said Letters Patent is hereby corrected as shown below:

In the Specification

Column 6, Detailed Description, Line 41:
Delete "103" and insert --102-- therefor Column 24, Detailed Description, Line 19:
Delete "922" and insert --921-- therefor Column 26, Detailed Description, Line 42:
Delete "921," and insert --920,-- therefor Column 27, Detailed Description, Line 44:
Delete "1032." and insert --1034.-- therefor Column 28, Detailed Description, Line 36:
Delete "922" and insert --921-- therefor Column 28, Detailed Description, Line 62:
Delete "1112" and insert --1114-- therefor Column 28, Detailed Description, Line 64:
Delete "116" and insert --1116-- therefor Column 32, Detailed Description, Line 40:
Delete "922," and insert --921,-- therefor Column 32, Detailed Description, Line 46:
Delete "922" and insert --921-- therefor Signed and Sealed this
Fourteenth Day of May, 2024

Katherine Kelly Vidal
*Director of the United States Patent and Trademark Office*

Column 33, Detailed Description, Line 7:
Delete "1103" and insert --1104-- therefor Column 39, Detailed Description, Line 11:
Delete "1058" and insert --1032-- therefor Column 39, Detailed Description, Line 19:
Delete "1058" and insert --1032-- therefor Column 39, Detailed Description, Line 63:
Delete "1058" and insert --1032-- therefor Column 40, Detailed Description, Line 1:
Delete "1058" and insert --1032-- therefor Column 40, Detailed Description, Line 11:
Delete "1058" and insert --1032-- therefor In the Claims Column 41, Line 64:
In Claim 1, after "comprises:", insert --¶--

Column 43, Line 47:
In Claim 10, after "comprises:", insert --¶--

Column 45, Line 42:
In Claim 19, after "comprises:", insert --¶--